United States Patent
Rajcan et al.

(10) Patent No.: US 10,776,489 B2
(45) Date of Patent: *Sep. 15, 2020

(54) METHODS AND SYSTEMS FOR PROVIDING AND CONTROLLING CRYPTOGRAPHIC SECURE COMMUNICATIONS TERMINAL OPERABLE TO PROVIDE A PLURALITY OF DESKTOP ENVIRONMENTS

(71) Applicant: Unisys Corporation, Blue Bell, PA (US)

(72) Inventors: Steven L Rajcan, Malvern, PA (US); Matthew Mohr, Malvern, PA (US); Jim Trocki, Malvern, PA (US); Mark K Vallevand, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 397 days.

This patent is subject to a terminal disclaimer.

(21) Appl. No.: 14/997,783

(22) Filed: Jan. 18, 2016

(65) Prior Publication Data

US 2017/0169226 A1 Jun. 15, 2017

Related U.S. Application Data

(63) Continuation-in-part of application No. 13/105,154, filed on May 11, 2011, now abandoned, and a
(Continued)

(51) Int. Cl.
*G06F 21/57* (2013.01)
*G06F 9/4401* (2018.01)
(Continued)

(52) U.S. Cl.
CPC ............ *G06F 21/575* (2013.01); *G06F 9/442* (2013.01); *G06F 9/4406* (2013.01);
(Continued)

(58) Field of Classification Search
CPC .... G06F 21/575; G06F 9/4406; G06F 9/4416; G06F 9/442; G06F 2221/034; H04L 63/083; H04L 63/025; H04L 63/306
(Continued)

(56) References Cited

U.S. PATENT DOCUMENTS

2013/0339716 A1* 12/2013 Hamid ................ G06F 21/6218
713/2
2014/0317350 A1* 10/2014 Langas ................ G06F 1/266
711/115
(Continued)

*Primary Examiner* — Ashokkumar B Patel
*Assistant Examiner* — William B Jones

(57) ABSTRACT

Methods and systems for switching between multiple languages of a remote desktop client operating on a secure boot device are disclosed. A method includes initiating an operating system from the secure boot device and receiving credentials including a user identification and a password. The method also includes booting, from the secure boot device, the operating system in a first language and receiving a selection of a second language different from the first language within a user interface of the operating system. The method further includes performing a desktop reset to execute the operating system in the second language.

20 Claims, 38 Drawing Sheets

Related U.S. Application Data continuation-in-part of application No. 11/714,598, filed on Mar. 6, 2007, now abandoned.

(60) Provisional application No. 62/266,068, filed on Dec. 11, 2015, provisional application No. 62/266,053, filed on Dec. 11, 2015, provisional application No. 62/266,063, filed on Dec. 11, 2015, provisional application No. 61/389,511, filed on Oct. 4, 2010, provisional application No. 61/389,535, filed on Oct. 4, 2010.

(51) Int. Cl.
| | |
|---|---|
| *G06F 9/451* | (2018.01) |
| *G06F 21/53* | (2013.01) |
| *G06F 21/74* | (2013.01) |
| *H04L 29/06* | (2006.01) |
| *H04W 12/06* | (2009.01) |
| *H04L 29/08* | (2006.01) |
| *G06F 21/31* | (2013.01) |

(52) U.S. Cl.
CPC .......... *G06F 9/4408* (2013.01); *G06F 9/4416* (2013.01); *G06F 9/452* (2018.02); *G06F 9/454* (2018.02); *G06F 21/53* (2013.01); *G06F 21/74* (2013.01); *H04L 63/029* (2013.01); *H04L 63/0428* (2013.01); *H04L 63/08* (2013.01); *H04L 67/025* (2013.01); *H04L 67/306* (2013.01); *H04W 12/06* (2013.01); *G06F 9/441* (2013.01); *G06F 21/31* (2013.01); *G06F 2221/034* (2013.01); *H04L 63/101* (2013.01)

(58) Field of Classification Search
USPC ............................................................. 726/5
See application file for complete search history.

(56) References Cited

U.S. PATENT DOCUMENTS

2015/0033305 A1* 1/2015 Shear ...................... G06F 21/53
726/6
2015/0067804 A1* 3/2015 Maxwell ................. H04L 51/28
726/7

* cited by examiner

US 10,776,489 B2

METHODS AND SYSTEMS FOR PROVIDING AND CONTROLLING CRYPTOGRAPHIC SECURE COMMUNICATIONS TERMINAL OPERABLE TO PROVIDE A PLURALITY OF DESKTOP ENVIRONMENTS

CROSS-REFERENCE TO RELATED APPLICATIONS

This application claims the benefit of priority of U.S. Provisional Patent Application No. 62/266,068 filed on Dec. 11, 2015 and U.S. Provisional Patent Application No. 62/266,063 filed on Dec. 11, 2015 and U.S. Provisional Patent Application No. 62/266,053 filed on Dec. 11, 2015. All are incorporated by reference in their entirety.

The present application claims priority to U.S. patent application Ser. No. 13/105,154, filed on May 11, 2011, and entitled "Methods and Systems for Providing and Controlling Cryptographically Secure Communications Across Unsecured Networks Between a Secure Virtual Terminal and a Remote System", which further claims priority to U.S. Provisional Patent Application No. 61/389,535, filed Oct. 4, 2010, and entitled "System and Method for Providing a Stealth Secure Virtual Terminal", the disclosure of which is hereby incorporated by reference in its entirety.

This application further claims priority, through U.S. patent application Ser. No. 13/105,154, to U.S. Provisional Patent Application No. 61/389,511, filed Oct. 4, 2010, and entitled "System and Method for Providing a USB Stick-Based Thin Client", the disclosure of which is hereby incorporated by reference in its entirety.

This application further claims priority, through U.S. patent application Ser. No. 13/105,154, to U.S. patent application Ser. No. 11/714,598, filed Mar. 6, 2007, entitled "Gateway for Securing Data to/from a Private Network", the disclosure of which is hereby incorporated by reference in its entirety.

TECHNICAL FIELD

The present application relates generally to secured data communication. In particular, the present application relates to methods and systems for providing and controlling secure communications across unsecured networks.

BACKGROUND

Security is often maintained in organizations by segregating physical networks used by each group of users. This acts to restrict access to data available on computers and databases used in such networks. For example, it prevents someone in engineering from gaining access to data used in the payroll department's network and vice versa. While separate local network infrastructures help to maintain security of data, superfluous equipment and maintenance is required to maintain these segregated networks. This adds expense, and complexity to the data infrastructures of such organizations.

Furthermore, regardless of the organizational structure of networks used in commercial, governmental, and other settings, there is an ever increasing security concern that sensitive data transmitted or stored on local networks will be accessed by an unauthorized individual or accidentally accessed or disclosed outside of a community-of-interest, hence compromising the secret data. Exacerbating this problem is the fact that security threats can also often originate from insiders. Whether the threat is intentional or unintentional, transmitting data exclusively in one security level partitioned network or another does not protect the data if it is in plaintext format. This is because even strict physical segregation of a network by security level is no guarantee that data will not be disseminated to end-users outside that security level.

The above security concerns are only further exacerbated when access to open or public networks is provided or required, for example in the case of accessing secure networks remotely via the Internet. For example, the growth of the Internet and related network communication networks has given rise to increasingly larger numbers of distributed information processing systems in which individual users obtain information from an ever increasing number of sources. For example, in the banking industry, electronic communications by customers to their banking institutions to engage in electronic financial transactions is an increasing form of interaction between the customers and the banks. Other organizations or institutions requiring highly secured communications over typically-unsecure networks have analogous problems.

In making these transactions possible, customers use any number of computing systems attached to the Internet to communicate with servers operated by their banking institutions to send commands and receive data associated with these transactions. Banks are typically not able to control the customer's computing systems in a meaningful way that may give rise to potential security issues. A summary of some of these security threats are described in detail in a Unisys White Paper entitled "Zeus Malware: Threat Banking Industry" that is incorporated herein by reference in its entirety.

The present invention addresses these limitations of the prior computing systems.

SUMMARY

In accordance with the present disclosure, the above and other problems are solved by providing a method, apparatus, and article of manufacture for providing a thin client for providing secure access to network-based services from a computing system attached to a generally unsecured network. Various aspects of this thin client, and systems enabling thin client access to such services, for example web based services, are disclosed as well.

In a first aspect, a method for switching between multiple brandings of a remote desktop client operating on a secure boot device, the secure boot device storing a plurality of brandings for a user, the method comprising: initiating an operating system from the secure boot device; receiving credentials including a user identification and a password; receiving a selection of a first branding among the plurality of brandings, each of the plurality of brandings associated with a different entity from which a user may receive authorization to operate the remote desktop client; based on verification of the received credentials, booting, from the secure boot device, a desktop in the selected first branding; receiving a selection of a second branding different from the first branding; and performing a desktop reset, wherein the desktop reset results in execution of the desktop in the second branding.

In a second aspect, a secure system for switching between multiple brandings of a remote desktop client operating on a secure boot device, the secure boot device storing a plurality of brandings for a user, the system comprising: a client computer having a secure boot device connected thereto; a remote server communicatively connected to the client computer via a communications network;

a trusted set of processing modules stored in the secure boot device that, when executed on the client computer, cause the client computer to: initiate an operating system from the secure boot device; receive credentials including a user identification and a password; receive a selection of a first branding among the plurality of brandings, each of the plurality of brandings associated with a different entity from which a user may receive authorization to operate the remote desktop client; based on verification of the received credentials, boot, from the secure boot device, a desktop in the selected first branding; receive a selection of a second branding different from the first branding; and perform a desktop reset, wherein the desktop reset results in execution of the desktop in the second branding.

In a third aspect, a computer storage medium comprising computer-executable instructions stored in a memory of a secure boot device operating on a remote desktop client and including a trusted set of processing modules which, when executed, cause a computing system to: initiate an operating system from the secure boot device; receive credentials including a user identification and a password; receive a selection of a first branding among the plurality of brandings, each of the plurality of brandings associated with a different entity from which a user may receive authorization to operate the remote desktop client; based on verification of the received credentials, boot, from the secure boot device, a desktop in the selected first branding; receive a selection of a second branding different from the first branding; and perform a desktop reset, wherein the desktop reset results in execution of the desktop in the second branding.

In some additional aspects, a utility of the present disclosure is that, among other aspects, it provides a method for securely connecting a client computer, such as one having a secure boot device to a remote server over a communications network. The method boots a client computer from a trusted set of processing modules stored in the secure boot device, verifies the contents of the trusted set of processing modules prior to execution of these processing modules, provides authentication information from data stored upon the secure boot device to an authorization server to establish a secure connection to another server, such as a web services server. In some aspects, the method establishes the secure connection with the server using encryption keys stored on the secure boot device, and transfers data between the client computer and the server over the secure connection to perform transactions initiated by a user of the client computer. Additionally, the present disclosure provides for control and update of software executing at a client computing device. The server computer utilizes encryption keys associated with a unique ID from the secure boot device. Additionally, distributed networks are provided that allow for distributed resource management, to allow customers access to private network areas that share resources with other customers, while also ensuring secure key and update management for each customer.

These and various other features as well as advantages, which characterize the present disclosure, will be apparent from a reading of the following detailed description and a review of the associated drawings.

BRIEF DESCRIPTION OF THE DRAWINGS

Referring now to the drawings in which like reference numbers represent corresponding parts throughout.

DETAILED DESCRIPTION

Figure 1:
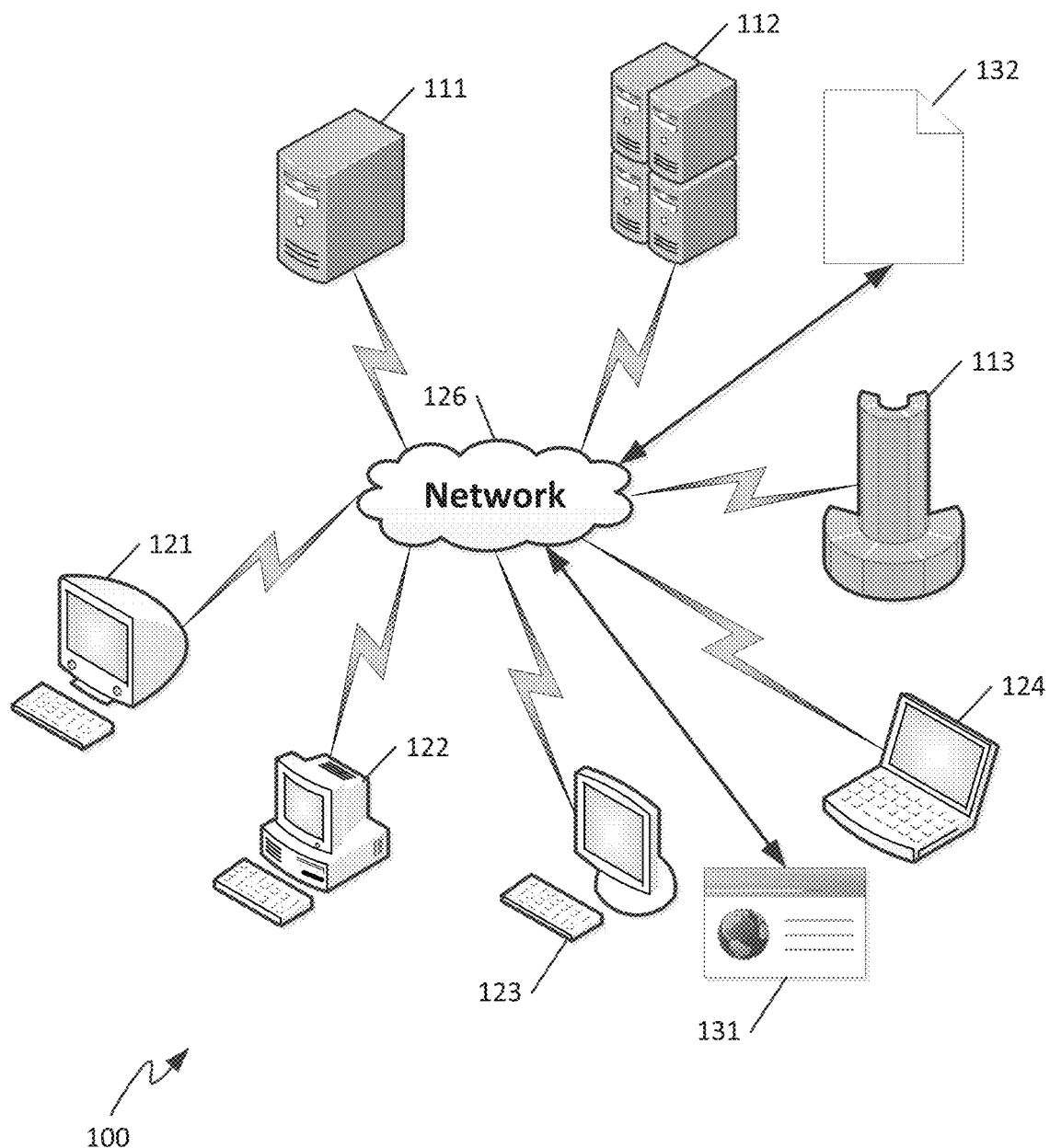
FIG. 1 illustrates a distributed system using according to one embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to a method, apparatus, and article of manufacture for providing a secure client for providing secure access to a remote server from a computing system attached to an unsecured network. The present disclosure provides for a secure connection to such a server generally, and in particular distributed network resources. Various aspects include methods and systems for secure connection to a distributed system for performing transactions, for example using a thin client, terminal-based system. Methods and systems for updating such a system while a secure connection is established are provided as well. Additionally, methods and systems for managing encryption keys within a secure network, and for allowing secure and clear text connections to coexist within a secure network are provided as well.

I. Generalized Infrastructure for Secure Communication

FIG. 1 illustrates a distributed system 100 in which aspects of the present disclosure can be implemented, according to one embodiment of the present disclosure. A distributed computing system 100 allows a number of users to communicate with any number of servers 111-113 using their own client computers 121-124, via a network, show as the internet 126. On a client computer 123, a web page 131 or other network-accessible resource can be displayed to a user that corresponds to a transaction 132 being performed on a particular server, e.g., server 112. The communications between the client computer 123 and server 112 occurs over a secure connection.

In one possible embodiment of the present invention, this secure connection utilizes a security technology developed by the Unisys Corporation that are described in detail in a number of commonly assigned U.S. patent applications. These applications generally describe a cryptographic splitting and recombining arrangement referred to herein as "cryptographically secure" or "Stealth-enabled". These applications include:

1. U.S. Provisional Application entitled: Distributed Security on Multiple Independent Networks using Secure "Parsing" Technology, by Robert Johnson, Ser. No. 60/648,531, filed 31 Jan., 2005;
2. U.S. application entitled: Integrated Multi-Level Security System, by Robert Johnson, U.S. Ser. No. 11/339, 974 filed 26 Jan. 2006 claiming the benefit of the above provisional applications;
3. U.S. application entitled: Integrated Multi-Level Security System, by Robert Johnson et al., Ser. No. 11/714, 590 filed 6 Mar. 2007 which is a continuation-in-part of U.S. application Ser. No. 11/339,974;
4. U.S. application entitled: Integrated Multi-Level Security System, by Robert Johnson et al., Ser. No. 11/714, 666 filed 6 Mar. 2007 which is a continuation-in-part of U.S. application Ser. No. 11/339,974; and
5. U.S. application entitled: Integrated Multi-Level Security System, by Robert Johnson et al., Ser. No. 11/714, 598 filed 6 Mar. 2007 which is a continuation-in-part of U.S. application Ser. No. 11/339,974.

All of these applications are currently pending before the U.S. Patent and Trademark Office, are commonly assigned to the owner of the instant application, and are incorporated herein in their entireties.

In various embodiments of the present disclosure, the servers 111-113 can be distributed across a plurality of discrete locations or controlled by different entities; in such embodiments, these servers 111-113 can be referred to generally as remote servers, as they represent servers accessible from a remote location and which can be accessed via an unsecured network. For example, in some embodiments of the present disclosure (discussed in greater detail below), one or more of the servers 111-113 is a banking server, configured to communicate securely with one or more client terminal devices across a secure connection, formed for example via the Internet. In such examples, or others where a high level of security is required, one or more secure connections can be established between client devices and a server, or among servers, on such an unsecured network. Other server functionalities or arrangements are possible as well, for example including administration, provisioning, and user management/authentication systems. In such embodiments, one or more such separate functionalities can be integrated into, or can reside separate from, an entity requiring highly secure communications such as a financial institution where reliable security is needed.

Figures 2, 3:
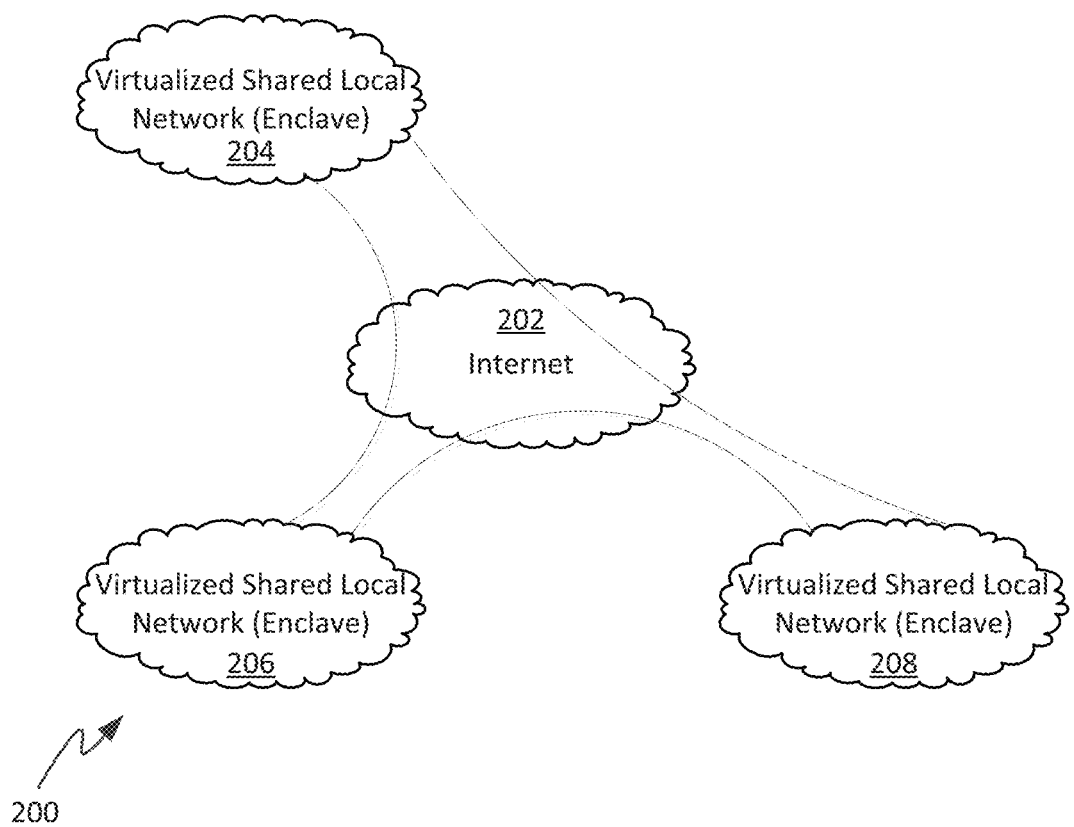
FIG. 2 shows an organization in which separate intranets able to be formed in the distributed system of FIG. 1 are consolidated into a single interconnected infrastructure.
FIG. 3 is a chart illustrating end-users and their membership denoted by an "X" to different communities-of-interest of a small subset of an example larger organization.

FIG. 2 shows an organization 200 in which separate intranets able to be formed in the distributed system of FIG. 1 are consolidated into a single interconnected infrastructure. In the organization 200 as shown, a variety of physically separated resources, illustrated as residing at sites 204, 206, 208, respectively, can be communicatively interconnected, for example via the Internet 202. In accordance with the present disclosure, secure communication can be accomplished among the various sites 204-208, and from remote users to one or more sites. For example, one or more of the servers 111-113 can be physically located at a different location from other servers, and client computers 121-124 can be located at any location either within an entity's intranet or external to that intranet. Access to the resources of the organization 200 by a user is provided not based on that user's location, but his/her membership in a community-of-interest associated with that entity.

As used in the present disclosure, a community-of-interest refers generally to a group of two or more people who share a common interest and are grouped together based on their common interest. A community-of-interest may correspond to a role of an individual in an organization, a job level, security level, or may correspond to some other characteristic. A community-of-interest may also correspond to some subject defined by an organization or an individual and associated with one or more individuals (i.e., end-users of a computing device). A community-of-interest may be defined differently depending on the organizational structure of the entity.

FIG. 3 is a chart 300 illustrating end-users and their membership denoted by an "X" to different communities-of-interest of a small subset of an example organization. In this condensed example, a President of an organization, given his/her position, is entitled to access data in all of the communities-of-interest. On the other hand, a Payroll Specialist whose role may be limited to only issuing paychecks can only view or share data associated with the payroll community-of-interest and no other communities-of-interest. An HR (Human Resources) Manager given his/her position in HR as well as being a manager may view or share data from both the HR and Management communities-of-interest. Finally, in this example, a Sales Associate is only able to view data from or share data with others associated with the Sales community-of-interest.

In the example shown, while the President can access data in all four communities-of-interest, the President cannot share data with the Payroll Specialist if the data the President sends to the Payroll Specialist is encrypted for use in a community-of-interest that the Payroll Specialist cannot access. That is, no communication session can be established between the President and the Payroll Specialist other than within the Payroll community-of-interest. Therefore the message with a community-of-interest key not associated with the Payroll Specialist cannot be sent to the Payroll Specialist. Even if the message is accidentally received by the Payroll Specialist, the Payroll Specialist cannot view the message, for example due to use of encryption keys specific to each community of interest, as discussed in further detail below. This safeguard prevents inadvertent or malicious/intentional dissemination of plaintext data to individuals who are not members of a particular community-of-interest, and therefore, are not authorized to receive such information.

It is possible to distribute community-of-interest specific encryption keys (also known herein as "community-of-interest keys") within departments, groups, agencies, different offices of an entity, based on ranks of individuals, security level ratings of individuals, commercial/non-commercial entities, governmental/non-governmental entities, corporations, or just about any group. It is also possible to dynamically create a community-of-interest or revoke a community of interest by the dissemination or removal of community-of-interest keys.

Thus, in accordance with one embodiment, each individual (or end user) associated with an organization has one or more community-of-interest keys provided on their computers, which is a secret encryption and/or decryption key previously installed thereon as a set of code or logic on a computer. Only computer devices with matching community-of-interest keys can communicate with one another, or observe data classified within their community-of-interest. That is, each community-of-interest key is associated with an end-user's community-of-interest (such as a position in a company or a security level), thereby allowing only end-users within the same group and having at least the same community-of-interest key to communicate with each other, or to gain access to data associated with that community-of-interest.

Of course, multiple community-of-interest keys can be distributed to individuals based on their membership and roles. It is conceivable that select end-users in each community-of-interest, may have more access to certain data, while others may have less ability to view or share data. The methods of this invention using communities-of-interest keys allows for the sharing or accessing of data to end-users whose computers have been preconfigured with appropriate community-of-interest keys.

Community-of-interest keys may also be installed on servers or other platforms within a network to protect sensitive data. Servers dedicated to a particular community-of-interest may only communicate with computing devices that have the same requisite community-of-interest keys installed therein. Otherwise no communication session can be established between a computing device and a server without both devices having the requisite key(s). Details regarding particular implementations in which a user device connects to server systems based on shared community-of-interest keys are described below.

Figure 4:
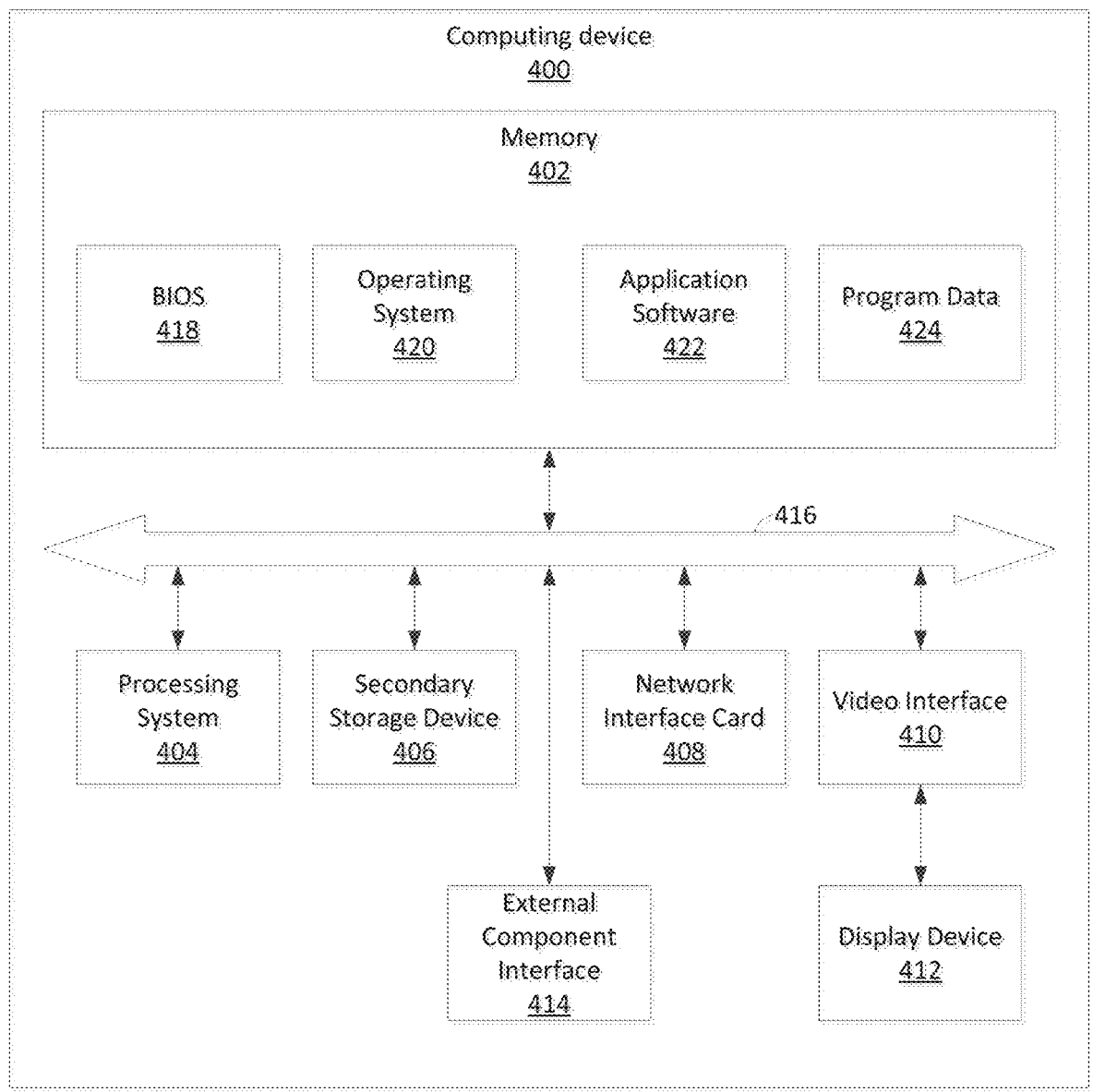
FIG. 4 illustrates an example logical computing environment in which an encryption key is used to encrypt a cryptographic data set transferred from a first computing device to a second computing device.
Figure 5:
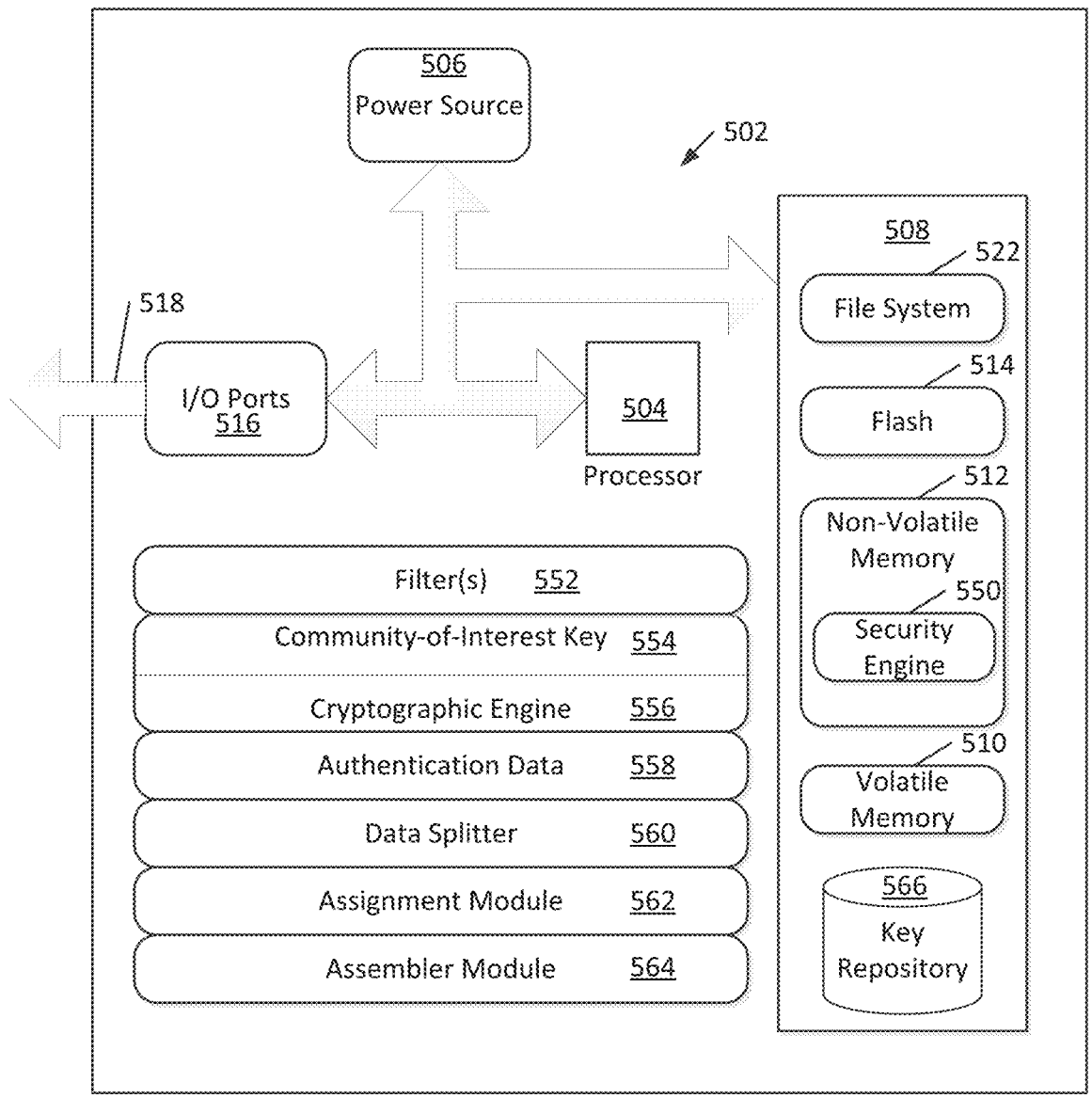
FIG. 5 illustrates a general purpose computing system for use in implementing as one or more computing embodiments of the present disclosure.
Figure 6:
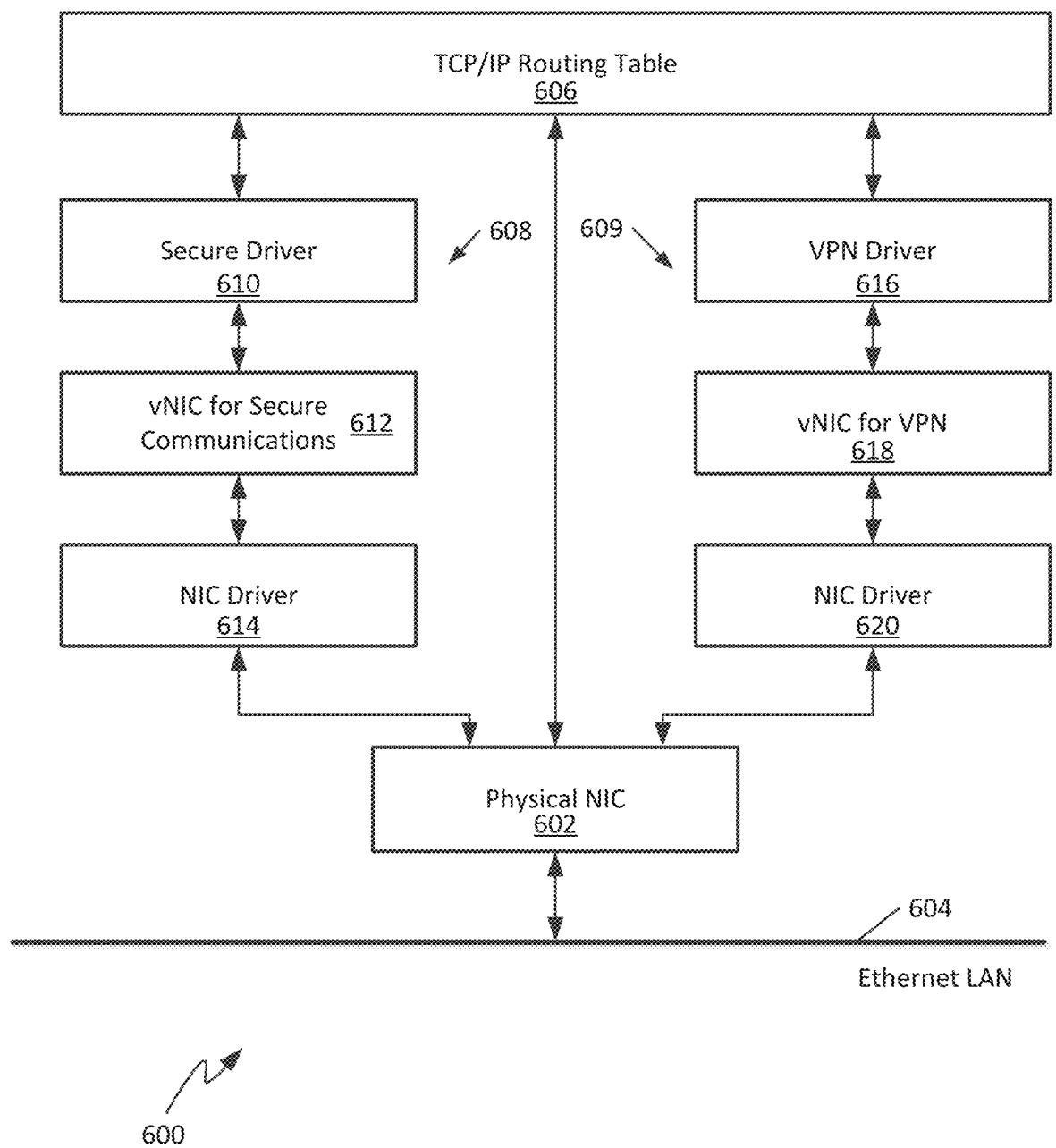
FIG. 6 illustrates an example communications infrastructure useable within a computing environment to manage secure and clear text communications, according to various aspects of the present disclosure.

Referring now to FIGS. 4-6, various components of a computing device are disclosed, with which aspects of the present disclosure can be implemented. With reference to FIGS. 4-5, exemplary physical and logical organizations of systems are shown in which aspects of the present disclosure can be implemented. Although some of the discussion below will focus on end-user equipment such as personal computers, the applicability of the present invention is not limited to end-user equipment, and may be used with other computing devices within a network. For example, computing devices according to the present disclosure may be other general or special purpose computing devices, such as, but not limited to, gateways, servers, routers, workstations, mobile devices (e.g., POA, cellular phone, etc.), and a combination of any of the above example devices, and other suitable intelligent devices.

FIG. 4 is a block diagram illustrating an example computing device 400, which can be used to implement aspects of the present disclosure, and upon which one or more of the server applications, operating systems, or authentication systems described herein can be executed. Generally, FIG. 4 illustrates an example physical system useable for implementing features of the present disclosure include a general-purpose computing device in the form of a conventional personal computer.

In the example of FIG. 4, the computing device 400 includes a memory 402, a processing system 404, a secondary storage device 406, a network interface card 408, a video interface 410, a display unit 412, an external component interface 414, and a communications medium 416. The memory 402 includes one or more computer storage media capable of storing data and/or instructions. In different embodiments, the memory 402 is implemented in different ways. For example, the memory 402 can be implemented using various types of computer storage media.

The processing system 404 includes one or more processing units. A processing unit is a physical device or article of manufacture comprising one or more integrated circuits that selectively execute software instructions. In various embodiments, the processing system 404 is implemented in various ways. For example, the processing system 404 can be implemented as one or more processing cores. In another example, the processing system 404 can include one or more separate microprocessors. In yet another example embodiment, the processing system 404 can include an application-specific integrated circuit (ASIC) that provides specific functionality. In yet another example, the processing system 404 provides specific functionality by using an ASIC and by executing computer-executable instructions.

The secondary storage device 406 includes one or more computer storage media. The secondary storage device 406 stores data and software instructions not directly accessible by the processing system 404. In other words, the processing system 404 performs an I/O operation to retrieve data and/or software instructions from the secondary storage device 406. In various embodiments, the secondary storage device 406 includes various types of computer storage media. For example, the secondary storage device 406 can include one or more magnetic disks, magnetic tape drives, optical discs, solid state memory devices, and/or other types of computer storage media.

The network interface card 408 enables the computing device 400 to send data to and receive data from a communication network. In different embodiments, the network interface card 408 is implemented in different ways. For example, the network interface card 408 can be implemented as an Ethernet interface, a token-ring network interface, a fiber optic network interface, a wireless network interface (e.g., WiFi, WiMax, etc.), or another type of network interface.

The video interface 410 enables the computing device 400 to output video information to the display unit 412. The display unit 412 can be various types of devices for displaying video information, such as a cathode-ray tube display, an LCD display panel, a plasma screen display panel, a touch-sensitive display panel, an LED screen, or a projector. The video interface 410 can communicate with the display unit 412 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 414 enables the computing device 400 to communicate with external devices. For example, the external component interface 414 can be a USB interface, a FireWire interface, a serial port interface, a parallel port interface, a PS/2 interface, and/or another type of interface that enables the computing device 400 to communicate with external devices. In various embodiments, the external component interface 414 enables the computing device 400 to communicate with various external components, such as external storage devices, input devices, speakers, modems, media player docks, other computing devices, scanners, digital cameras, and fingerprint readers.

The communications medium 416 facilitates communication among the hardware components of the computing device 400. In the example of FIG. 4, the communications medium 416 facilitates communication among the memory 402, the processing system 404, the secondary storage device 406, the network interface card 408, the video interface 410, and the external component interface 414. The communications medium 416 can be implemented in various ways. For example, the communications medium 416 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

The memory 402 stores various types of data and/or software instructions. For instance, in the example of FIG. 4, the memory 402 stores a Basic Input/Output System (BIOS) 418 and an operating system 420. The BIOS 418 includes a set of computer-executable instructions that, when executed by the processing system 404, cause the computing device 400 to boot up. The operating system 420 includes a set of computer-executable instructions that, when executed by the processing system 404, cause the computing device 400 to provide an operating system that coordinates the activities and sharing of resources of the computing device 400. Furthermore, the memory 402 stores application software 422. The application software 422 includes computer-executable instructions, that when executed by the processing system 404, cause the computing device 400 to provide one or more applications. The memory 402 also stores program data 424. The program data 424 is data used by programs that execute on the computing device 400.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

FIG. 5 illustrates an example arrangement of logical components of a general purpose computing device 500 for use in implementing as one or more computing embodiments of the present invention, and can be implemented within the hardware environment including computing device 400 illustrated in FIG. 4. In the embodiment shown, the computing device 500 includes a controller 502 including at least one processor 504, a power source 506, and memory 508, which can be as described above in connection with FIG. 4. In some implementations, volatile memory 510 is used as part of the computing device's cache, permitting application code and/or data to be accessed quickly and executed by processor 504. Memory 508 may also include non-volatile memory 512, as well as flash memory 514. It is also possible for other memory mediums (not shown) having various physical properties to be included as part of computing device 400.

A file system 522 may reside as a component in the form of computer-executable instructions and/or logic within memory 508, that when executed serves as a logical interface between code stored in flash memory 514 and other storage mediums. File system 522 is generally responsible for performing transactions on behalf of code stored in ROM or one or more applications. File system 522 may also assist in storing, retrieving, organizing files, and performing other related tasks associated with code and/or data. That is, file system 522 has the ability to read, write, erase, and manage files (applications, etc.). File system 522 may also include other applications such as web browsers, e-mail, applications, and other applications.

Computing device 400 may also include one or more Input/Output ports 516 to transmit and/or receive data. I/O ports 516 are typically connected in some fashion to controller 502 (processor 504 and memory 508). I/O ports 516 are usually at least partially implemented in hardware for connecting computing device 500 to a communication link 518, and may include wired as well as wireless capabilities. Communication link 518 may include any suitable connection means for handling the transportation of data to and from computing device 500, such as, but not limited to, cable, fiber optics, and wireless technology. Communication link 518 may also include network technology including portions of the Internet.

Stored within one or more portions of memory 508 is a security engine 550. That is, security engine 550 includes one or more sets of computer-executable code resident in a computer-readable medium such as memory 508. Security engine 550 performs security functions associated with transmitting, receiving, or storing data. These security functions may include encrypting data and decrypting data. Typically, cryptographic corresponding key pairs are installed in memory, such as an encryption key and decryption keys. However, it is appreciated that a corresponding cryptographic key may reside on another computing device. The keys may be public or private as would be appreciated by those skilled in the art. The keys may be generated using commercially available products or proprietary technology.

In one embodiment, security engine 550 includes one or more filters 552, which define permissions relating to secure communication by the computing device 500. By permissions, it is intended that one or more remote endpoints can be defined in a filter, and access to that endpoint can be either allowed or prevented based on an identity of a user.

In such an embodiment, security engine 550 also includes one or more community-of-interest keys 554, which are private and secret keys used for encrypting/decrypting other security keys in accordance with this invention. That is, community-of-interest keys 554 are used for transformation (encryption) of a second key (or additional keys), such as a session key, into a cryptographically split key, as well as for retransformation (decryption) of the second key back to its usable form.

A community-of-interest key 554 refers generally to an encryption key and/or corresponding decryption key, that may be assigned to a computing device 500 of an end-user based on an associated community-of-interest attributed to the end-user. For instance, end-users of a computing device 500, may also have one or more community-of-interest keys 554 installed on their computing device, based on their position or security level within an organization.

It is also possible to secure and segregate messages based on a category of a community-of-interest associated with the message using a corresponding community-of-interest key 554 (e.g., cryptographic pairs). Also, unlike private/public key pairs, community-of-interest keys 554 are usually installed or generated before a transaction to increase security, rather than receiving and generating the key on-the-fly during a transaction, in which the key can be intercepted. Community-of-interest keys 554 may be stored in a key repository 566, which is a storage area in memory 508. Filters 552 can also be stored in memory 508.

In some embodiments, each community-of-interest key 554 has an associated filter 552, such that a set of endpoint access permissions are included with each community of interest. In such embodiments, the filter associated with a community-of-interest key 554. Example community of interest keys can include a secure community of interest key 554, that may have an associated filter defining one or more endpoints and/or gateway devices associated with that community of interest and excluding communication with any unsecured sites, or a clear text filter that would allow clear text communication with external, publicly available and unsecured systems (e.g., via the internet). In the example of the clear text filter, such a filter could include one or more exclusionary permissions preventing clear text communication to secured endpoints or gateway devices normally requiring cryptographically-secured communication. Additional details regarding example key and filter arrangements are discussed below in conjunction with FIGS. 17-21.

Security engine 550 may also include a cryptographic engine 556 for generating cryptographic keys and other information used to encrypt or decrypt messages, as well as route data to a target device. In one embodiment, cryptographic engine 556 generates a cryptographic data set, which may include one or more session keys which are used for encrypting/decrypting one message or a group of messages when computing device 500 is in a communication session with another device.

Security engine 550 may also include other authentication data and code 558, used for purposes of authenticating data or information, such as passwords, recorded biometric information, digital certificates, and other security information. As is appreciated by those skilled in the art after having the benefit of this disclosure, it is possible that there may be various combinations of keys and authentication data in security engine 550.

Although described in terms of code, the exemplary security engine 550 may be implemented in hardware, software, or combinations of hardware and software. Additionally, all components of security engine 550 may be communicatively coupled to each other through controller 502. As would be appreciated by those skilled in the art, many of the components of security engine 550 may be stored and identified as files under control of file system 522.

Security engine 550 may also include a data splitter module 560 for splitting data that is to be transmitted from computing device 500. Typically, security engine 550 relies on a community-of-interest key and/or cryptographic engine 556 to determine how to split and encrypt data. Data splitter module 560 divides data into portions of data. A portion of data is any bit or combination of bits of data that comprise a larger set of data, such as a message or a portion of a cryptographic data set (a second key). A portion of data may be encapsulated in packets for transport, but the content of the data may be fixed or of a variable bit length. Accordingly, a portion of data (such as a portion of message or portion of cryptographic data set) corresponds to one or more bits comprising data content, i.e., payload as opposed to a data header message. Data splitter module 560 may be configured to produce predetermined bit length portions of data or it may be determined dynamically in an automatic fashion.

Security engine 550 may also include an assignment module 562. Assignment module 562 assigns tags to each portion of data (portion of a message or key). Each tag contains metadata indicating a traffic path (to be described) a particular portion of data is to be distributed through one or more networks to another computing device 400. Other metadata may be included in the tags, such as information identifying the network the portion of data originated, the client device destination, possibly the order of the portion of data in relation to other portions of data emitted from the same network, and other suitable information.

Security engine 550 may also include an assembler module 564 configured to reassemble portions of data received at different times, and/or via different data paths. Once data is reassembled, authorized assets and messages appear accessible in plaintext format from the end-users perspective. It is noted that various security techniques may be employed on computing device 500 to prevent the user from saving data, mixing different levels of data, or sending the data to other locations for dissemination to another network, such as via email or other electronic transfer means. Applications may also execute on separate physical and/or logical partitions within computing device 500.

Additional details regarding the security engine and cryptographic data sets generated using the security engine are discussed in U.S. Patent Application No. 60/648,531; Ser. Nos. 11/339,974; 11/714,590; 11/714,666; and Ser. No. 11/714,598, which were previously incorporated by reference in their entireties.

FIG. 6 illustrates an example communications infrastructure 600 useable within a computing environment to manage both secure and clear text communications channels, according to various aspects of the present disclosure. The communications infrastructure 600 can be implemented within the computing device 400, 500 of FIGS. 4-5, for example using the operating system 420, application software 422, and program data 424 to managing operation of network interface or adapter 408 of FIG. 4, and for example as at least in part implemented using security engine 550 of FIG. 5.

In the embodiment shown, the communications infrastructure 600 includes a physical network interface card 602 communicatively interconnected to a network 604, illustrated in this embodiment as an Ethernet local area network (LAN). The physical network interface card 602 is generally a piece of communications hardware included within the computing system, and can be, in one embodiment, the network interface adapter 452 of FIG. 4.

The communications infrastructure 600 includes a routing table 606, which defines one or more local and remote IP addresses used to communicate messages between a computing system incorporating the communications infrastructure 600 and a remote computing system. For example, the routing table 606 can include a default route, local network and broadcast addresses, as well as one or more network masks, gateways, and other points of interest.

In general, when a computing system intends to transmit clear text data using the physical network interface card 602, that system will determine an address using the routing table 606 and form a packet to be forwarded to the physical network interface card 602 for communication via network 604. In accordance with the present disclosure, to separate secure data communications from standard clear text communications, a dedicated communication stack can be used for each of one or more types of secured communication.

In the embodiment shown, and as discussed in further detail in various embodiments of the present disclosure below, the communications infrastructure 600 includes a first secure software stack 608 and a second secure software stack 609, each useable to communicate over a secured connection to a remote system. The first secure software stack 608 that includes a secure communications driver 610, a virtual secure network interface card 612, and a network interface card driver 614.

The secure communications driver 610 receives data to be transmitted via a secured communication method (e.g., as described in FIGS. 7-10, below), and an address from the routing table 606, and generates one or more packets of encrypted data to be transmitted. In some embodiments, as discussed further below, the secure communications driver uses one or more filters to determine whether secured (split and encrypted) data packets can be sent or received to/from a particular network address, and to determine whether secure or clear text data packets can be accepted at the computing system implementing the communications infrastructure 600. For example, if a data packet or message is received at the virtual secure network interface card 612 from an endpoint not included in an access list of a filter that defines permissions to that endpoint or client device, the secure communications driver 610 will discard that packet, preventing it from reaching an application to which it would otherwise be addressed or intended. Likewise, the secure communications driver 610 can prevent communication of data packets to remote endpoint systems not authorized by the access lists in one or more filters defined in the computing device.

The virtual secure network interface card 612 acts as a virtual version of the physical network interface card 602, in that it receives data packets formed at the secure communications driver 610 and instructions for where and how to transport those data packets. In certain embodiments, the secure communications driver 610 acts analogously to a hardware driver, but acts on the virtual secure network interface card 612.

The network interface card driver 614 provides the link between the virtual secure network interface card 612, and physical network interface card 602 to allow communication of secured data packets with a remote system (e.g., an endpoint, gateway, or other remote system). In certain embodiments, the network interface card driver 614 acts as a piece of hardware to the operating system of the computer implementing the communications infrastructure 600, for example to host the virtual secure network interface card 612, and allow applications to transmit data via that piece of virtual hardware.

In the embodiment shown, an optional second software stack 609 is also shown, which can be used concurrently with the first secure software stack 608. In the embodiment shown, the second software stack is configured to allow a different type of security, in which security is not provided by data obfuscation on a packet-by-packet basis, but rather by creating a secured connection to a dedicated endpoint. In the example embodiment shown, this second software stack 609 is configured to manage communication via a virtual private network (VPN) connection, where a secure tunnel is formed between the computing system operating the communications infrastructure 600 and a predetermined, known gateway. In this embodiment, the second software stack 609 includes a VPN driver 616, a virtual VPN network interface card 618, and a VPN communications driver 620. The VPN driver 616 generates instructions for communication with a particular VPN gateway, and for constructing a secure tunnel between the computing system implementing the communications infrastructure 600 and the VPN gateway (e.g., as illustrated below in connection with FIG. 20). The virtual VPN network interface card 618, like the virtual secure network interface card 612, acts as a virtual version of the physical network interface card 602, in that it receives data packets formed at the VPN driver 616 and instructions for where and how to transport those data packets (e.g., via a secure tunnel). The virtual VPN network interface card 618, similar to the network interface card driver 614 acts as a piece of hardware to the operating system of the computer implementing the communications infrastructure 600, for example to host the virtual VPN network interface card 618, and allow applications to transmit data via that piece of virtual hardware to remote systems.

Figure 7:
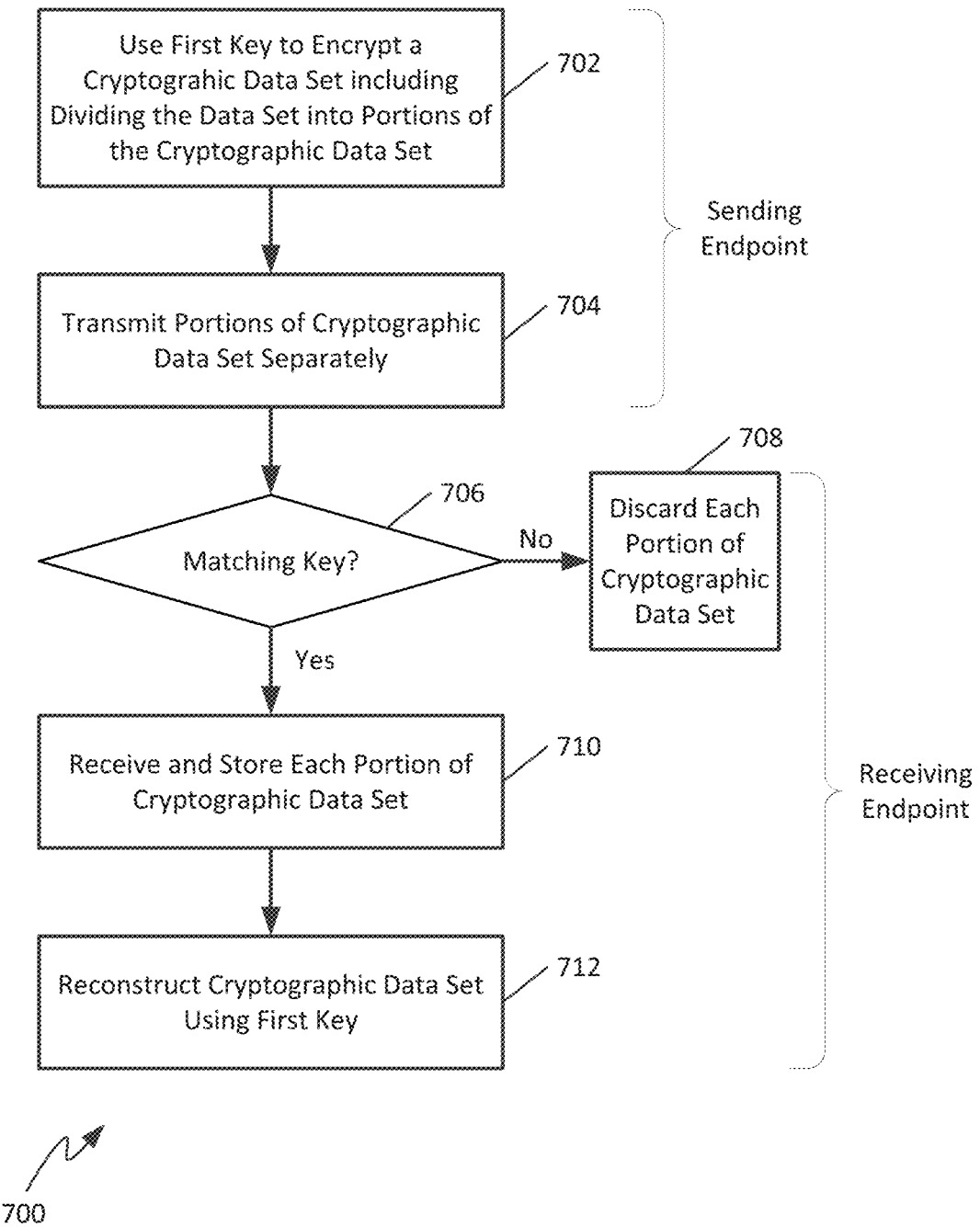
FIG. 7 illustrates an exemplary method for securely transmitting a cryptographic data set among logically partitioned data paths.
Figure 8:
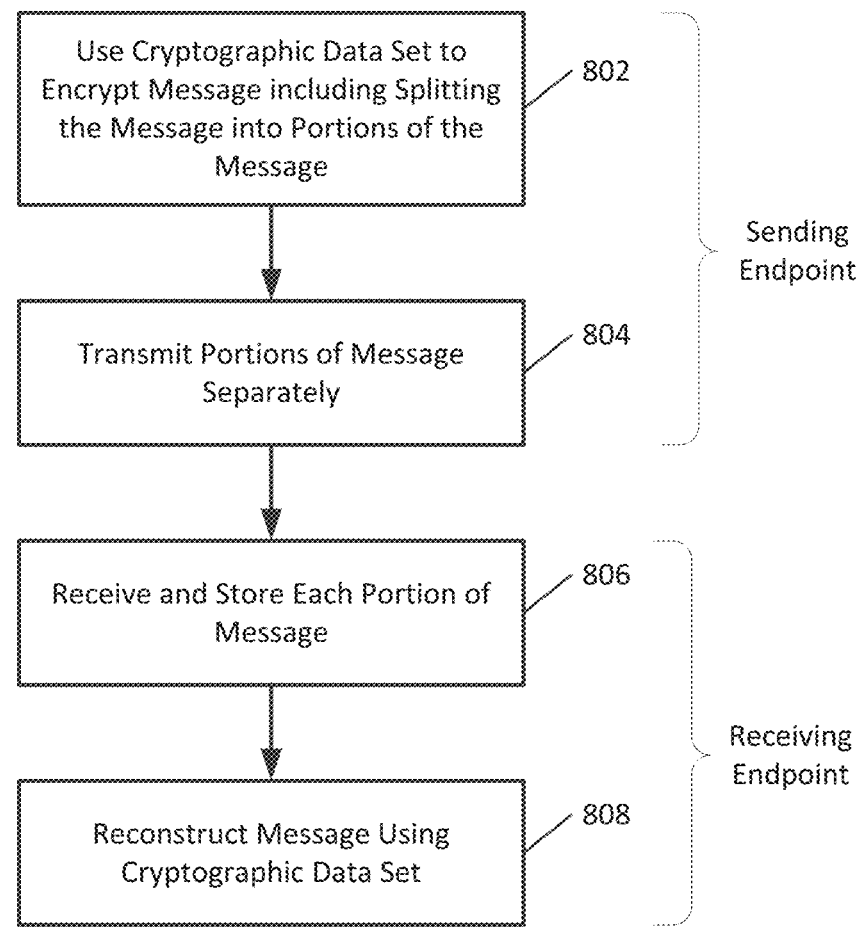
FIG. 8 illustrates an exemplary method for securely transmitting a message among logically partitioned data paths.
Figure 9:
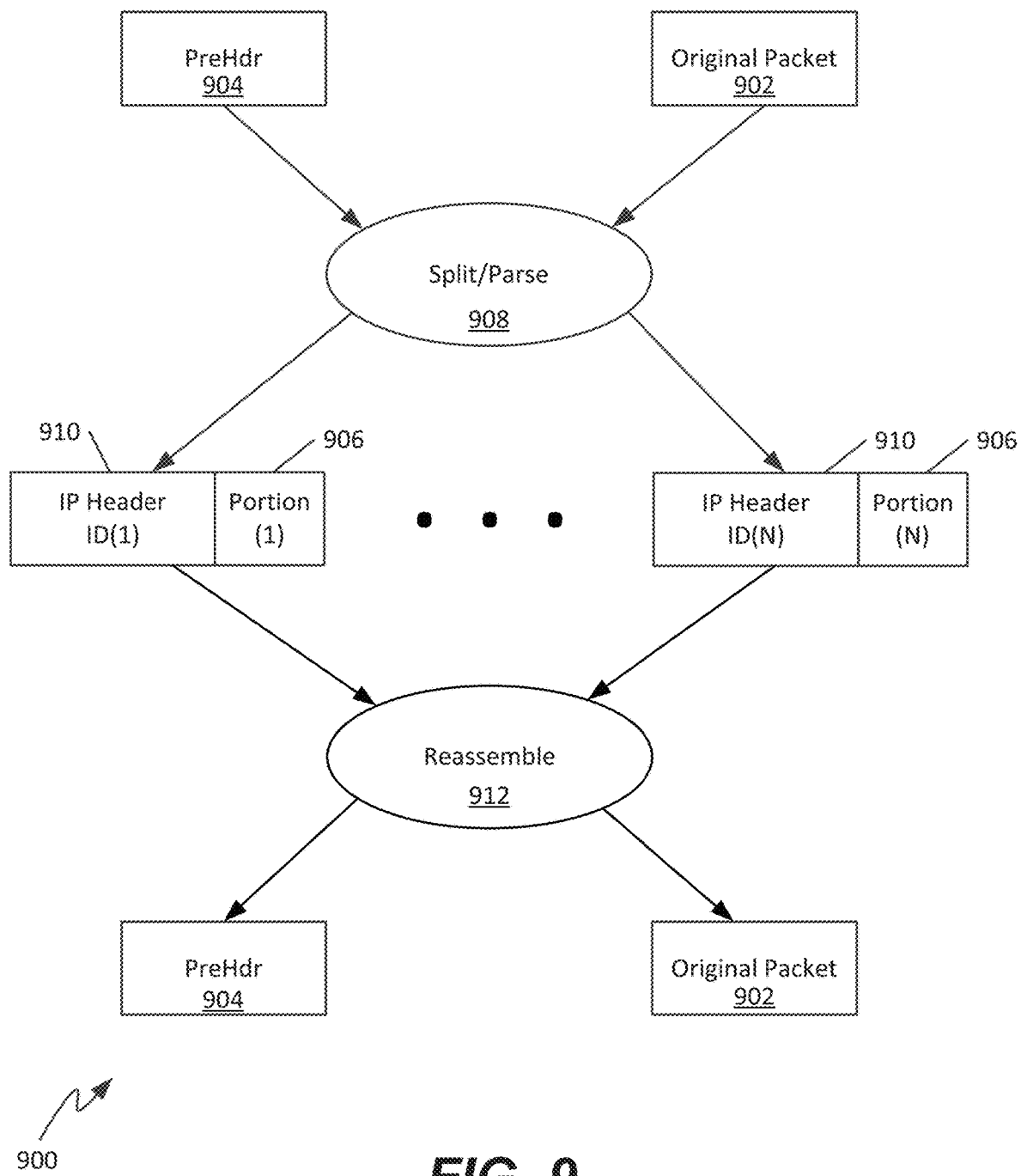
FIG. 9 illustrates an overall logical flow of how an original packet is containing a cryptographic data set, or message, is concatenated with preheader and then split into portions which are appended with an IP header containing a value indicating which set of data the portion belongs.

Overall, and referring to FIGS. 1-6 generally, it is noted that the computing systems and generalized example networks of the present disclosure generally provide infrastructure for receipt and management of encryption keys specific to one or more communities-of-interest, and distributed use of algorithms for encrypting and splitting data into obscured data packets such that only those individuals having access rights to that data can in fact reformulate the data upon receipt of those data packets. FIGS. 7-9 below briefly describe methods and arrangements for treatment of data packets sent and received from a gateway, endpoint, or other computing device configured for secured communication using the cryptographic splitting and virtual network arrangements of the present disclosure.

II. Methods for Secure Communication

Referring now to FIGS. 7-9, methods and systems for securely transmitting data packets between computing systems are disclosed. Generally, the methods and systems illustrated in FIGS. 7-10 provide a brief overview of methods of handling data packets sent and received using the computing systems and networks described herein, for example those discussed above with respect to FIGS. 1-6. Additional details regarding these methods and systems are disclosed in the U.S. Patent Application No. 60/648,531; Ser. Nos. 11/339,974; 11/714,590; 11/714,666; and Ser. No. 11/714,598, listed above and previously incorporated by reference.

As used herein, a "message" or "data packet" refers generally to any set of data sent from one node to another node in a network. A message may include different forms of data usually in some form of a payload. A message may be an e-mail, a video stream, pictures, text documents, word processing documents, web-based content, instant messages, and various other forms of data that when in plain text, or clear form, may reveal confidential and sensitive information. In most instances, this invention is concerned with securing data-in-motion, or in other words, cryptographic data or messages sent from one node to another node such as data traveling from one location to another within one or more networks which may include the Internet.

FIG. 7 illustrates an exemplary method 700 for securely transmitting a cryptographic data set among logically partitioned data paths. The cryptographic data set can include, for example one or more encryption keys, filters, and other information useable at an endpoint or other computing device to enable that device to establish secure communication with a remote system (e.g., another endpoint, a gateway, or any other remote device configured for cryptographically split communication).

In this method, in block 702, a cryptographic data set is divided into a plurality of portions, and tag values are assigned to each portion of the set. Each portion is encapsulated in separate packets. In block 704, the portions of cryptographic data set are transmitted from an egress point of a computing device, such as a network interface card as discussed above in conjunction with FIG. 6. On the receiving endpoint, in block 706, each portion of cryptographic data is received by a target computing device. In one embodiment, as the packets received include a new community-of-interest key identifier embedded therein. In another embodiment, newly received packets do not include such a key identifier, and instead the receiving endpoint attempts to restore (reassemble) a cryptographic data portion encapsulated in a payload portion of the packet using a community-of-interest key accessed from the receiving computing device's repository. If there is only one community-of-interest key present in the repository, the receiving computing will attempt to reassemble the cryptographic data portion(s) using the single key. If there are more than one community-of-interest key in the receiving computing device's repository, the receiving computing device will iteratively try each key until it locates a key which is able to reassemble the cryptographic data portion(s).

However, if no identifier match is located in block 706, in Step 708 each packet and hence portion of cryptographic data set received by the target device is discarded, erased, and/or ignored. This may represent a situation where the end-user of an endpoint does not have authorization to view a message, because the end-user (or the end-user's computing device) lacks the requisite community-of-interest key, or if the transmitting computing device is not included in a listing of permitted devices at the target device.

If according to the Yes branch of block 706, a community-of-interest key matching the identifier is located, or a community-of-interest key is identified which is able to restore the payload portion of the packet(s), then in block 710 each portion of the cryptographic data set is temporarily stored for eventual reassembly. At this point a tunnel can be established between the sending and receiving computing devices.

In block 712, the cryptographic data set is decrypted. That is, the cryptographic data set is reconstructed (reassembled) by decrypting each portion of the cryptographic data set using the community-in-interest key identified in block 710. Once all portions of cryptographic data set are received, it is possible to fully reassemble the cryptographic data set on the receiving computing device. The cryptographic data set is in a usable form for use to decrypt portions of a message received, which will be described with reference to FIG. 8.

FIG. 8 illustrates an exemplary method 800 for securely transmitting a message among logically partitioned data paths, according to a possible embodiment. Generally, method 800 occurs after a secure tunnel has been created, to allow transmission between two computing systems. Method 800 includes blocks 802, 804, 806, and 808 (each of the blocks represents one or more operational acts). The order in which the method is described is not to be construed as a limitation, and any number of the described method blocks can be combined in any order to implement the method. Furthermore, the method can be implemented in any suitable hardware, software, firmware, or combination thereof.

In block 802, a message is divided into portions, and tag values are assigned to each portion of the set. Each portion is encapsulated in separate packets using a cryptographic data set at the sending computing device. For example, in one embodiment, an assignment module 562 (FIG. 5) uses a cryptographic data set stored at the sending computing device (or as received, according to the method 700 of FIG. 7) to assign tags to each portion of the message. Each tag contains metadata indicating a traffic path a particular portion of a message is to follow to a target computing device within a network.

In block 804, the portions of cryptographic data set are transmitted from an egress point of a computing device. For example, portions of cryptographic data set are transmitted from an I/O port 516 of computing device 500, separately. In one embodiment, transmitting the portions separately may include transmitting at least one portion of the message at a different instance in time than at least another portion of the message. In one embodiment, transmitting the portions of the message separately includes transmitting at least two different portions of the message on at least two different data communication paths. For example, computing device 500 assigns a portion of message to a particular data path based on the tag value. Tag values assigned to each portion of cryptographic data may correspond to a particular communication data path, to transmit the portion of cryptographic data set. In block 806, each portion of the message set is temporarily stored for eventual reassembly in some portion of memory 508 (FIG. 5) of a computing device.

In block 808, the message is put into a useable form. That is, the message is reconstructed (reassembled) by decrypting each portion of the message using the cryptographic data set. For example, security engine 550 (FIG. 5) may use an assembler module 564 (FIG. 5) in conjunction with a cryptographic data set to reassemble portions of message received at different times, and/or via different data paths. Once all portions of the message are received, it is possible to fully reassemble the message in a usable form on the receiving computing device.

FIG. 9 illustrates an overall logical flow of how an original message or cryptographic data set (e.g., as in FIGS. 7-8, above) is split and encrypted according to the various embodiments discussed herein. As illustrated, an original message 902 is combined with a preheader 904, and split into portions 906 by a splitting function 908. The splitting function 908 also acts to encrypt each of the portions, such that each portion contains an obfuscated portion of the original message 902. Each of the portions 906 are appended with an IP header 910. The IP header 910 of each split portion identifies the set of data to which the portion 906 belongs. The various portions can then be passed from a first computing system to a second computing system via a number of different routes, with the second computing system having a capability of reassembling that original message 902 (for example, due to possession of a complementary community-of-interest key or cryptographic data set) at a reassembly function 912. In various embodiments, the splitting function 908 and reassembly function 912 can be performed, for example, by a security engine, such as security engine 550 of FIG. 5, on an authorized transmitting and receiving computing device, respectively. In certain embodiments, the splitting function 908 and reassembly function 912 use a strong encryption standard, such as AES-256 encryption. Other types of encryption standards and data splitting/dispersal operations could be used as well.

III. Transaction Security Using a Secure Boot Device

Referring now to FIGS. 10-16, a particular embodiment of the distributed systems discussed above is disclosed in which a secure connection can be established across a public network, such as the internet. In this embodiment, generally a secure boot device can be used to create a secure environment at an otherwise untrusted computing device, which can in turn remotely access a trusted computing device. Such an embodiment can be used, for example, to provide a secure portal to a centralized transaction processor, such as a banking institution, a governmental institution, or other entity where in-transit data security is important.

Figure 10:
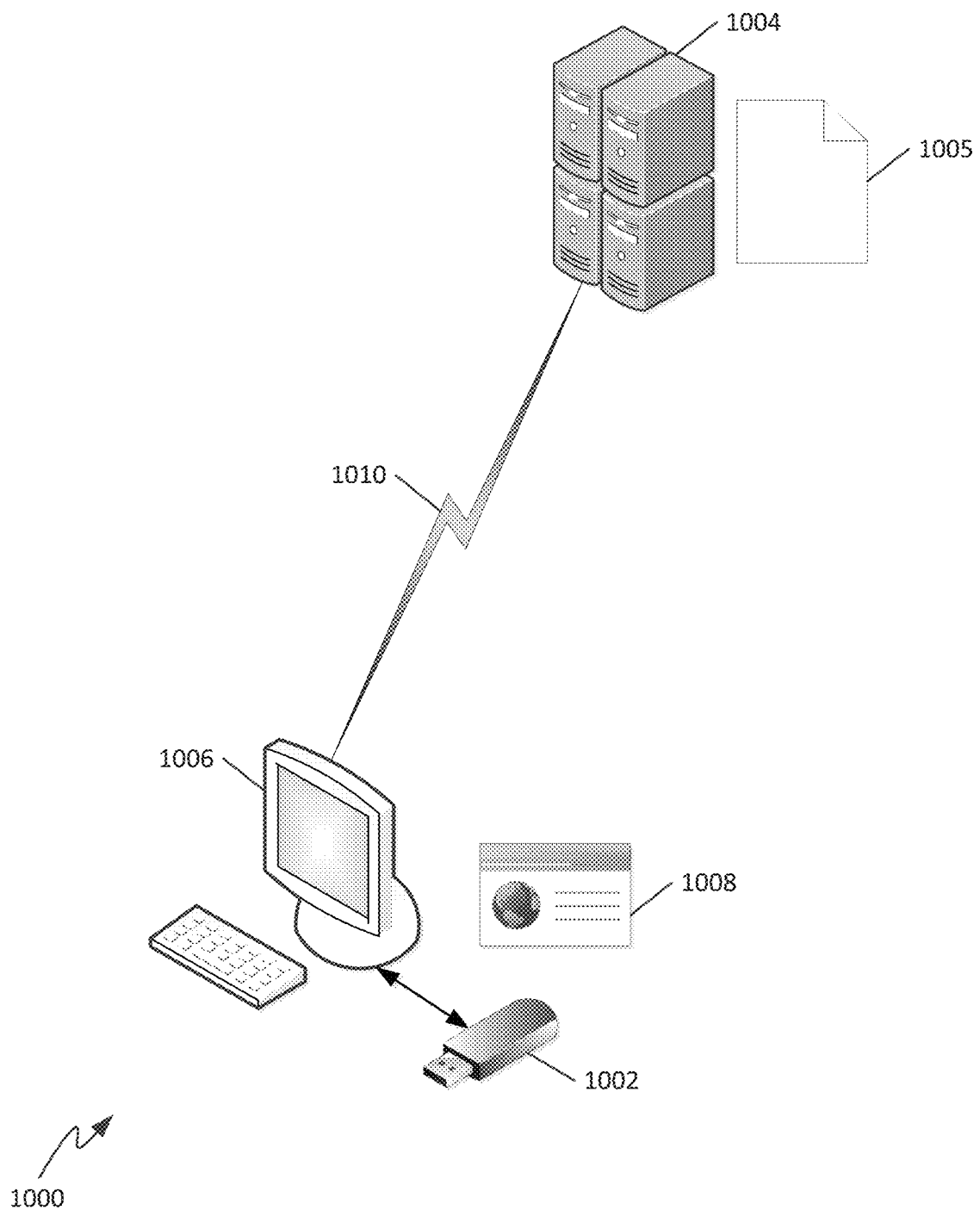
FIG. 10 illustrates a distributed system using a secure boot device according to another embodiment of the present disclosure.

Referring now specifically to FIG. 10, a generalized example of a distributed system 1000 is shown, using a secure boot device 1002, according to a possible embodiment of the present disclosure. In the embodiment shown, the distributed system 1000 includes a server 1004, such as a banking or government server. The distributed system also includes one or more remote computer systems 1006, for example customer-owned, employee-owned, or otherwise uncontrolled systems. The server 1004 can be any of a number of types of server systems capable of receiving transactions from the one or more remote computer systems 1006, such as a web server or database server. In alternative embodiments include more than one server and/or computer system 1006.

In certain embodiments, a client computer system 1006, also referred to herein as an endpoint or client computing device, can display a user interface, such as web page 1008. The web page 1008 or other user interface can display to a user details of a transaction 1005 taking place at the server 1004, for example a financial transaction in the case that the server 1004 is a banking server, or some other type of transaction relating to an entity for which highly secure communications are desired. A secure connection 1010 is created between the client computer system 1006 and the server 1004 to allow transmission of details regarding the transaction over a public network, such as the internet.

In order to create the secure connection 1010 in a form that may be trusted by the server 1004, in certain embodiments the client computer system 1006 boots an operating system that is stored on a secure boot device 1002 attached to the client computer system 1006. This secure boot device 1002 stores a trusted version of operating system software and secure communications software used when the client computer system 1006 establishes and performs the communications with the server 1004. In one embodiment, the secure boot device 1002 may correspond to a USB storage device such as a Stealth M500™ from MXI Security. A copy of the datasheet for the MXY M500 device is submitted alongside this application, and incorporated by reference herein in its entirety. In such embodiments, the client computer system 1006 is a USB-bootable computing system capable of communication with a remote system, such as server 1004, or a gateway providing access to the server having capabilities of communicating using the cryptographic splitting operations discussed herein.

The secure boot device 1002 provides secure storage that prevents tampering with the software loaded onto the device. This secure storage permits the institution operating the server 1004, such as a bank or other financial institution, to load onto the secure storage a set of trusted software modules that may limit the possible operations that a client computer system 1006 may perform. For example, the software modules can be configured to prevent the client computer system 1006 from accessing non-secured network resources, and can limit other peripheral communication channels (e.g., Bluetooth, serial connections, or other peripheral device connections), as well as prevent the client computer system 1006 from executing application programs stored in a memory of the system itself. As such, the transactions 1005 may be trusted by both the user at the client computer system 1006, and the institution controlling the server 1004. In addition, the establishment of the secure connection 1010 between the client computer system 1006 and the server 1004 may be authenticated using identification information stored upon the secure storage (e.g., a community-of-interest key) to increase the level of trust that the user corresponds to a customer of the bank.

Figure 11A:
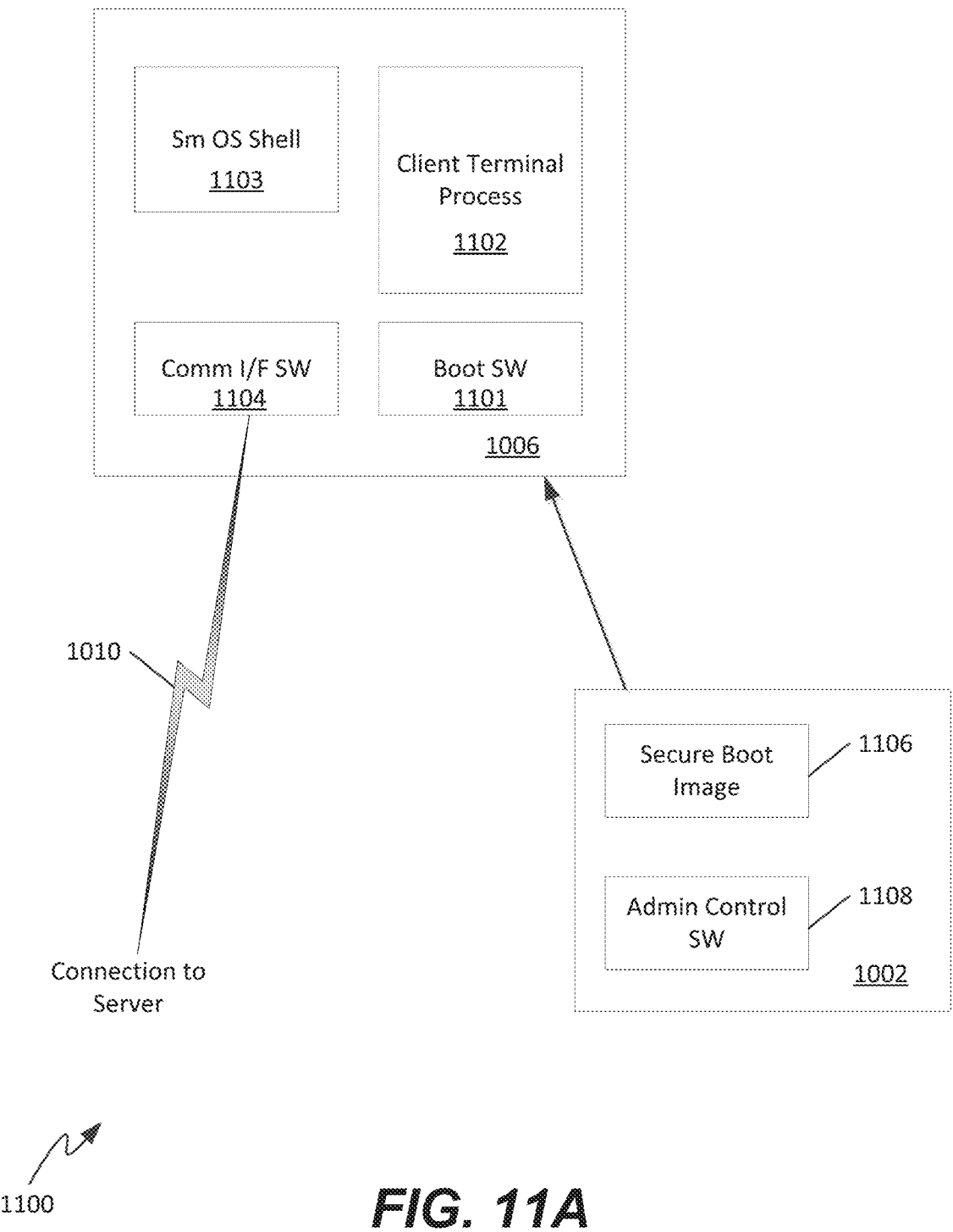
FIG. 11A illustrates a set of processing modules stored on a secure boot device according to yet another embodiment of the present disclosure.

FIG. 11A illustrates a set of processing modules 1100 stored on a secure boot device 1002 according to yet another embodiment of the present invention. The set of processing modules 1100 are preferably stored in a read-write portion of memory of a secure boot device that can, for example, be updated by a trusted network resource, as discussed below. When a user wishes to establish a secure connection 1010 to a server 1004 using a client computer system 1006, the user boots the client computer system 1006 from the secure boot device 1002. To ensure that the client computer system 1006 poses a minimized threat of harm to the server 1004, a minimal set of software modules 1101-1104 are loaded when the client computer system 1006 boots from the secure boot device 1002. This minimal set of software modules include boot software 1101, a client terminal process module 1102, a small OS shell 1103 and secure communications interface software module 1104. Other modules could be included as well.

In some embodiments, each of these modules 1101-1104 are read from a secure boot image 1106 on the secure boot device 1002 at boot time of the client computer system 1006. These modules 1101-1104 are stored within the RAM of the client computer system 1006 and executed while the user communicates with the server 1004. Although in some embodiments, modules 1101-1104 can be located in a read-only portion of memory of the secure boot device 1002 and loaded from that location when the client computer system 1006 is booted from the secure boot device, in other embodiments, the modules 1101-1104 are stored in a read-write memory, allowing the modules 1101-1104 to be updated in parallel with execution from copies of the modules stored in RAM on the client computer system 1006. Details regarding this feature are described in greater detail below.

The boot software 1101 comprises the software modules needed to load the other software modules into the RAM of the client computer system 1006. This module ensures that the secure boot image is a valid image before the modules are loaded. It may perform consistency checks to verify that the modules have not been modified prior to loading and use.

The client terminal process module 1102 comprises the process that provides a user interface to the user of the client computer system 1006 as well as communications to the server 1004. In various embodiments of the present disclosure, the client terminal process module 1102 creates a communications session, accepts commands and inputs from the user, and interacts with remote resources, such as web services or other data communication services, on the server 1004 to permit the user to perform transactions 1005. In various embodiments, this process may include a web browser or other file access mechanism for interaction with a server using known Internet based protocols. In other embodiments, the client terminal process module 1102 may be a specialized client application that performs similar communications and user controls. The client terminal process module 1102 may limit a user's ability to input destination URLs and related server addresses into a browser, thereby allowing only use of one or more addresses preloaded into the secure boot device 1002 as an example additional mechanism to enhance security.

The small OS shell 1103 comprises a stripped down version of a standard operating system such as Linux™. For example, the small OS shell 1103 can in some embodiments include only the supporting modules and drivers necessary to support the client terminal process module 1102 and the communications interface module 1104 used to establish and utilize the secure connection 1010 to the server 1004. All other modules that typically are included in an operating system to permit the general purpose use of the client computer system 1006 as well as to initiate the execution of any program stored on the client computer system 1006 can be omitted. In one embodiment, the client terminal process module 1102 will begin execution at the end of the boot process, and thus provide the only means by which the user may use the client computer system 1006 during its operation.

The communications interface software modules 1104 performs the secure communications with between the client computer system 1006 and the server 1004 and any security related processing. This may include, for example, encryption and parsing as defined in the previously identified patent applications that have been incorporated herein. This module may also be involved in the authentication of the client computer system 1006 to the server 1004 as well as its current operation in a secure and trusted state after having booted from the secure boot device 1002.

Figure 11B:
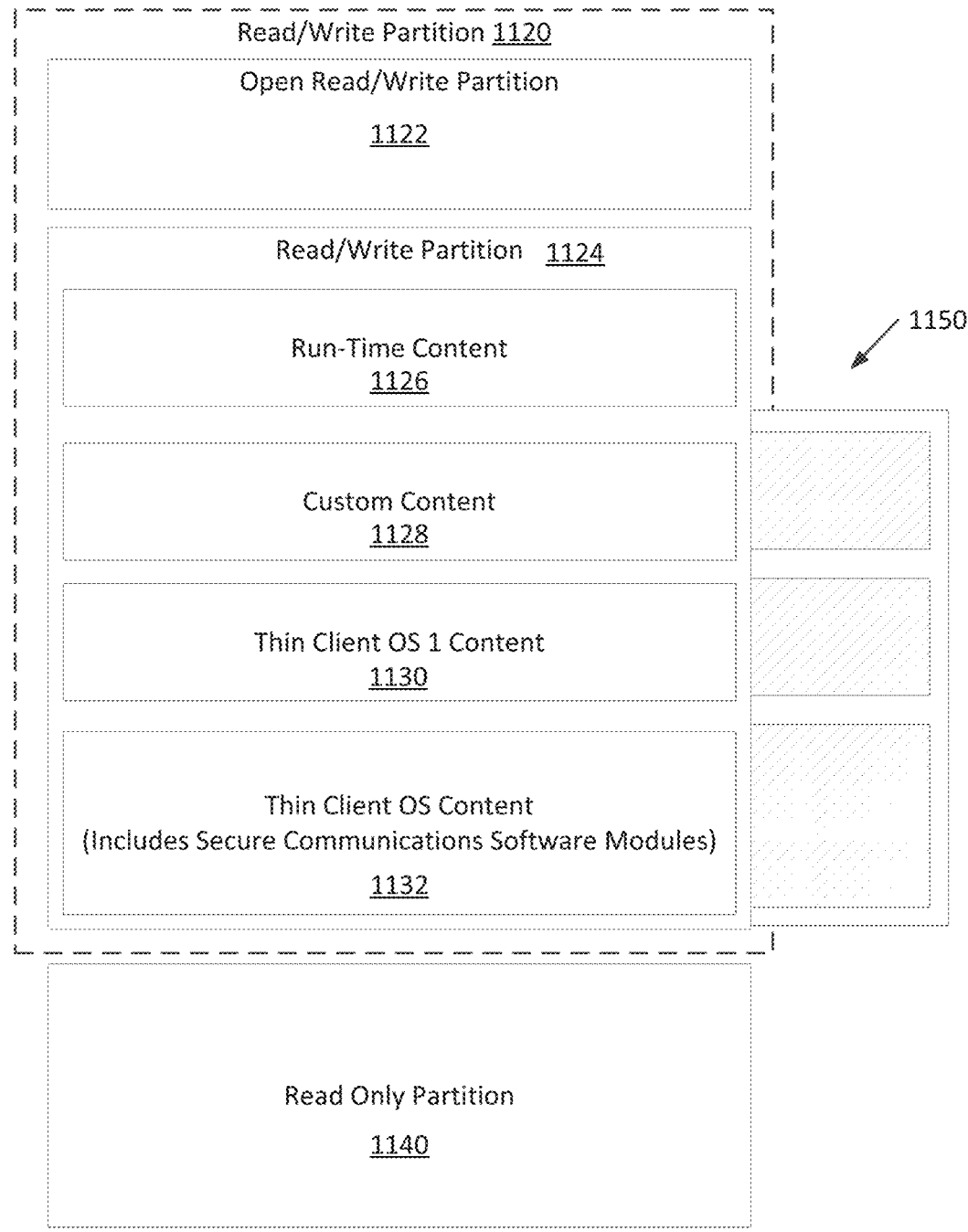
FIG. 11B illustrates an example arrangement of memory of a secure boot device for storing the set of trusted modules on the secure boot device of FIG. 10.

FIG. 11B illustrates storage and management of one or more processing modules, such as modules 1101-1104, on the secure boot device 1002. In the embodiment shown, the secure boot device includes a read/write memory 1120 and a read-only memory 1140. The read/write memory 1120 includes an open read/write portion 1122 and a dedicated read/write portion 1124. In certain embodiments, the open read/write portion 1122, the dedicated read/write portion 1124, and the read-only memory 1140 are viewable to a user of a computing device as separate logical memory spaces (e.g., separate drives); however, in other embodiments, these partitions could be considered separate directories or otherwise logically distinct.

The open read/write portion 1122 generally is useable by a user to store unsecured files, such as documents or files retrieved from websites by that user while using the secure boot device. In some embodiments, the open read/write portion 1122 is accessible for storage only when the secure boot device 1002 is used to boot a computing system to which it is connected; in other embodiments, the open read/write portion 1122 operates as a traditional storage device when the secure boot device 1002 is inserted into such a computing system.

The dedicated read/write portion 1124 includes a plurality of software module storage areas in which different types of software can be stored. In the embodiment shown, the dedicated read/write portion 1124 includes a runtime content area 1126, a custom content area 1128, and first and second thin client operating system areas 1130, 1132. In alternative embodiments, other storage areas could be used as well. Additionally, in the embodiment shown, the dedicated read/write portion 1124 can be secured using a private partition key which can be used to decrypt the data in the dedicated read/write portion 1124 upon receipt of a PIN or other credential.

In the embodiment shown, the runtime content area 1126 stores configuration information used locally on the secure boot device to indicate a configuration of the local device to be used when a computing system is launched using the secure boot device. In certain embodiments, the runtime content area is password protected, preventing an unauthorized user of the secure boot device 1002 from accessing this configuration information, or rebooting a computing system using the secure boot device.

The custom content area 1128 stores specific provisioning information, for example a location of a secure server to connect to, as well as various options for connection. The custom content area 1128 can also optionally store branding information, for example to indicate the particular customer or entity distributing the secure boot device 1002 to its employee or affiliate.

A first thin client operating system area 1130 can store a thin client version of an operating system, as well as one or more applications capable of running on that operating system. In some embodiments, the first thin client operating system area 1130 stores an embedded version of an operating system, such as Windows XP Embedded, from Microsoft Corporation of Redmond, Wash. Other embedded operating systems could be used as well. In some embodiments, the first thin client operating system area 1130 also stores other application data, such as could be used to access remote websites or other remotely networked resources. One example of such an application is an Internet Explorer web browser provided by Microsoft Corporation of Redmond, Wash. Other applications could be included as well.

The second thin client operating system area 1132 stores a second thin client version of an operating system applications capable of running on that operating system, as well as optionally one or more security modules configured to provide application-level access to security features useable on a computing system booted from a secure boot device 1002. In this embodiment, the second thin client operating system area 1132 can store, for example, an open source thin client operating system (e.g., Linux-based), as well as virtualization software, remote desktop software, and browser software (e.g., Firefox or Chrome web browsers). The second thin client operating system area 1132 can also optionally store one or more security applications allowing a user to control the secure connection established with a remote server. For example, the second thin client operating system area 1132 can include Stealth applications and driver software, as well as a remote update agent configured to manage updating of software on the secure boot device 1002 in accordance with the methods and systems described below in conjunction with FIGS. 22-25.

The read-only memory 1140 stores one or more utilities intended to be used to establish secure connections, such as libraries and utilities configured to establish a cryptographically split connection with one or more servers. In certain embodiments, the read-only memory 1140 stores an operating system kernel useable with thin client operating system software stored in the second thin client operating system area 1132. Additionally, in the embodiment shown, the read-only memory 1140 can be secured using a private partition key which can be used to decrypt the data in the read-only memory 1140 upon receipt of a PIN or other credential.

In some embodiments, in particular those described below in which update of the secure boot device 1002 is performed, the dedicated read/write portion 1124 also includes a replacement area 1150 for one or more portions of the software stored therein. In the embodiment shown, a replacement custom content area 1128, and first and second thin client operating system areas 1130, 1132 are shown. In such embodiments, these portions can be updated from a remote system, such as a remote update server or update enclave. Update agent software stored in the second thin client operating system area 1132 can be used to track the status of an update, such that the replacement software modules can be substituted for the active software modules once fully downloaded from a remote system.

Figure 12:
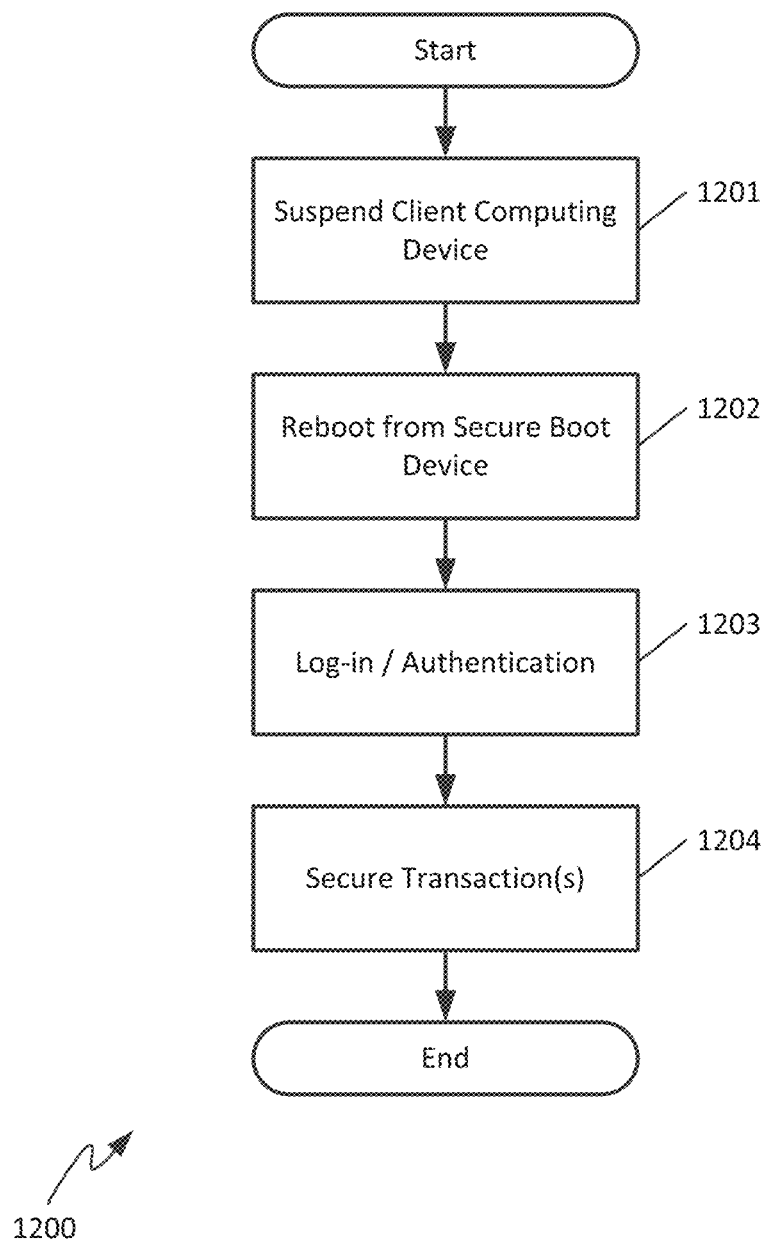
FIG. 12 illustrates a flowchart of a method for using a secure boot device to create a secure connection to a server according to an embodiment of the present disclosure.

FIG. 12 illustrates a flowchart of a method 1200 for using a secure boot device, such as secure boot device 1002, to create a secure connection to a server according to an embodiment of the present invention. In the embodiment shown, a four step process is used; however, in alternative embodiments, more or fewer steps could be performed. The method 1200 begins with a user suspending the operation of a client computer, such as client computer system 1006, by halting the operation of its standard operating system in step 1201. In one embodiment, a client computer system 1006 typically runs a version of the Windows™ operating system from the Microsoft Corporation; however, in alternative embodiments, different operating system software could be executed on the client computer system 1006. Irrespective of the particular operating system used, the operating system of the client computer system 1006 is halted in order to permit the client computer system 1006 to reboot using the secure boot device 1002, i.e., the small OS shell 1103.

A user attaches the secure boot device 1002 to the client computer system 1006 and the computer is rebooted in step 1202. If the secure boot device 1002 corresponds to a USB memory stick, the device is merely inserted into a USB port on the client computer system 1006 prior to rebooting the computer. Other arrangements are possible as well, depending upon the particular format taken by the secure boot device. When the client computer system 1006 is rebooted, it is instructed to use the operating system image stored on the secure boot device 1002 that causes the trusted system software to be loaded and the client terminal process module 1102 to be executed.

In step 1203, the user provides additional information to the client terminal process module 1102 used in the authentication process as a secure connection is established between the client computer system 1006 and the server 1004. A secure connection 1010 is then established using the information from the secure boot device 1002. The user may now use this secure connection 1010 in step 1204 to perform banking transactions on the server 1004. Once all of these transactions are completed, the user may shut down the client computer system 1006 and reboot into its standard operating system, returning the client computer system 1006 to normal operation. This shut down process terminates the secure connection between the client computer system 1006 and the server 1004, restoring the functionality of the operating system normally executing on the client computer system 1006.

Figure 13:
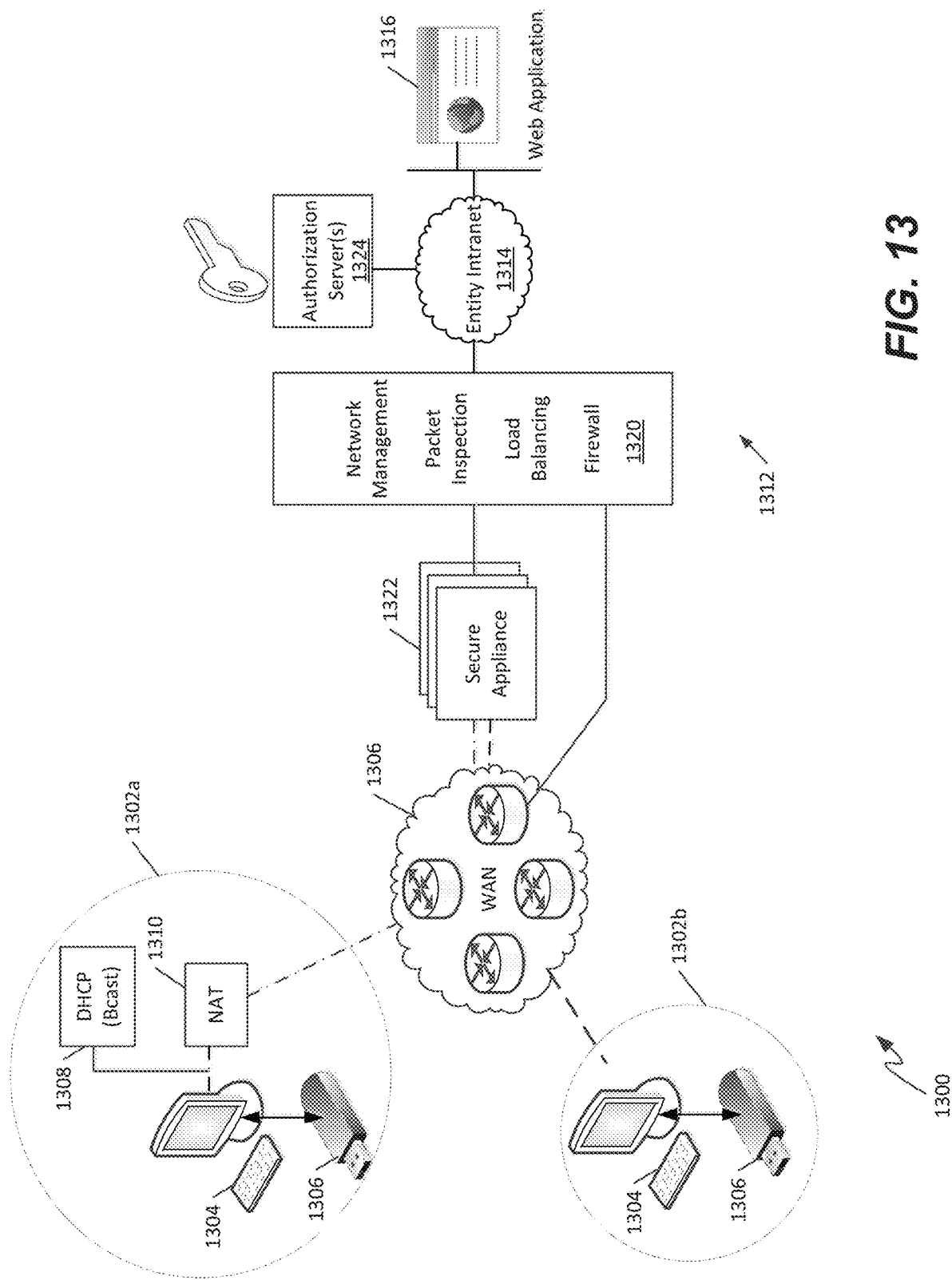
FIG. 13 illustrates a distributed processing system useable in connection with a secure boot device to create a secure connection to a server according to a possible embodiment of the present disclosure.
Figure 14:
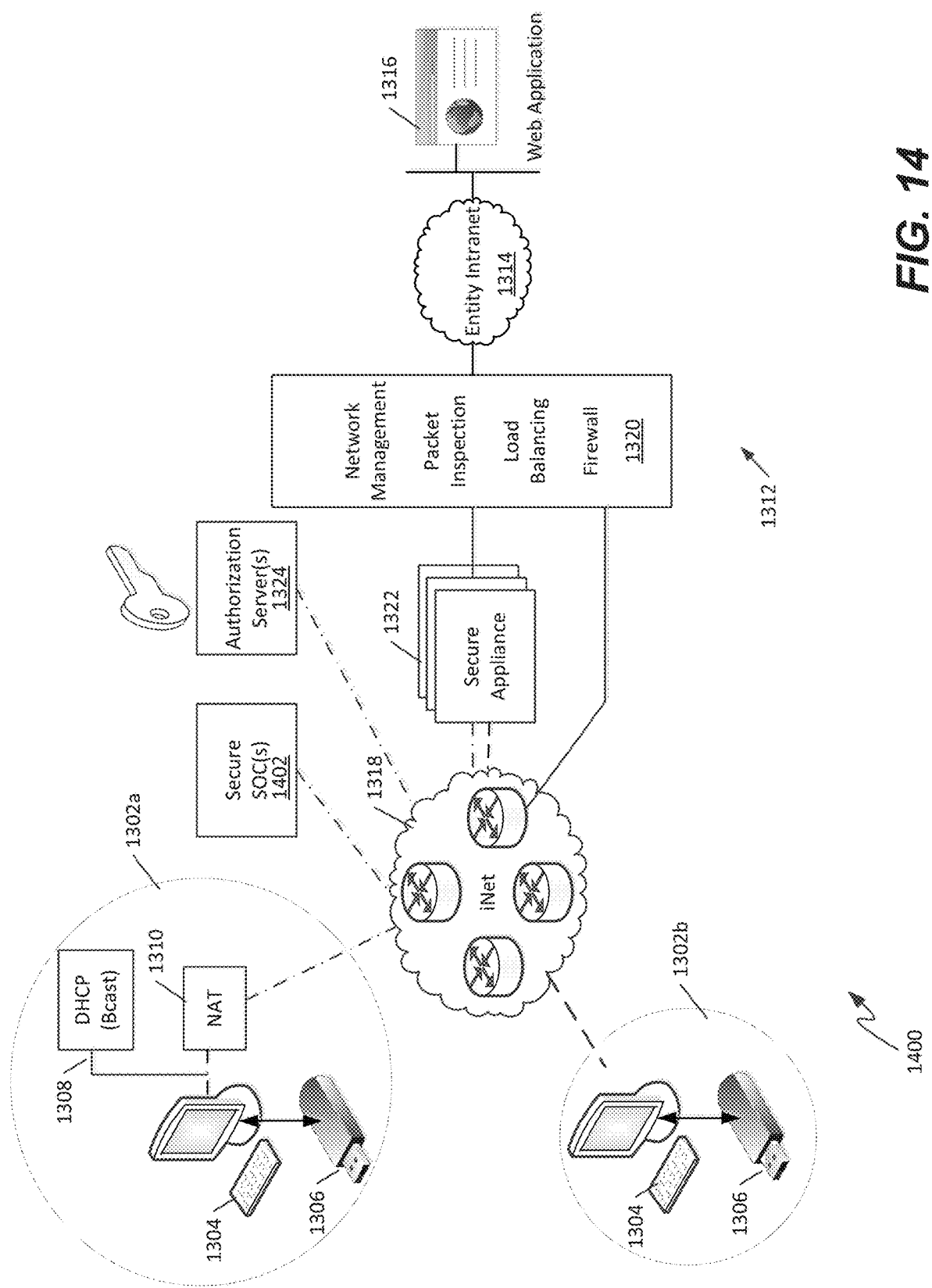
FIG. 14 illustrates a distributed processing system useable in connection with a secure boot device to create a secure connection to a server according to a further possible embodiment of the present disclosure.
Figure 15:
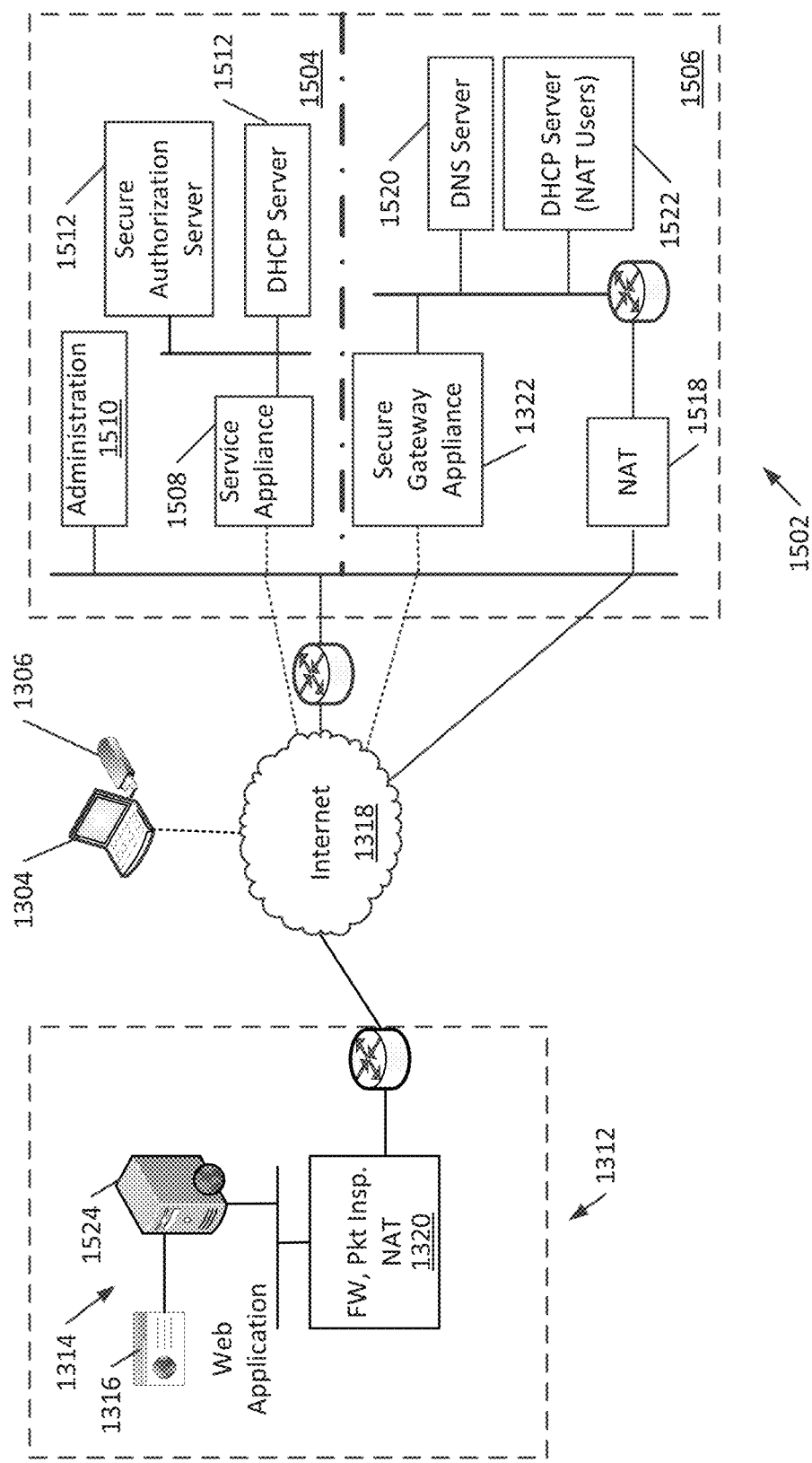
FIG. 15 illustrates a distributed processing system useable in connection with a secure boot device to create a secure connection to a server according to a further possible embodiment of the present disclosure.

Referring now to FIGS. 13-15, a set of possible embodiments of distributed processing system using a secure boot device to create a secure connection to a server are shown. In these multiple alternate embodiments, a client computer uses the previously described processes of establishing a secure connection to a server via a wide area network (WAN) after the client computer boots from a secure boot device. Typically, the WAN connecting these computers corresponds to the public Internet, although any communications may be used. The client computers, according to the embodiments shown, generally interact with a secure appliance to provide a trusted connection to a service provider, such as a bank, data center, or other facility or entity desiring secured communications. The security related operations of encryption and parsing of the data, as described within the previously identified patent applications are performed in the various illustrated client computers and the secure appliances.

FIG. 13 illustrates a distributed processing system 1300 useable in connection with a secure boot device to create a secure connection to a server according to a first of these possible embodiments. The distributed processing system 1300 is, in the embodiment shown, one example distributed, networked arrangement that can be implemented according to the generalized discussion in conjunction with FIGS. 10-12, above. In the embodiment shown, the distributed processing system 1300 includes a pair of client locations 1302a-b. Each client location 1302 includes one or more client computing devices 1304, which can join a secured distributed processing system using secure boot devices 1306. In the embodiment shown, client location 1302a includes a network address translation (NAT) module 1308 and a DHCP module 1310, capable of local domain and network address resolution at the client location 1302a. Optionally, other client locations, such as client location 1302b, can include this or other networking functionality as well.

Each of the client computing devices 1304 are configured to be capable of accessing a remote location 1312, such as a central office or institution hosting a resource to be accessed. In the embodiment shown, the remote location 1312 is a data center that includes an entity intranet 1314, such as a data center network or other set of resources, that is accessible via a web application 1316. Other types of remote location resources could be made available as well.

Each of the client computing devices 1304 connect to the remote location 1312 via an open network, illustrated as the internet 1318.

At the remote location 1312, typically one or more access devices, illustrated as a network management system 1320, generally receives clear text communication from the internet 1318, for example relating to typical, unsecured communication of data. This is illustrated by the solid line extending from the cloud representing the internet 1318 to the network management system 1320. The network management system 1320 can perform a variety of operations on inbound and/or outbound data, such as packet inspection and routing, load balancing across one or more computing systems and/or workloads, and firewall operations. Additionally, the remote location 1312 can include one or more secure gateway appliances 1322 configured to perform cryptographic splitting and encrypting operations, to allow for secured communication with client computing devices 1304 via a WAN, e.g., the internet 1318 (illustrated by broken line connections). The secure gateway appliances 1322 can receive the split and encrypted data at via the internet 1318, recompose that data into original, clear text data, and forward it to other portions of the remote location 1312 as desired (e.g., to the network management system 1320 for handling).

In some embodiments, a number of secure gateway appliances 1322 are accessible external to the remote location 1312. For example, in some embodiments, a separate secure gateway appliance 1322 could be made available for every defined community of interest, such that communications for a particular group of users are routed from a common gateway. In other embodiments, secure gateway devices dynamically allocate connection bandwidth to client computing devices 1304 based on current bandwidth use, and connect to client computing devices 1304 associated with users in a number of communities of interest. Other arrangements of gateway devices are possible as well.

Additionally, at the remote location 1312, an authorization server 1324 can be included which includes one or more provisioning and management tools for managing memberships in communities of interest, as well as resources accessible by individuals associated with those communities of interest. The authorization server 1324 can, in certain embodiments, be configured to authenticate a user of a client computing device 1304 and associated secure boot device 1306. The authorization server 1324 can be configured to, for example, receive username and password, cryptographically-signed certificate, or PIN or other information from a user of a client computing device 1304 seeking to connect to the remote location 1312 via a secure connection, and can transmit one or more encryption keys to the client computing device 1304, such as an encrypted session key or other information from a cryptographic data set, as discussed above in connection with FIG. 7.

It is noted that data connections between the secure gateway appliance 1322 and a local server, such as the authorization server 1324, is typically trusted because of its co-location within a data center or the use of a secure connection that is otherwise trusted. The secure gateway appliance 1322 typically involves the use of encryption keys that are associated with the identity of particular users. These keys may consist of public key encryption keys that would use a set of keys at the client computing device 1304, and a corresponding set of keys at the secure gateway appliance 1322. The set of keys used by the client computing device 1304 may be stored on the secure boot device 1306 and are not accessible by the user. As part of the authentication process, the authorization server 1324 may be used to perform any desired authentication and then identify the needed encryption keys that are needed by the secure gateway appliance 1322 for use in performing the secure communications.

In use, typical client operations contacting the remote location 1312 can be performed using clear text communication. However, when a user wishes to perform one or more sensitive transactions involving confidential data, that user can reboot his/her client computing device 1304 at the client location 1302 using a secure boot device 1306 as discussed above. Software modules from the secure boot device 1306 are loaded at the client computing device 1304, and optionally a user is prompted to enter his/her username, certificate, or other credentials. Upon authentication of that user, the client computing device 1304 will form a secure connection with a secure gateway appliance 1322 that is either defined in memory of the secure boot device 1306 or received via the authorization server 1324. The secure boot device 1306 will dictate communication with only the remote location 1312, and will require communication to occur via the secure gateway appliances 1322. Accordingly, implementation of the distributed processing system 1300 allows an entity to protect sensitive data being passed over public, IP-based networks.

It is noted that, to devices communicating via the internet 1318 using clear text communications, the various devices communicating only via secure communication protocols of the present disclosure (e.g., a client computing device 1304 when securely booted using a secure boot device 1306, a gateway appliance 1322, or the authorization server 1324 in the embodiment shown) appear non-responsive to other devices connected to the internet 1318. For example, the authorization server 1324 may not respond to communications in clear text, and one or more gateway devices may simply forward data received in clear text to the network management system 1320. This includes both clear text devices, as well as other clients and/or gateway devices operating using only a different set of community-of-interest keys. This prevents unauthorized access to the data as transmitted, or "data in motion", within the distributed processing system 1300. Additionally, it prevents network browsing and malware injections by unauthorized systems via the internet 1318.

Referring now to FIG. 14, a second example of a distributed processing system 1400 useable in connection with a secure boot device to create a secure connection to a server is shown. In this embodiment, the distributed processing system 1400 represents an arrangement in which the secure connection into an intranet of a remote system is provided as a managed service, i.e., by an entity other than the administrator of the intranet within which the secured, community-of-interest protected resources reside. In this embodiment, the authorization server 1324 exists connected to the internet 1318, separate from the remote location 1312. In this second embodiment, a trusted connection from a secure gateway appliance 1322 and the authorization server 1324 may be needed. In both of these cases, the secure gateway appliance 1322 is physically connected via internet 1318 to the server providing the web application 1316. Additionally, one or more external secure computing resources 1402 can be included in the distributed processing system 1400 and use of those systems could be authenticated by the authorization server 1324 in this embodiment, because it is not specifically only affiliated with the remote location 1312, but instead can transmit secure messages and provide authentication via the internet 1318.

Referring now to FIG. 15, a third example of a distributed processing system 1500 useable in connection with a secure boot device to create a secure connection to a server is shown. In this distributed processing system, the secure gateway appliance 1322 is physically located in a local intranet of a managed service provider 1502. A managed service provider 1502 can be, for example, an entity configured to manage resources needed to administer communities-of-interest, encryption keys, access control lists, and other information typically managed by an administrator of a local intranet. In the embodiment shown, the distributed processing system 1500 includes a client computing device 1304 and associated secure boot device 1306 as discussed above; the distributed processing system also includes a remote location 1312, in this embodiment being a customer of the managed service provider 1502. In the embodiment shown, the remote location 1312 includes an analogous entity intranet 1314, such as a data center network or other set of resources, which is accessible via a web application 1316. The remote location 1312 also includes a network management system 1320, for example for load balancing and routing of data within the intranet.

As compared to the two prior embodiments, in this embodiment the managed service provider 1502 is illustrated as including a separate service enclave 1504 and a customer enclave 1506. As referenced in the present disclosure, an "enclave" generally refers to a particular area or network of one or more computing systems defined by function.

Generally, the service enclave 1504 includes one or more computing resources configured to be managed by the managed service provider 1502, including management of community-of-interest keys, memberships in communities of interest, authentication of users and granting of access to resources in a secured location. In the embodiment shown, the service enclave 1504 includes a service appliance 1508, an administration appliance 1510, an authorization server 1512, and a DHCP server 1514.

The service appliance 1508 is generally an appliance having a known address, such that instructions stored in a secure boot device (e.g., boot device 1306) include an address for that appliance, to allow authentication of a user of the device. The service appliance 1508 receives initial connection requests from one or more client computing devices 1304, and establishes an encrypted connection to the client computing device 1304 to provide the client with its one or more community of interest keys, and other secure, community-of-interest-specific information. In certain embodiments, the service appliance 1508 is accessible using either an administration community-of-interest key or a service key. The service key can be, for example, a key provided to users, e.g., stored in a read-only portion of the secure boot device, such that the boot device itself is authorized to and configured to connect to the service appliance 1508 to obtain one or more community-of-interest keys therefrom.

The administration appliance 1510 provides access to the service enclave 1504 for administrative tasks related to the service enclave 1504 and customer enclave 1506. Example tasks performed via access to the administrative appliance include, for example configuring addresses of gateway appliances, configuring membership lists in one or more communities of interest and keys associated with those communities of interest, logging events, creating and managing virtual private networks within the customer enclave 1506, and other tasks. In some embodiments, a user requires an administration community-of-interest key to access the administration appliance 1510, to prevent unauthorized access by customers or other unauthorized individuals.

The authorization server 1512 manages keys associated with each of the one or more communities of interest associated with the customer enclave 1506. The authorization server 1512 receives login information from a user of a client computing device 1304 and associated secure boot device 1306, and returns the COI keys and identity of the secure gateway appliance to which that user is authorized to connect (discussed below). The DHCP server 1514 manages addressing of systems within the service enclave 1504, providing IP addresses for resources accessible via the service appliance 1508.

The customer enclave 1506 includes a secure gateway appliance 1322, as well as a network addressing table (NAT) 1518. The secure gateway appliance 1322 provides an endpoint to which all secure communications from the client 1304 are directed, while the NAT 1518 receives clear text communications from the client computing device 1304 or remote location 1312. Preferably, the resources accessible via the secure gateway appliance 1322 and the NAT 1518 are not coextensive, i.e., no clear text communications via the NAT reach the network resources specifically associated with the community-of-interest enabled at the client computing device 1304 and the secure gateway appliance 1322. In the embodiment shown, a DNS server 1520 and DHCP server 1522 are included at the customer enclave 1506. The DNS server 1520 allows definition of one or more virtual private networks among computing resources in the customer enclave 1506, thereby allowing for segregation of computing resources on a community of interest basis within the customer enclave. The DHCP server 1522 allows each endpoint connecting to the customer enclave 1506 to acquire a secured private network address to be used in the customer's secured portion of the customer intranet within the customer enclave 1506. Static routes are configured via the DHCP server 1522 to allow TCP/IP packets from a client to be properly routed to the customer intranet.

It is noted that in the example of FIG. 15, the secure gateway appliance 1322 can be used, not only by more than one community of interest within a particular entity as discussed above with respect to FIGS. 13-14, but can also be addressed by multiple different, unaffiliated customers of the managed service provider 1502. Accordingly, additional remote sites 1312 and client computing devices 1304 could be incorporated as well.

For example, a first client computing device 1304 may be affiliated with a first entity, and a second client may be affiliated with a second entity. To initiate secure communication with that user's specific resources within the customer enclave, both clients would first access the service enclave 1504, via the service appliance 1508, using the same service key. Upon validation, each of the first and second client would retrieve its own respective community-of-interest keys associated with the users of those clients, e.g., based on his/her roles relative to the entity with which those users are affiliated. The service enclave 1504 can be configured to provide relevant community-of-interest keys related to users of both the first and second clients to the secure gateway appliance 1322, or to different gateway appliances associated with the same customer enclave 1506. When each respective user is validated and accesses his/her community of interest keys (e.g., via the methods and systems of FIG. 12, above, or FIG. 17, below, that user can initiate communication with a secure gateway appliance 1322 using the community-of-interest key to access user- and entity-specific resources (e.g., virtual private LANs, SANs, or other resources) managed within the customer enclave 1506.

Once a secure connection is established, data is routed to a secure gateway appliance 1322 for communications with the server 1524 at the customers intranet (e.g., intranet 1314) running the web service application 1316, the banking application for example. In this third embodiment, the server 1524 may be located in a separate location on the Internet. A separate secure connection may be used to connect the secure gateway appliance 1322 and the server 1524.

Figure 16:
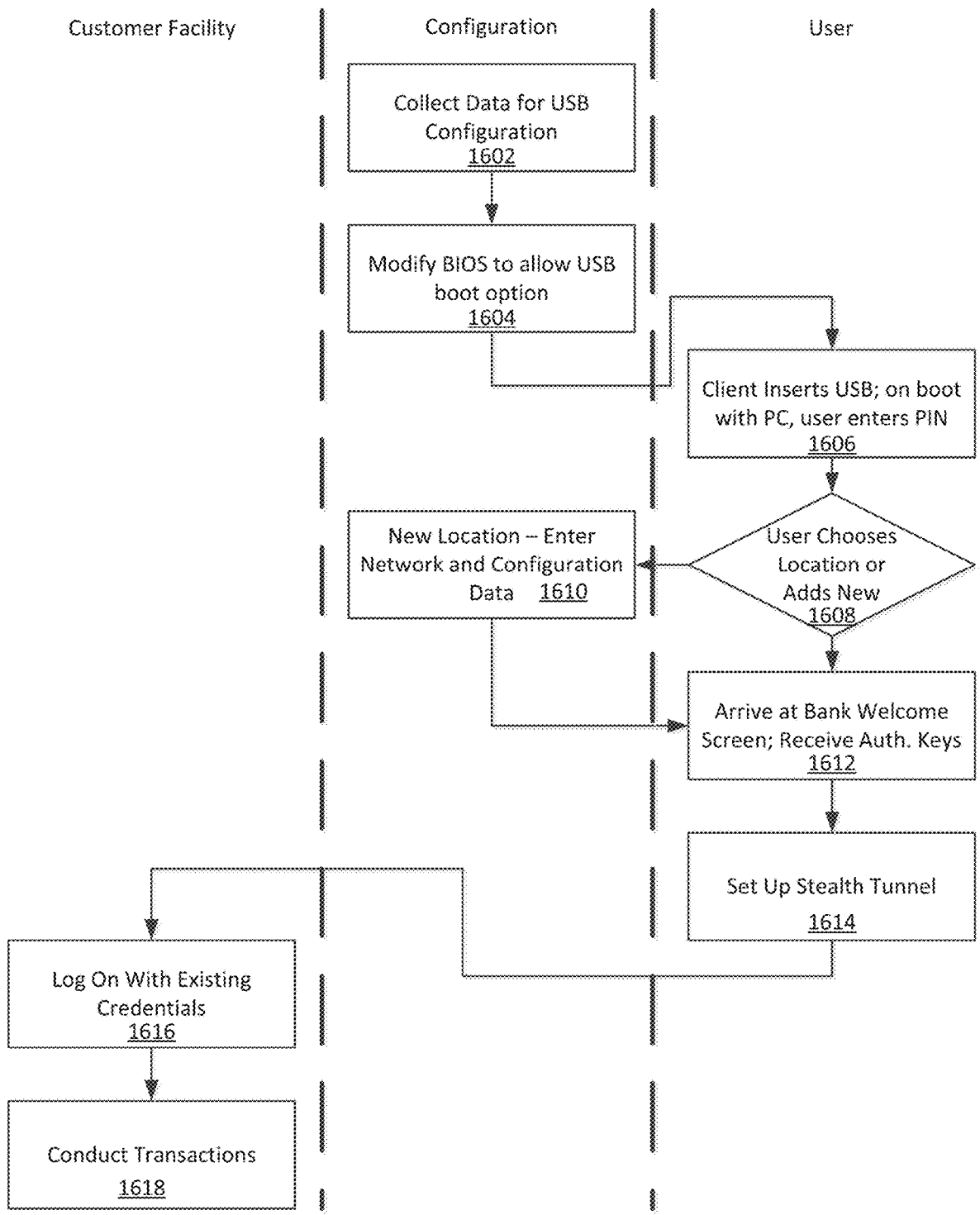
FIG. 16 illustrates a flowchart of creating a secure connection according to an embodiment of the present disclosure.

FIG. 16 illustrates a flowchart 1600 of creating a secure connection according to an embodiment of the present invention. The flowchart 1600 outlines example steps taken by a user, a customer facility, and one or more configuration devices or entities (e.g., an entity responsible for configuring authentication of the user within a virtual network affiliated with the customer facility). A configuration data collection operation (step 1602) involves A BIOS modification operation (step 1604) involves modifying a BIOS configuration setting within a BIOS of a computing system, such that the computing system can be used as a terminal to connect to a remote server, for example to conduct transactions with a bank or other financial institution. In general, the BIOS modification operation involves assigning a boot order to devices associated with the computing system operated by the user (e.g., client computing device 1304). In some embodiments, the BIOS modification operation enables the client computing system to boot from a USB device, such as the secure boot device described in some embodiments above.

A terminal launch operation (step 1606) corresponds to a user inserting a USB-stick boot device into a USB port of a computing system, and rebooting the computing system via that particular secure boot device. The terminal launch operation further includes, upon the computing system booting from the secure boot device, entering one or more types of user credentials when prompted by the computing system, for example to validate the user's identity (e.g., using a username and password, cryptographically-signed certificate or PIN number security system).

A location selection operation (step 1608) allows a user to select a particular location to which to connect. For example, the location selection operation may in certain embodiments allow a user to select a particular branch of an institution, or a particular region, or a specific division of that institution. In any event, selection of a location via the location selection operation allows the method 1600 to determine the particular secure gateway device to which the client computing system will connect. If the user elects to add a new location, a new location operation (step 1610) receives network and configuration data for that new location. The new location can, for example, be a particular branch or other division of the institution to which secure transactions are desired for that user, in the context of the present disclosure, a new location will typically be a location having a separate secure gateway device; however, other arrangements are possible as well for defining a new location.

A terminal initiation operation (step 1612) presents a welcome screen to a user, and transmits to the user via a SSL or other tunnel-based connection the one or more community of interest keys associated with that user. Alternatively, in some embodiments, the community-of-interest keys are stored on the secure boot device, and the terminal initiation operation can send a decryption key to the now-secure-booted client computing system to decrypt and access those community-of-interest keys.

A secure tunnel operation (step 1614) sets up a secure tunnel between the client computing system and the designated location (e.g., an address of a secure gateway device) using the one or more community of interest keys and other encryption information associated with that user. If necessary, the one or more community of interest keys associated with the user are transmitted from an authorization server to the identified secure gateway device, allowing that device to communicate with the client computing device, thereby enabling the secure connection between those devices via the internet.

A login operation (step 1616) receives login information from a user, for example a username and password, a cryptographically-signed certificate, or PIN-based authorization. The user is validated, and can conduct one or more transactions at a transactions operation (step 1618), which corresponds to execution of one or more transactions at a customer facility.

While the above embodiments of the present invention describe the interaction of a client computing system and a server computing system over a secure communications connection, it is recognized that other arrangements for secure connection and communication between a client device and server system or dedicated customer resource is possible. As long as a secure boot device, such as a USB memory stick, as described herein, is used to boot the client computer and to create the connection with the server, the present invention to would be useable in performing secure transactions. Additionally, any of a variety of methods for securing an otherwise unsecure terminal could be used as well. It is to be understood that other embodiments may be utilized and operational changes may be made without departing from the scope of the present invention.

Referring generally to FIGS. 10-16, it is recognized that using the secure communications infrastructures discussed herein, a number of advantages are obtained over existing secure connections. For example, using the secure boot devices and resulting secure terminal connection to resources over a public network (e.g., the Internet), a user is still able to maintain a trusted, virus-free computing system at a client site, despite potential corruption issues both relating to data travelling over the open network and data stored at the client device (e.g., on a hard drive of the client device). This reduces the risk of various types of phishing, eavesdropping, and screen- or keystroke recording, because the institution to which a client user connects reliably knows what software is operating at that client device.

IV. Coexistence of Secure Tunnels with Internet-Based Infrastructure

Figure 17:
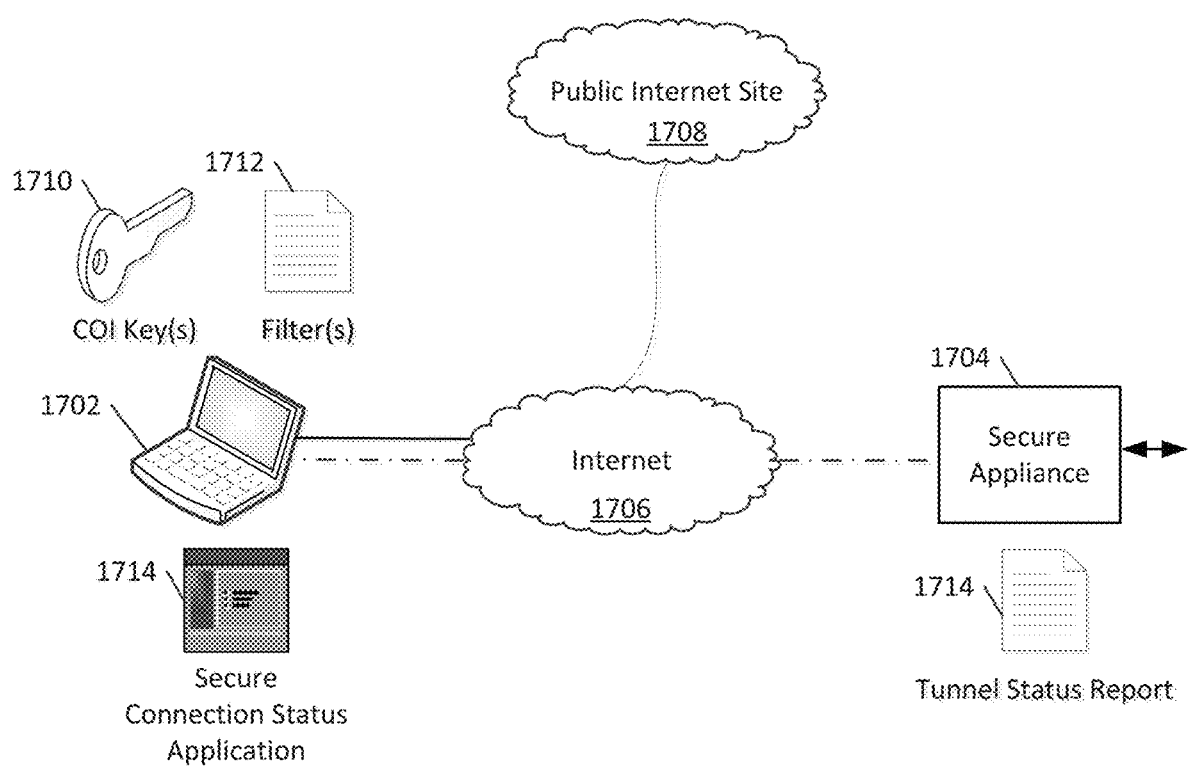
FIG. 17 illustrates an example network in which secure tunnels can coexist with clear text communication, according to a possible embodiment of the present disclosure.
Figure 18:
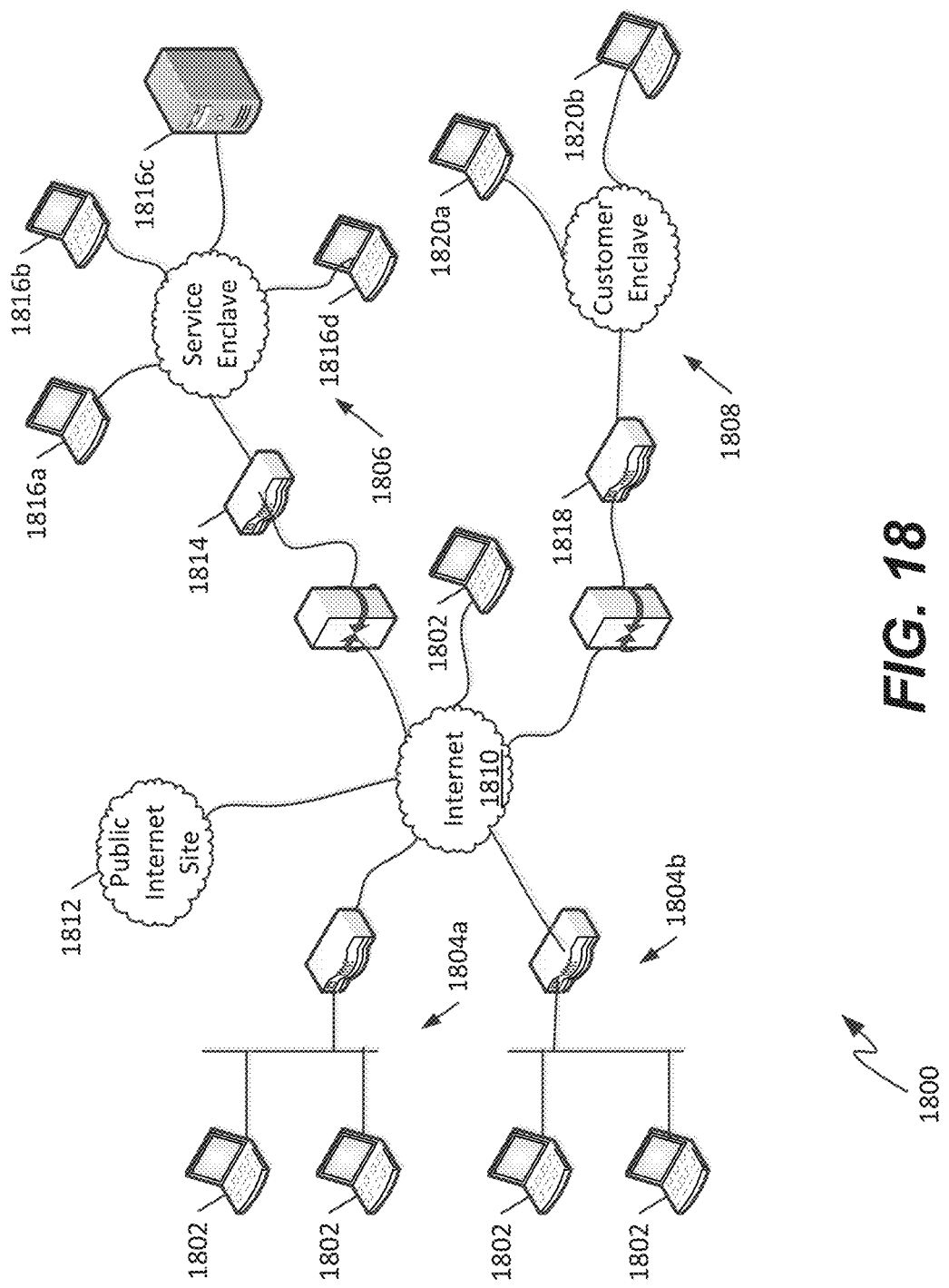
FIG. 18 illustrates a distributed system in which secure tunnels coexist with clear text communication, according to a possible embodiment of the present disclosure.
Figure 19:
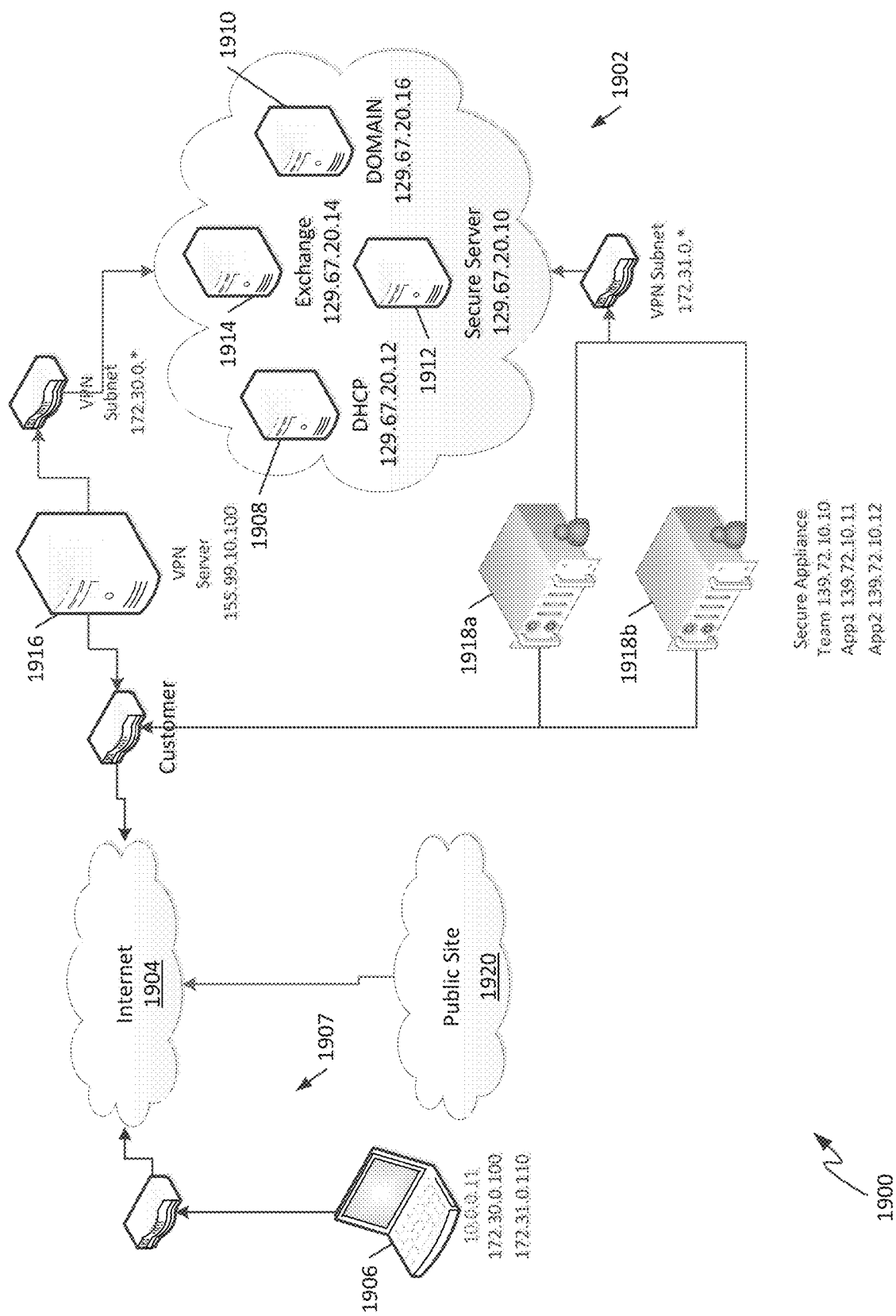
FIG. 19 illustrates a distributed hybrid system using virtual private network and secure connections, using the distributed systems of FIGS. 18-19, according to a possible embodiment of the present disclosure.
Figure 20:
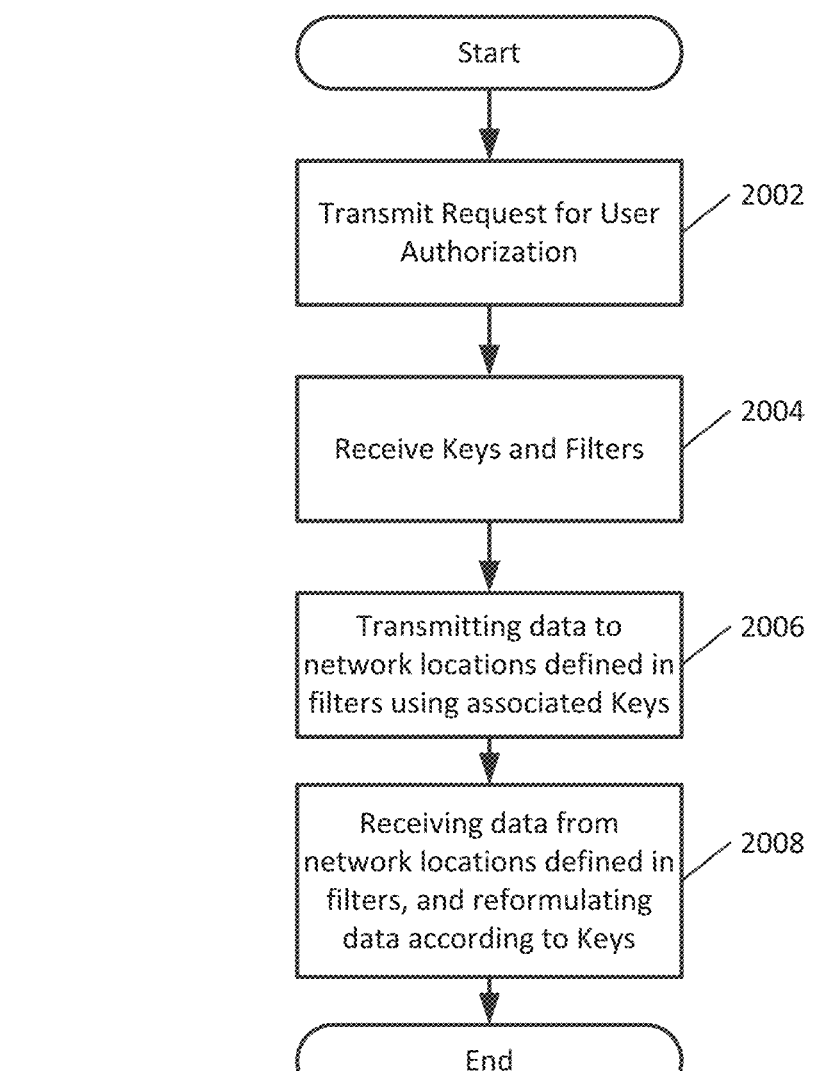
FIG. 20 illustrates a flowchart of authenticating a system for use of coexisting secure and clear text tunnels, according to a possible embodiment of the present disclosure.
Figure 21:
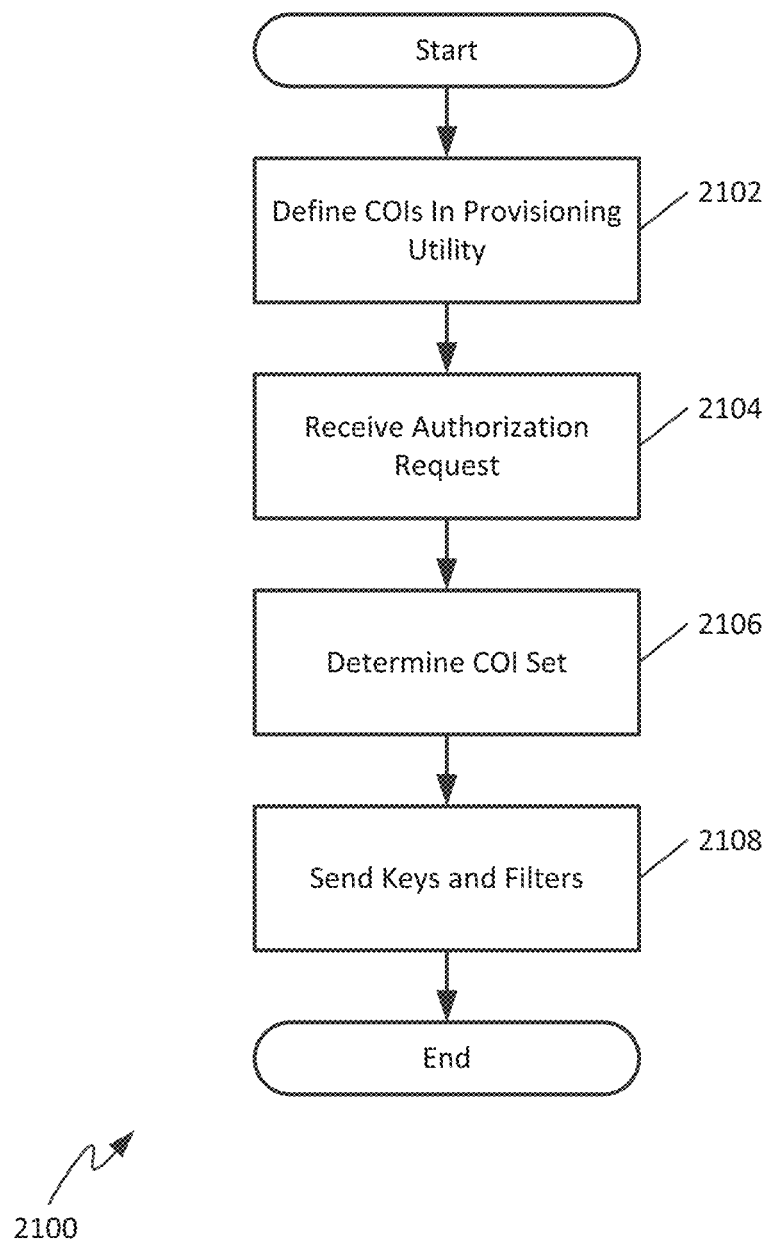
FIG. 21 illustrates a flowchart of methods and systems for configuring a distributed system including coexisting secure and clear text tunnels using a provisioning utility, according to a possible embodiment of the present disclosure.

Referring now to FIGS. 17-21, example methods and systems are disclosed relating to a further possible embodiment of the present disclosure in which a secure tunnel connection, such as those described above using community-of-interest based encryption and segregation of resources, can be used in conjunction with clear text communication to a publicly-available resource, such as an internet site. FIG. 17 illustrates a basic example network in which such an arrangement may occur, while FIGS. 18-19 illustrate particular example networks similar to the managed service network described above in FIG. 15, in which such a hybrid secured/unsecured arrangement is managed. FIGS. 20-21 illustrate example methods for managing concurrent secure and unsecured connections at a client device.

Referring now to FIG. 17, an example network 1700 is shown in which secure tunnels can coexist with clear text communication, according to a possible embodiment of the present disclosure. In the network 1700, a client device 1702 connects to a secure appliance 1704 via an open network, such as the internet 1706. One or more public sites 1708 are also available to be accessed from the client device 1702.

In this embodiment, client device 1702 corresponds generally to any computing system capable of secure communication using community-of-interest based security and the cryptographic security architecture generally described above in connection with Section I. The client device 1702 can be, for example a computing system as discussed in connection with FIGS. 4-6. The secure appliance 1704 can also generally be any secured endpoint or gateway device, such as those described above.

In the embodiment shown, the client device 1702 includes one or more community-of-interest keys 1710 and an associated one or more filters 1712. In one embodiment, each community-of-interest key has an associated filter; in other embodiments, different numbers of keys and filters can be used.

Generally, the community-of-interest keys 1710 stored on the client device 1702 are used to cryptographically split messages passed to a particular endpoint known to be capable of reconstituting those messages for use at an opposite end of an unsecured network, so as to provide security between the two endpoints. In certain embodiments disclosed herein, an additional clear text community-of-interest key can be used which, when associated with a particular message, allows for communication of clear text messages concurrently with use of secure communication (including use of the secure software stack 608 of FIG. 6).

Optionally, associated with each of the community-of-interest keys 1710, a filter 1712 can be defined, for example by an administrator of a secure network, using a provisioning utility of an administration appliance. The filter 1712 defines one or more permissions associated with each community-of-interest key 1710. Each filter can take a variety of forms. In one example embodiment, a plurality of filters can be defined in an XML file associated with each community of interest, and which are delivered to a user alongside any related community-of-interest key(s). For example, a filter can define a key by its key name, and then define an allowed access list of IP addresses relating to endpoints that the client device 1702 is permitted to communicate with using the identified key, or optionally an "exclusions" access list of IP addresses relating to endpoints that the client device 1702 is not permitted to communicate with. An example of a portion of a filter 1712 is illustrated below, in which two community-of-interest keys are defined:

```
<tuples>
    <key id=ClearText1>
        <type>5</type>
        <keyName>keyname</keyName>
        <denyAccessList>
            <IPAddress name="*">
                <exceptFor count="1">
                    <IPAddress name="121.15.20.31" />
                </ exceptFor>
            </IPAddress>
        </denyAccessList>
    </key>
    <key id=Stealth1>
        <type>0</type>
        <keyName>keyname</keyName>
        <hostIP> 139.72.10.10</hostIP>
    </key>
</tuples>
```

In this example, a clear text filter, defined as "ClearText1" allows an associated endpoint to communicate with any endpoint except for one at address 121.15.20.31, which is included in an exclusions list (denied access). Further, a second filter, defined as "Stealth1", has no specific exclusions or limitations on where it can or cannot transmit messages, but is specifically instructed that it has a "home" gateway located at 139.72.10.10. If both of these filters are associated with the same user, that user could communicate with a number of network addresses via clear text, while also communicating with various network locations via the secured connection and community-of-interest key associated with the "Stealth1" filter, including the endpoint or gateway at 139.72.10.10. Other example filters could be defined as well, for example to exclude clear text communication from occurring to the same endpoint to which secured communication is directed from a given client device.

In some embodiments, client device 1702 can include an application 1714 that runs as a background process and which manages selection of one or both of clear text and cryptographically secure communication settings. In such embodiments, client device 1702 can be configured to selectively allow or disallow use of one or more clear text or secure filters by disabling that type of communication at the application level. In additional embodiments, the client device 1702 is by default configured to include a clear text filter, and does not need to retrieve that filter from a remote system such as an authorization server. Once the authorization server in fact authorizes the client device 1702 for cryptographically secure communications and community-of-interest keys are provided to that client device 1702, the clear text filter may be modified, for example to prevent clear text communication to a known secure appliance 1704 configured to communicate with the client device 1702 using cryptographic security. Other embodiments are possible as well in which the clear text filter is selectively provided to each client device 1702 by an authorization server as needed/desired.

Additionally, in some embodiments, secure appliance 1704 or client device 1702 can generate a tunnel status report 1716 relating to activity at the secure appliance 1704, either specifically relating to client device 1702 or generally relating to any client device transmitting packets to the secure appliance. Example information included in the tunnel status report 1716 can include, for example, a current connection status and keys used for connection to the secure appliance by one or more client devices. Other information can be included in the tunnel status report as well.

As can be seen from this key/filter arrangement, the network 1700 provides added functionality to existing secured networks (e.g., VPN) which route all traffic via a secure tunnel when such a tunnel has been formed between endpoints. Furthermore, as compared to the secure transactional systems described above in connection with FIGS. 10-16, in this arrangement, a user of a client device is not precluded from accessing unsecured resources; accordingly, a user of a secure boot device or other system that typically prevents communication other than to a particular gateway or server of an institution can use the methods and systems discussed herein to also allow access to all or selected publicly available sites accessible via clear text browsing.

Referring now to FIG. 18, a distributed system 1800 is illustrated in which secure tunnels and clear text communication can exist, according to a possible embodiment of the present disclosure. In this embodiment, the distributed system 1800 generally illustrates use of concurrent clear text and secured communications from the same endpoint while concurrently using a secure managed service network. This arrangement may be implemented, for example, by one or more companies or other entities wishing to communicate from a trusted intranet to a remotely managed network application via an open network. In cases such as that depicted in FIG. 18, where that remotely managed network application manages sensitive data, a secure communication arrangement is desired between the local intranet and that remotely managed application, but concurrent normal, clear text access to a public network site (e.g., an address accessible via clear text on the internet) is desired as well.

In the embodiment shown, the distributed system 1800 includes a set of client devices 1802, each located in customer local area networks 1804*a-b*. Both customer local area networks 1804 are connected to a service enclave 1806 and a customer enclave 1808 via a public network, shown as the internet 1810. The internet 1810 additionally connects the local area networks 1804*a-b* to a variety of publicly-available internet sites, in the example shown as public internet site 1812. Additionally, one or more client computing systems 1802 can be directly connected to the internet 1810 without being a part of a customer local area network 1804, for example a home user or other remote access user wishing to access applications or resources managed at the customer enclave 1808.

The service enclave 1806 includes a plurality of computing devices, depending upon the particular requirements of the managed entities. In the embodiment shown, the service enclave includes a service appliance 1814, and a plurality of computing devices 1816*a-d*. In various embodiments, one or more of the computing devices 1816*a-d* can include an administration gateway including a provisioning tool, by which an administrative user can define and provision one or more other gateways, endpoints, and network resources. Others of the computing devices 1816*a-d* can be an authorization server configured to provide authentication of users connecting to the service enclave 1806 via a service gateway. Still other computing devices 116*a-d* can provide DHCP or other network routing services.

The customer enclave 1808 includes a customer appliance 1818 as well as a plurality of computing devices 1820*a-b*. In various embodiments, the customer enclave can be managed by the one or more computing devices 1816*a-d* of the service enclave to form one or more virtual private networks, with each such network associated with a particular community of interest. Each community of interest can be specific to one of the customers (e.g., a separate community of interest for each customer local area network 1804*a-b*, respectively), or based on an identity of a user within those networks. Accordingly, the generalized network topology of the distributed system 1800 is similar to that illustrated above in conjunction with FIG. 15, but is adapted for use by either an untrusted client device and associated secure boot device, or for secure access from a trusted client, such as a client within a trusted client intranet (e.g., customer local area network 1804).

In general, the key and filter arrangements of the present disclosure allow concurrent access to both secured systems, such as those at the service enclave 1806 and customer enclave 1808, as well as to public internet site 1812, as desired. To allow a particular user access to both secured and unsecured resources, that user must simply be included within a secure communities of interest and a clear text community of interest, such that the client computing system associated with that user will receive a community-of-interest key, as well as one or more filters defining allowed secure and clear text communication. Depending upon the definitions included in the filter associated with the community-of-interest key, the user may be allowed partial or full clear text communication capabilities, while concurrently communicating securely with one or both of the service enclave and customer enclave.

FIG. 19 illustrates a more particular example of a distributed hybrid system 1900. In this example, a network topology is illustrated that allows use of any of clear text, virtual private network, or secure connections, using the distributed systems of FIGS. 17-18, according to a possible embodiment of the present disclosure. In this system, a user can connect to a private cloud, such as a customer enclave 1902, via a public network such as the internet 1904, using one or both of a VPN connection and a cryptographic, community-of-interest-based connection according to the principles of the present disclosure. In the embodiment shown, a client device 1906 is configured at a customer intranet 1907 with both a "stealth" based cryptographic splitting virtual adapter and a virtual private network virtual adapter. This can correspond, for example to the network interface infrastructure illustrated in FIG. 6, described above, in which first and second secure communication stacks, e.g. software stack 608, 609 are implemented.

The customer enclave 1902 includes, in the embodiment shown, a DHCP server 1908, a domain server 1910, a stealth server 1912, and an application server, shown as Exchange server 1914. Other network resources could be included in the virtual private network as well. From the internet 1904, the virtual private network shown as the customer enclave 1902 can be accessed via either VPN server 1916, or a secure appliance (e.g., from secure appliances 1918a-b). Additionally, one or more public internet sites 1920 are available to a client device 1906 via the internet 1904.

In this example configuration, the client device 1906 is configured with both a Stealth virtual adapter (illustrated as being assigned IP address 172.30.0.100) and a VPN virtual adapter (illustrated as being assigned IP address 172.31.0.110). The client device 1906 is further configured with a clear text filter, analogously to the example of FIG. 17, to allow access to the public internet sites 1920 via clear text, and to the VPN server 1916. Additionally, the physical adapter with the NAT assigned IP address (10.0.0.11) is used for local communications to other endpoints in the NAT subnet, e.g., at the same location as the client device 1906.

In certain embodiments, the customer enclave 1902 includes a DHCP server 1908 to allow the client device 1906 to acquire a Stealth VPN address to be used in the Stealth-enabled portion of the customer's intranet 1907. Static routes are configured via the DHCP server 1908 to allow TCP/IP packets on the endpoint to be properly routed to the customer intranet 1907. The destination IP address/subnet in the customer intranet is configured with a static route so Windows TCP/IP selects the correct virtual adapter. For example, if the client device 1906 is using the secure appliances 1918 as a destination, then the stealth virtual adapter must be selected by Windows TCP/IP stack in that client device. If the destination is using the VPN path (i.e., via VPN server 1916), then the VPN virtual adapter must be selected by Windows TCP/IP.

Referring now to FIGS. 20-21, methods for authenticating a system for use of coexisting stealth-enabled and clear text tunnels are described, as well as for configuring a distributed system including such tunnels using a provisioning utility. FIG. 20 illustrates a flowchart of a method 2000 for authenticating a client device, such as an endpoint, for use of coexisting secure and clear text tunnels, according to a possible embodiment of the present disclosure. The method 2000 generally corresponds to a client device requesting authorization from an authorization server, such as may be located within a service enclave of a managed environment, to communicate with one or more other endpoints or gateway devices using secure, stealth-based communication and clear text communication to other locations in an open network.

The method 2000 is initiated, a request is transmitted for authorization of a user from a client device to a service enclave, for example to the authorization server (step 2002). The request can include, for example a user identifier and password or other authentication information, such as a PIN based authentication.

At an authorization server, the identification of the user of the client device is checked against a list of communities of interest that are defined using a provisioning utility at the service enclave. Once the client device associated with the user is authorized, it receives one or more community-of-interest keys and filters defining connection rights from a remote system (step 2004), such as an authorization server via a service appliance, as discussed above. The community-of-interest keys and filters define the available endpoints to which the client device can communicate and receive communication, both in stealth-enabled (cryptographic) and clear text.

Once the client device has received the community-of-interest keys and filters, it can communicate using the community-of-interest keys as limited by the associated filters. In step 2006, the client device can transmit one or more messages to one or both of clear text or cryptographically-enabled endpoints using a clear text or secure filter alongside a specified community-of-interest key, if that message (clear text or cryptographic) is allowed based on the defined access lists (both inclusion and exclusion permissions) in the associated filter. In step 2008, the client device can also receive one or more messages from one or both of clear text or cryptographically-enabled endpoints. It is noted that, even if the remote endpoint transmits a message in clear text or using a community of interest key available on the endpoint, the communications software stack at the client device will discard the message if received from an unauthorized remote endpoint, as defined in the filters received at the client device.

FIG. 21 illustrates a flowchart of a method 2100 for configuring a distributed system including coexisting secure and clear text tunnels using a provisioning utility, according to a possible embodiment of the present disclosure. The method 2100 can be used, for example to associate users with communities of interest and defining filters to be associated with those communities of interest, thereby controlling access to endpoints (clear text and cryptographically secured) for that particular user. The method 2100 can be performed, for example, using an administration appliance, such as those discussed above in connection with FIGS. 15 and 18.

The method 2100 is initiated by opening a provisioning utility, such as can be made available via an administration appliance of a service portal, and defining one or more communities of interest and filters associated with those communities of interest using the provisioning utility (step 2102). This can include, for example, using a provisioning tool of an administrative gateway to define communities of interest and filters, as discussed above in connection with FIGS. 17-18. Alternatively, the one or more communities of interest can be defined based on a user's membership in another user group, such as a defined group within Active Directory. In such an arrangement, those predefined groups could be associated with particular keys, filters, and access permissions using the provisioning utility.

After the distributed system is provisioned, a service enclave can receive an authorization request from a client device or endpoint (step 2104). The service enclave typically establishes a secure connection with the client device using a service key to maintain encryption. The service key can, for example be stored in an obscured location at a client device. In one example embodiment, the service key can be stored in a registry entry at a client device. In another example embodiment, the service key could be stored within a read-only or read-write memory of a secure boot device, such as a device as described above in connection with FIGS. 10-16. Other storage arrangements for the service key could be used as well.

A set of communities-of-interest are determined to be associated with the user of the client device (step 2106), for example at the authorization server. The authorization server returns the community-of-interest keys and filters, alongside any other information in a cryptographic data set, to the client device (step 2108), for use in establishing a secure connection with a customer enclave.

Although in FIGS. 20-21, a particular order of operations is illustrated, it is understood that other arrangements of these methods are possible. Additionally, more or fewer steps could be used to accomplish the provisioning and access methods described herein.

Overall, referring to FIGS. 17-21, it can be seen that using the community-of-interest keys and filters, alongside the communications infrastructure provided at a computing system as discussed above in connection with FIGS. 4-6, a user can be enabled to communicate via clear text with selected public sites via the internet while concurrently communicating via cryptographic security features with other secure endpoints. This allows even trusted terminals, such as those using secure boot devices described above in connection with FIGS. 10-16, to perform both dedicated secure operations and to access external websites to the extent allowed by an administrator of a distributed system. Additionally, concurrent clear text and cryptographic communication allows an administrator to implement a hybrid access arrangement in which any of clear text, virtual private network, or stealth-enabled, cryptographic communications can be used.

V. Updating of and Key Management in Secure Endpoints

Referring now to FIGS. 22-25, example systems and methods for managing key distribution throughout a distributed system are described, and methods for updating security and system software at remote terminals are also described in the context of such a distributed system. The distributed system used can be, for example, a network providing a managed service to one or more customers, such as would include the example service and customer enclaves discussed in the above examples illustrating other features of such a system.

Figure 22:
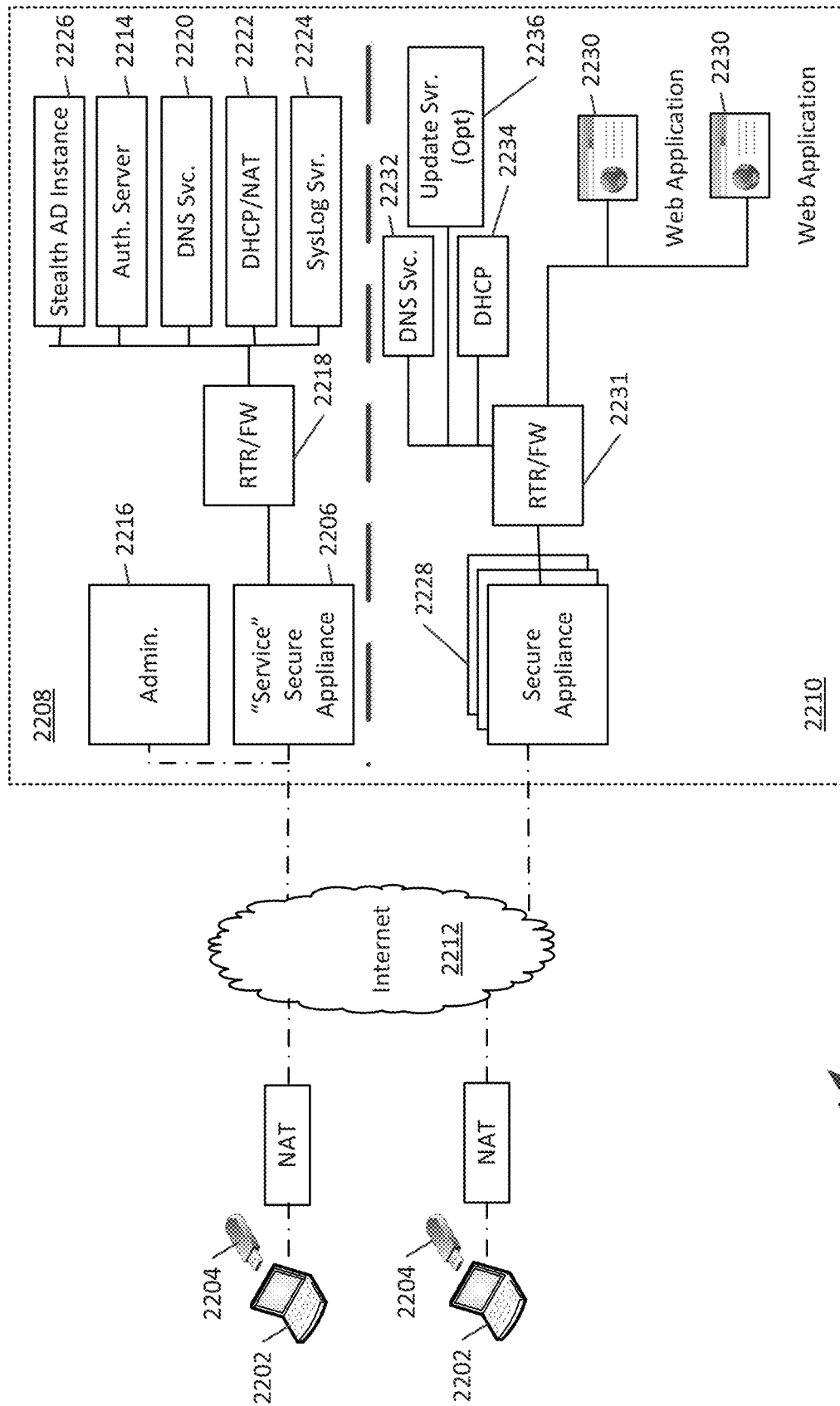
FIG. 22 illustrates an example distributed system in which a secure terminal can be updated during secure connection to a customer virtual network, according to a possible embodiment of the present disclosure.
Figure 23:
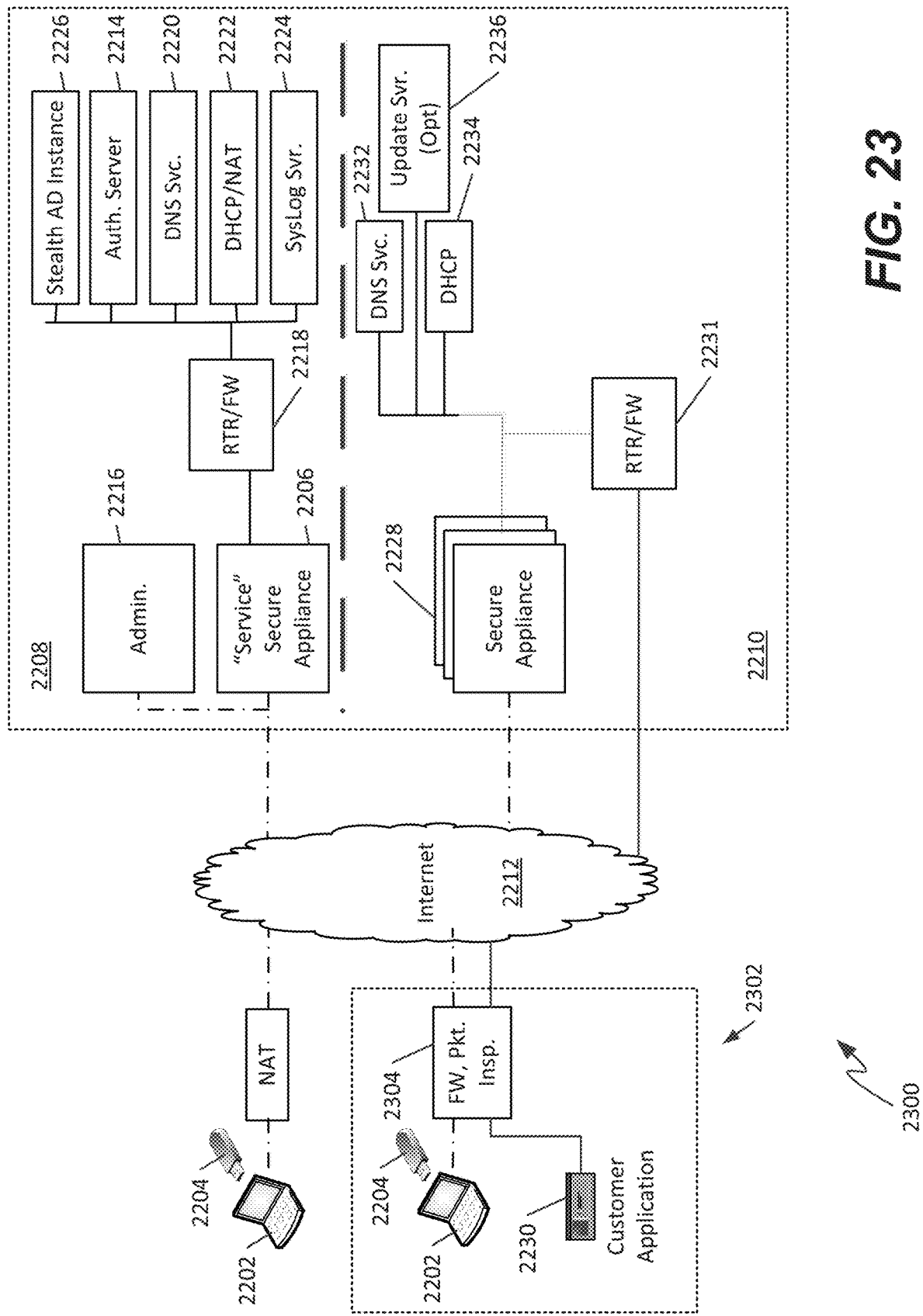
FIG. 23 illustrates a second example distributed system in which a secure terminal can be updated during secure connection to a customer virtual network, according to a possible embodiment of the present disclosure.
Figure 24:
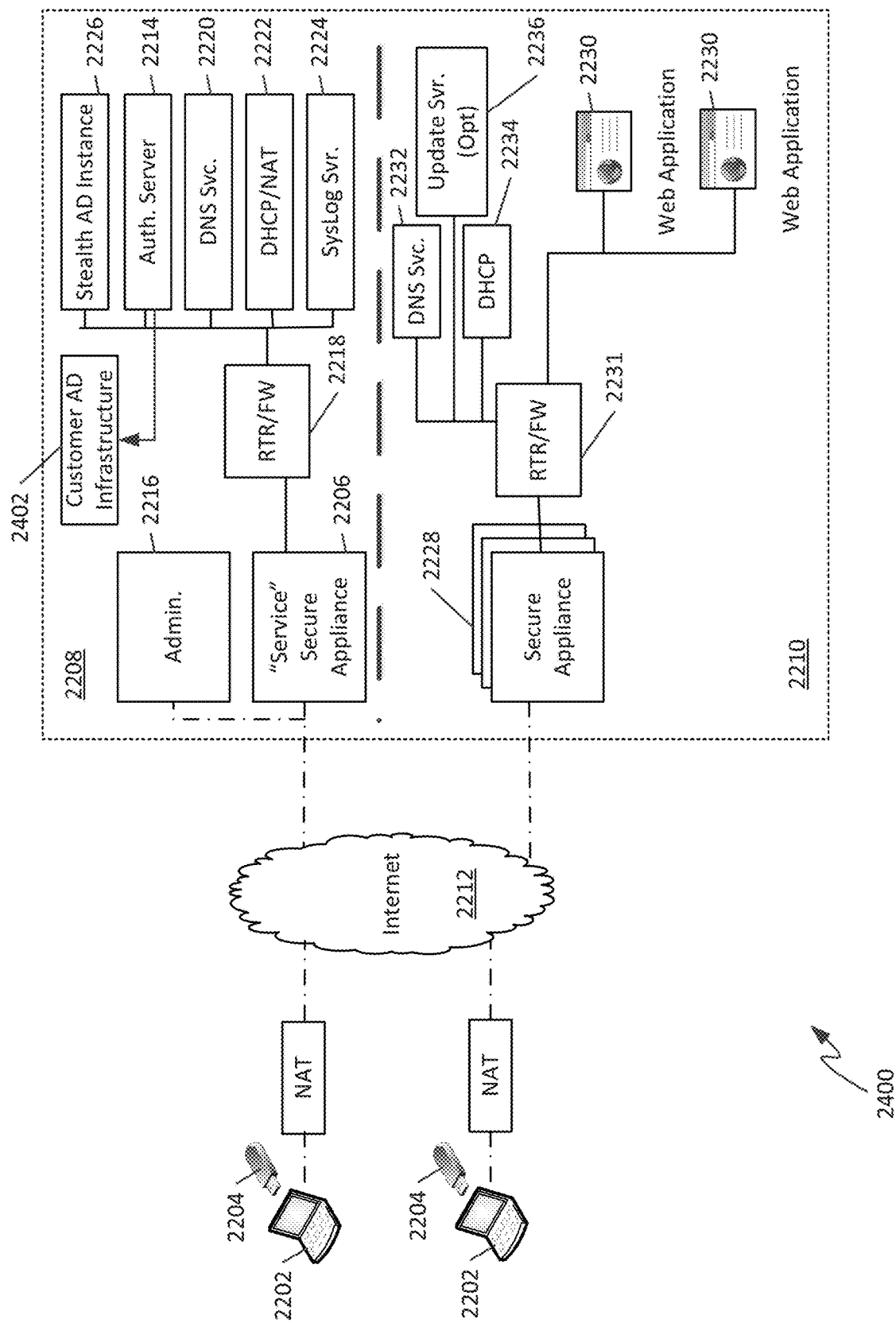
FIG. 24 illustrates a third example distributed system in which a secure terminal can be updated during secure connection to a customer virtual network, according to a possible embodiment of the present disclosure.

FIGS. 22-24 illustrate three example networks that can be deployed to manage encryption keys and provide software updates to secure client software. FIG. 22 illustrates an example distributed system 2200 in which a secure terminal can be updated during secure connection to a customer virtual network, according to a first possible embodiment of the present disclosure. The distributed system 2200 includes a pair of client computer systems 2202, illustrated as being generalized computing devices having associated secure boot devices 2204. The client computer systems 2202 can be located at a common location, or can be at different locations. The client computer systems 2202 can also be associated with the same or different customers, and the users of the client computer systems 2202 can be part of the same or different communities of interest.

The secure boot devices 2204 can be, for example, USB-based memory devices storing a plurality of software modules used to create a secure terminal at the client computer systems 2202. As mentioned briefly above, each of the secure boot devices 2204 can optionally include stored thereon a secure service key and address identifier of a service appliance, such as service appliance 2206 useable to securely connect to a service enclave 2208. In such embodiments, the service key can, for example, be stored within a shell operating system's registry settings. Connection to the service enclave 2208, and subsequently to a customer enclave 2210 (discussed in further detail below) occurs via internet 2212.

An authorization server 2214 within the service enclave 2210 transmits a cryptographic data set to the client computer system 2202, which can act to validate the user and provide, for example, one or more community-of-interest keys, one or more filters, a location of a secure gateway to which the customer can connect to access the customer enclave 2210, and other information. In certain embodiments, the authorization server 2214 encrypts the above information for transmission to the client computer system 2202 in a manner specific to that client computer system 2202 (e.g., using a key known by the client computer system due to data stored on a secure boot device 2204).

The service enclave 2208 includes a number of additional features not typically used directly by a user of a client computer system 2202, but rather for management of communities of interest and encryption keys associated therewith. In the embodiment shown, the service enclave 2208 includes a router connecting service appliance 2206 to a variety of other servers and networking equipment, including an administration appliance 2216, and a router 2218 configured to connect to the authorization server 2214 and other networking components used to maintain and monitor the service enclave 2208, including a DNS server 2220, a DHCP server 2222, a system logging server 2224, and a stealth administration server 2226. The administration appliance 2216 provides an interface to a remote administrator of the distributed system, for example an owner of the managed service (i.e. the service enclave 2208 and customer enclave 2210). The interface of the administration appliance 2216 allows an administrative user to configure one or more communities of interest and filters as discussed above, as well as configure virtual and physical networks in the service and customer enclaves, and schedule and configure updates needed for any trusted software modules executing on client computer systems 2202 and stored on secure boot devices 2204. Additional functionality could be incorporated into the administration appliance 2216 as well The stealth administration server 2226 can, in some embodiments, maintain a listing of communities of interest, as well as a listing of authentication information and users associated with that authentication information. The authentication information can be username and password information, a cryptographically-signed certificate, or can be PIN-based or other code information associated with a particular secure boot device 2204. This information can be accessed by the authorization server 2214 in response to receipt of requests for access to a customer enclave received from client computer systems 2202. It is noted that each of these components could be a physical server system, or could be implemented as a virtual system within the service enclave 2208.

In certain embodiments, the authorization server 2214 or some other component within the service enclave 2208 can also transmit to the client computer system 2202 an update script alongside the one or more filters, community-of-interest keys, and other information used for establishing a secure connection to a customer enclave 2210. In some embodiments, the authorization server 2214 transmits the update script when an update becomes available to alter the one or more secure software modules stored on a secure boot device 2204 (e.g., a version of the software modules identified by the client device as present on the secure boot device is out of date). As discussed above, in some embodiments, the authorization server 2214 transmits encrypted community-of-interest keys and other information to the client computer system 2202 such that the encryption is performed in a manner specific to that client device.

When a customer wishes to initiate communication with a customer enclave 2210, the customer will establish a secure tunnel with an identified secure gateway 2228 using the one or more secure community-of-interest keys received as part of the cryptographic data set from the authorization server 2214. Once the secure connection is established with the secure gateway 2228, the customer can access one or more additional resources within the customer enclave 2210, such as a web application 2230 or other application configured to allow secure transactions, or a hosted application or data storage, as discussed above. The customer enclave 2210 optionally includes a router 2231 or other internal logical routing equipment for directing customer communications to a particular application (e.g., web application 2230) or area associated with that customer, based on identifying users associated with that customer by the communities of interest to which they belong. The customer enclave 2210 also, in the embodiment shown, includes a DNS server 2232 and a DHCP server 2234, useable to route data among various virtual private networks and/or systems present within the customer enclave.

In the embodiment shown in FIG. 22, an update server 2236 is located within the customer enclave 2210, and is configured to, based on the contents of an update script delivered to the client computer system 2202 by the authorization server 2214. To update the software on the client computer system 2202, the update server 2236 will transmit to the client computer system 2202 a set of one or more software modules useable to implement the secure connection between the client device and one or both of the service enclave 2208 and the customer enclave. The set of one or more software modules can be a complete replacement of the software modules present in rewritable memory of the secure boot device 2204, or can alternatively include only a portion of the information included on the secure boot device.

Figure 25:
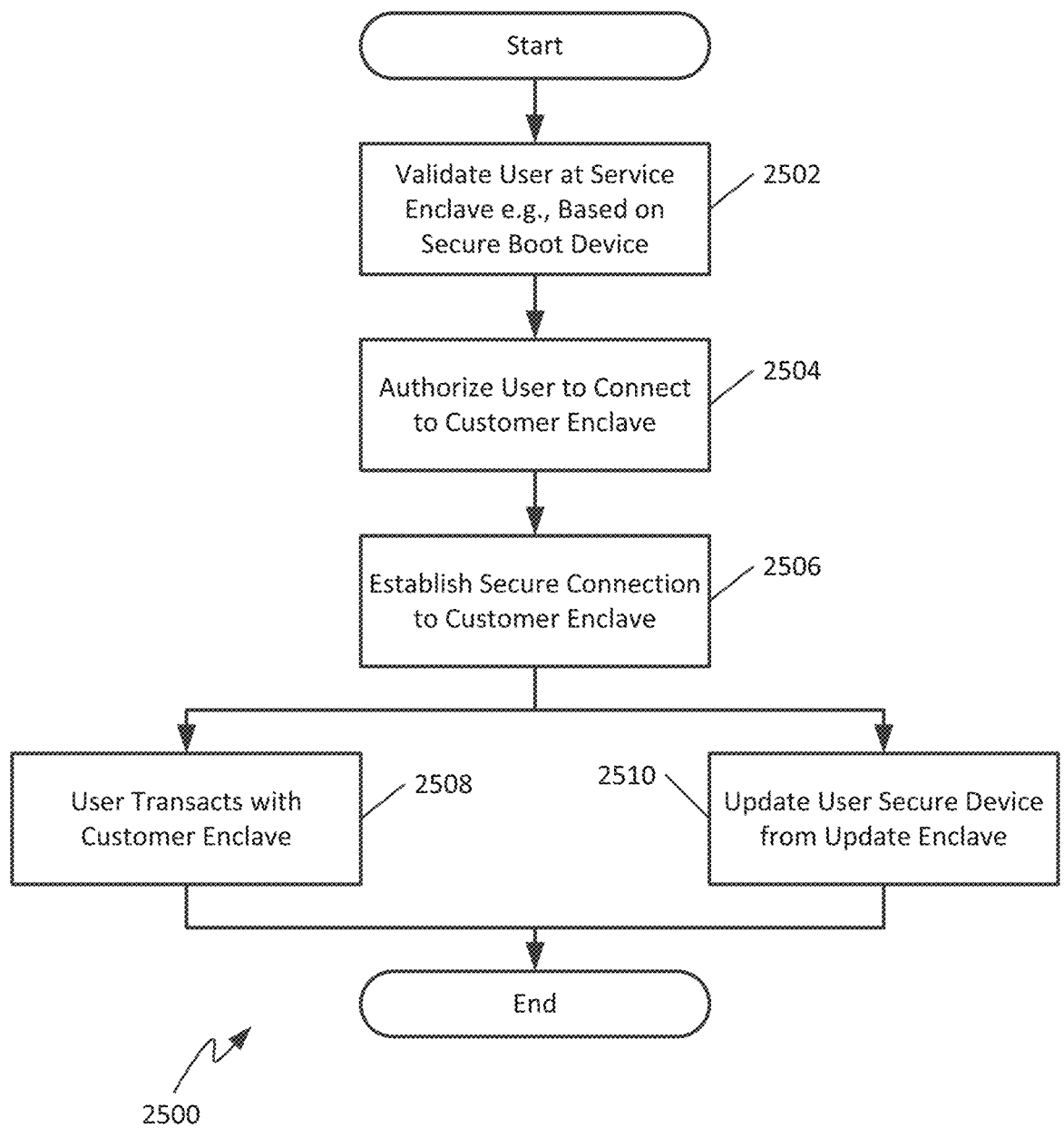
FIG. 25 is a flowchart of methods and systems for updating a secure virtual terminal connected to a distributed system, according to a possible embodiment of the present disclosure.

As discussed further in connection with FIG. 25, below, the update server 2236 can deliver an update as defined on the update script concurrently with a client computer system 2202 performing one or more transactions in the customer enclave 2210, such that the update occurs in the background (i.e., is opaque to the user of the client computer system 2202). In certain embodiments, the size of an update can be substantial (e.g., greater than 1 gigabyte); as such, the update transfer process for transmitting the update to the client computer system 2202 can be interruptible, and can be restored during a next subsequent connection between the client computer system 2202 and the customer enclave 2210. For example, a user can direct or schedule an update using update client software stored on a secure boot device, such as discussed above in connection with FIG. 11B.

Additionally, the update client software can, in certain embodiments, allow a user to view a state of the update (e.g., amount of update software that has been downloaded or is yet to be downloaded).

In an alternative embodiment to that shown in FIG. 22, the update server 2236 can be located within the service enclave 2208, rather than the customer enclave 2210. In such embodiments, when the client computer system 2202 is securely connected to the customer enclave 2210, the client computer system 2202 can concurrently maintain a connection to the service enclave via the service key. In such embodiments, the client computer system 2202 can also continue to communicate with the service enclave, for example to receive software updates to the secure boot device 2204 from the update server 2236.

In still a further alternative embodiment to that shown in FIG. 22, the update server 2236 can be located within a separate update enclave. Such a separate update enclave can include one or more computing systems, such as those shown to be incorporated in the service enclave 2208, but could be used to separate the authentication and updating responsibilities across multiple enclaves. This could be used, for example, to reduce bandwidth stress on the service enclave and customer enclave, depending upon the number of authorization requests and updates required.

FIG. 23 illustrates a second example distributed system 2300 in which a secure terminal can be updated during secure connection to a customer virtual network. In the distributed system 2300, web application 2230 resides within a customer network 2302. The customer network 2302 can be located behind a firewall 2304, separating it from the internet 2212. In this arrangement, although the customer of the managed service can retain control over the web application 2230, communication with the customer enclave 2210 from the customer network 2302, as well as from customers remote from or otherwise detached from the customer network (e.g., client computer system 2202a) can connect to the customer enclave 2210 and service enclave 2208 for updates, data storage, and other features by way of a secure connection, for example using a secure boot device 2204.

FIG. 24 illustrates a third example distributed system 2400 in which a secure terminal can be updated during secure connection to a customer virtual network. In this arrangement, the distributed system 2400 can be located entirely within a customer's enterprise network, such that only that customer will access the service enclave 2208 and customer enclave 2210, with each of the communities of interest defined within the system 2400 representing separate departments or sub-organizations within the customer's infrastructure. In this embodiment, the arrangement of the service enclave 2208 and customer enclave 2210 can generally correspond to that shown in FIG. 22; however, in this embodiment, an additional interface between the authorization server 2214 and a customer administration infrastructure 2402 may also be included in the service enclave. The customer administration infrastructure 2402 can, in certain embodiments, include a customer's internal user validation system, such as a local area network authentication system, for example Active Directory-based authentication (e.g., Kerberos), or other type of authentication system that can receive external authentication messages.

As with FIG. 22, above, in both of FIGS. 23-24, the update server 2236 can be located either within the customer enclave 2210 as shown, or optionally within the service enclave 2208 instead. Example reasons for placing the update server 2236 within the service enclave 2208 include separation of bandwidth required for responding to requests from a customer enclave 2210 from bandwidth required for performing an update, and maintaining more universal control over updates of security features, for example in the case of a managed service provider wishing to control update distribution from a service enclave while allowing customers to manage/control their own customer enclave resources. Other reasons for placing the update server 2236 in the customer enclave 2210 or the service enclave 2208 may exist as well. FIG. 25 is a flowchart of a method 2500 for updating a secure virtual terminal connected to a distributed system, according to a possible embodiment of the present disclosure. The method 2500 can be performed, for example, in any of the distributed systems described above, particularly those discussed in connection with FIGS. 22-24 in which an update server resides within a service enclave or customer enclave. The method 2500 begins with a user of a client device transmitting a request for validation at a service enclave, such as at an authorization server (step 2502). This can include, for example, transmitting a username and password, cryptographically-signed certificate, or PIN number for authorization of a particular user, or an identity of a particular secure boot device, or some combination thereof. Optionally, the validation step can also include transmitting an identifier of a version of a set of software modules stored at a client device. The software modules can include, for example, one or more secure software modules stored on a secure boot device, as discussed above in connection with FIGS. 10-16. Alternatively, the software modules can include one or more driver files used to perform cryptographic communications, such as the driver files discussed above in connection with FIGS. 1-9. Other possibilities exist as well.

After the user is validated at the service enclave, the user can be authorized to connect to a customer enclave (step 2504). This authorization can take a number of forms. In some embodiments, the authorization includes transmitting to the client device associated with the authorized user or secure boot device a cryptographic data set including information required to create a secure connection to the customer enclave, such as one or more community-of-interest keys and associated filters, an address of a particular gateway device through which to access the customer enclave, and other cryptographic information. Authorization of the client can include, for example, encrypting and transmitting to the client device the one or more community-of-interest keys and associated filters, as well as other information used to connect to a particular gateway or customer enclave. Additionally, this authorization step can include transmitting to the client device one or more update scripts defining an update process to occur on the client device.

A secure connection can be established to the customer enclave (step 2506) once the client device receives the necessary cryptographic data. This can include, for example, establishing a tunnel between the client device and a gateway device identified by the authorization server in the service enclave, using one or more community-of-interest keys provided to the client device, as discussed above.

Once connected to the customer enclave, a client device can be used to perform transactions in the customer enclave (step 2508). Various types of transactions could be performed; example types of transactions are discussed above in connection with FIGS. 10-16. Concurrently with the user connected to the customer enclave, an update server can deliver to a client device one or more updated software modules, based on the update script received at the client device (step 2510). In some embodiments, the software modules can be, for example trusted software modules 1101-1104 of FIG. 11A, as included within a secure boot image. In other embodiments, the software modules can include one or more filters, community-of-interest keys, service keys or service enclave locations, driver software, or other information to be installed or stored at a client device for use in establishing a secure connection between the client device and a remote system, or for ensuring that the client device is not infected by malware of some type when such communication is established.

Although illustrated as occurring concurrently with transactions performed using the customer enclave, it is recognized that transmission of an update to a secure client device can occur either before or after commencement of transactions at the customer enclave. For example, in some embodiments, at least a portion of an update can occur prior to launch of an application for performing such transactions. Other arrangements and orders of operations within the method 2500 are possible as well.

It is recognized that in performing this update step, the update server can, in various embodiments, transmit an encrypted, compressed version of one or more software modules (or portions thereof) to a client device for use as a replacement to modules in a secure boot image. In some embodiments, one or more modules are transferred to a client device associated with a secure boot device, and then transmitted to the secure boot device once completely received, thereby overwriting existing trusted software modules. In other embodiments, the modules to be updated are transferred and stored in a temporary storage area of the secure boot device. In such embodiments, when completely transferred, the modules are then copied into a location reserved for the trusted software modules on the secure boot device, thereby overwriting the prior versions of the trusted software modules. In this embodiment, different client devices could be used for different connection sessions with the update server without requiring the updated software modules to be entirely resent if not completed during a previous session.

Referring now to FIGS. 21-25 generally, it can be seen that, through use of a two-level key management scheme, communities-of-interest and keys related thereto can be managed and updated in a centralized manner, allowing changes in a service enclave to be propagated to users and customer enclaves as customers access the managed service. Additionally, through use of a dedicated update server, optionally included within a service enclave, a customer enclave, or an entirely separate update enclave, update processes can be offloaded from a service or application hosting system, allowing updates to be performed concurrently with transaction processing (e.g., at the customer enclave). This reduces the bandwidth demands from the customer enclave and service enclave, each of which may be concurrently hosting multiple users associated with an entity or community of interest, or multiple entities or communities of interest.

VI. Switching Between Multiple Languages of a Remote Desktop Client

Referring now to FIGS. 26-29, generally, disclosed are methods and systems for switching between multiple languages of a remote desktop client. As will be described herein, the remote desktop client, accessible through a secure boot device, is configured to be displayed in multiple languages that may be stored in the custom content area 1128 of the secure boot device, such as secure boot device 1002 shown in FIG. 11B.

Figure 26:
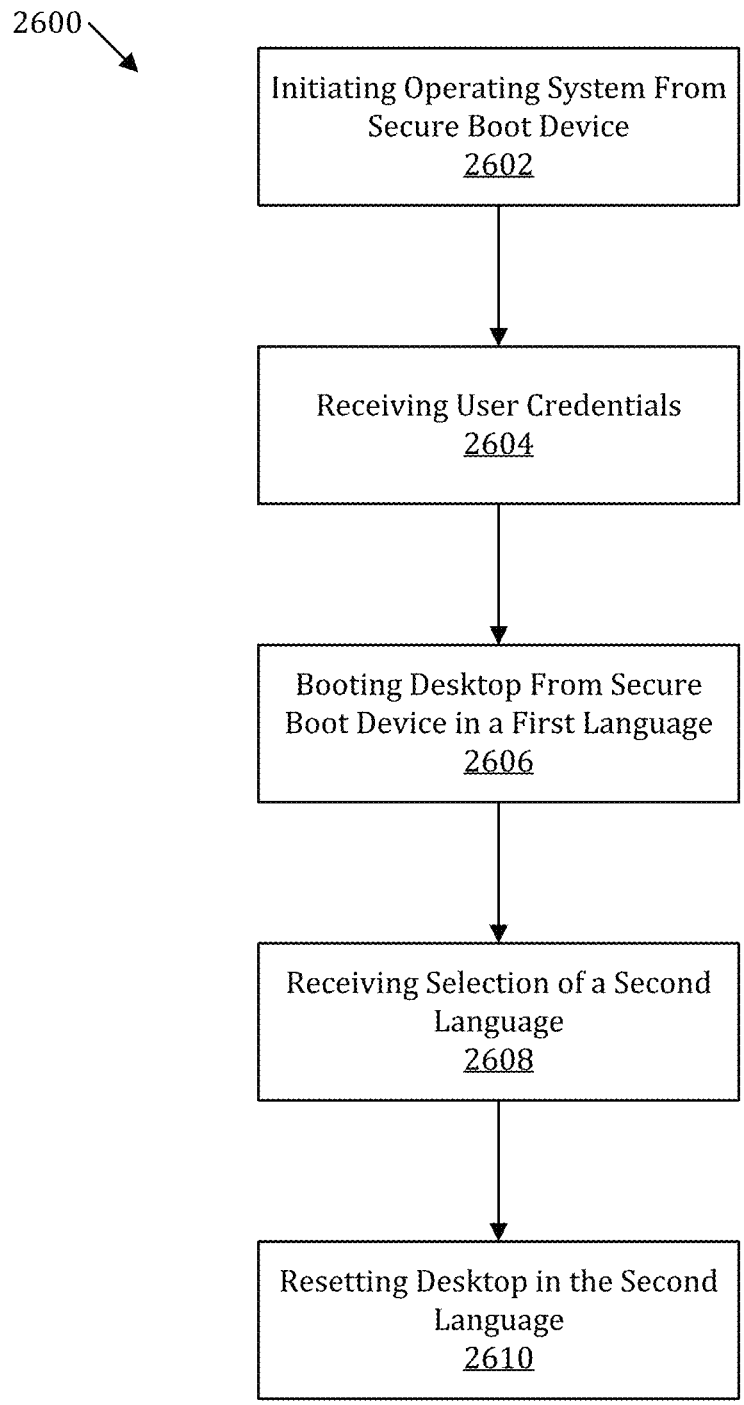
FIG. 26 is a flowchart of an example method for switching languages of a remote desktop client operating on a secure boot device.

FIG. 26 illustrates a flowchart of an example method 2600 for switching languages of a remote desktop client operating on a secure boot device 1002. In the example illustrated, the method 2600 is performed by the secure boot device 1002. In this example, the method 2600 begins with step 2602 in which the operating system is initiating from the secure boot device 1002. In some embodiments, this step 2602 of initiating an operating system from the secure boot device 1002 begins by initially suspending the operating system used by the client computing device, such as client computer system 1006 and thereafter rebooting using an operating system stored on the secure boot device 1002. As described herein, the secure boot device enables a client computing device to initiate a secure operating system directly from the secure boot device 1002 without the need for additional, dedicated hardware. The operating system stored in the secure boot device 1002 causes trusted system software to be loaded and a client terminal process module, such as client terminal process module 1102 of FIG. 11, to be executed.

In step 2604, the secure boot device 1002 receives a user's credentials such as client identification and a password. In other embodiments, other credentials are used to identify a user. In an example, the secure boot device receives the user's credentials via the client terminal process module 1102. In some embodiments, the credentials received from the user are sent to an authentication server to verify the user's identity.

In step 2608, upon verification of the user's identity, a secure connection is established between the computing system hosting the secure boot device 1002 and a remote server and accordingly, a desktop running on the remote desktop client is booted in a first language. As will be described in further detail, the desktop may include selectable and non-selectable user interface elements such as, for example, secure and non-secure application icons and a menu or tool bar. In this example, the desktop is booted in a first, default language such as English. However, it is understood that any default language may be set based on the location or preference of the user. As will be described in further detail, the icons and associated text may be displayed in different languages. In an example, a user may select the desired language in the user settings feature of a toolbar.

In step 2610, the computing system hosting the secure boot device 1002 receives a selection of a second language that is different from the first language or currently displayed language. As described herein, such a selection may be received from a settings feature of a toolbar, and in other embodiments, the selection may be accessible using a different desktop feature.

Upon receiving the selection of the second language, in step 2612, the computing system hosting the secure boot device 1002 resets the desktop in the second language. In an example, the desktop reset performed by the computing system hosting the secure boot device 1002 does not re-start the operating system running on the secure boot device 1002, but rather, merely resets the desktop without requiring a user to re-enter credentials as was performed in step 2604.

Figure 27:
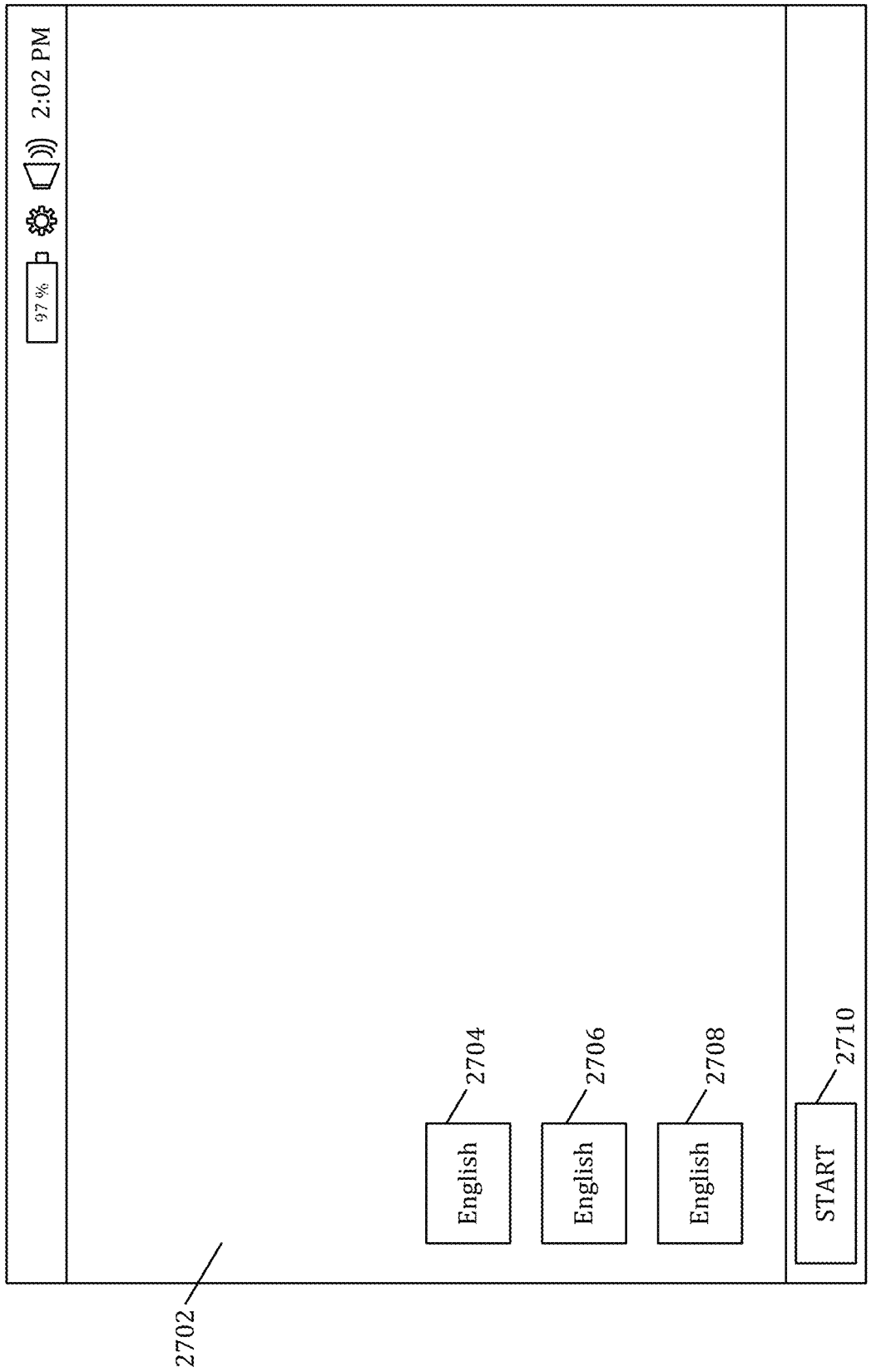
FIG. 27 is an example screenshot of a desktop running on the remote desktop client in a first language.

FIG. 27 is an example screenshot of a desktop 2702 running on the remote desktop client in a first language. As illustrated in this example, the language is English and each application icon 2704, 2706, and 2708 as well as the start menu 2710 are displayed in English. Although three application icons 2704, 2706, and 2708 and a start menu 2710 are displayed, it is understood that more or fewer icons may be displayed. In addition to the text identifying each application icon 2704, 2706, and 2708, the text displayed when the application icon 2704, 2706, and 2708 is selected is also displayed in English. For example, if application icon 2704 is an internet browser application, the text associated with the internet browser and webpages themselves are also displayed in English.

Figure 28:
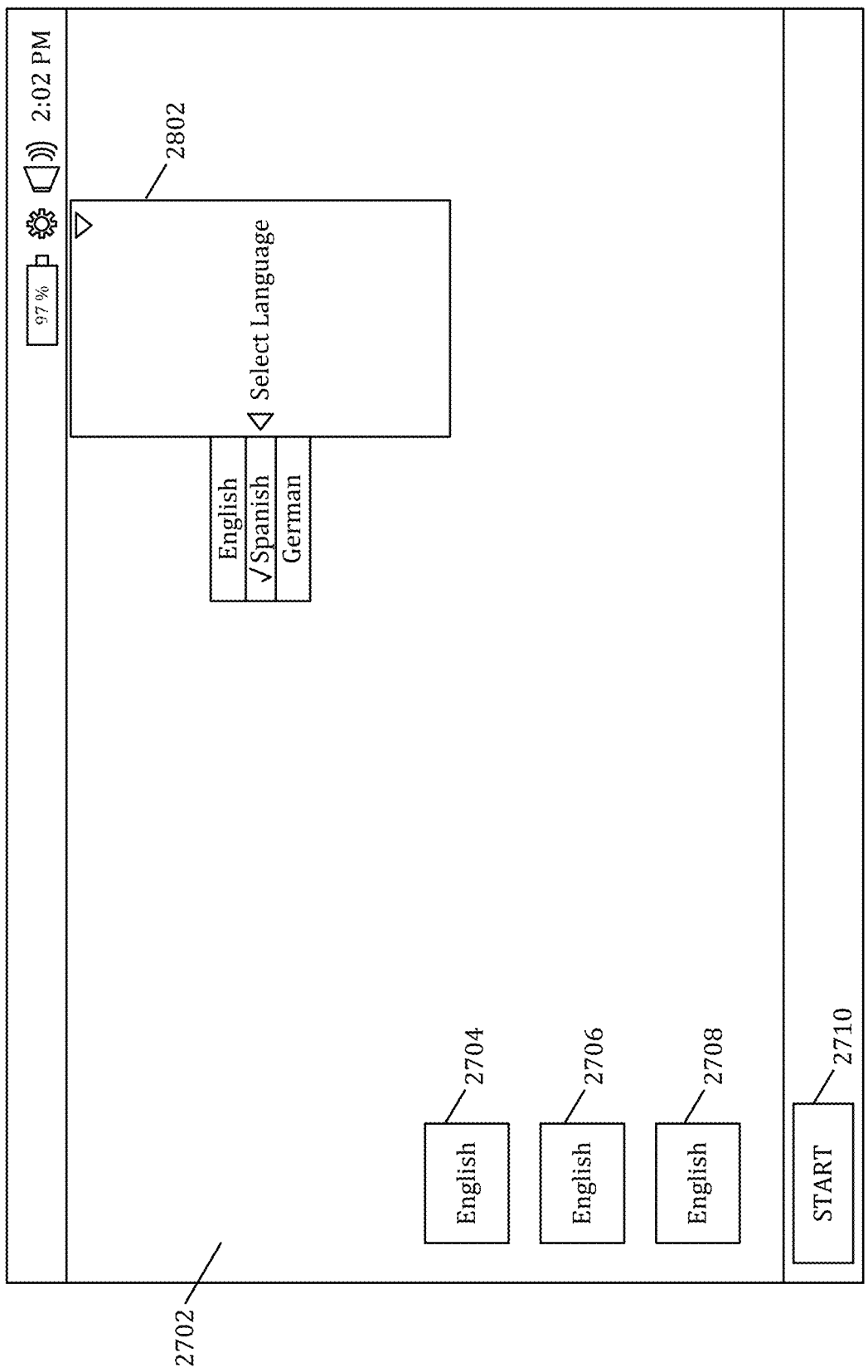
FIG. 28 is an example screenshot of a desktop having a toolbar for switching languages of a remote desktop client.

FIG. 28 is an example screenshot of a desktop 2702 having a toolbar 2802 for allowing the dynamic switching of languages displayed by a remote desktop client. Continuing the example illustrated in FIG. 27, the default or first language displayed is English. As illustrated in FIG. 28, the language may be dynamically updated, using toolbar 2802, upon a user's selection of a language from a plurality of language options. Although this example illustrates three languages (English, Spanish, and German) it is understood that more or fewer languages may be optionally provided. As illustrated in this example, the second selected language is Spanish.

Figure 29:
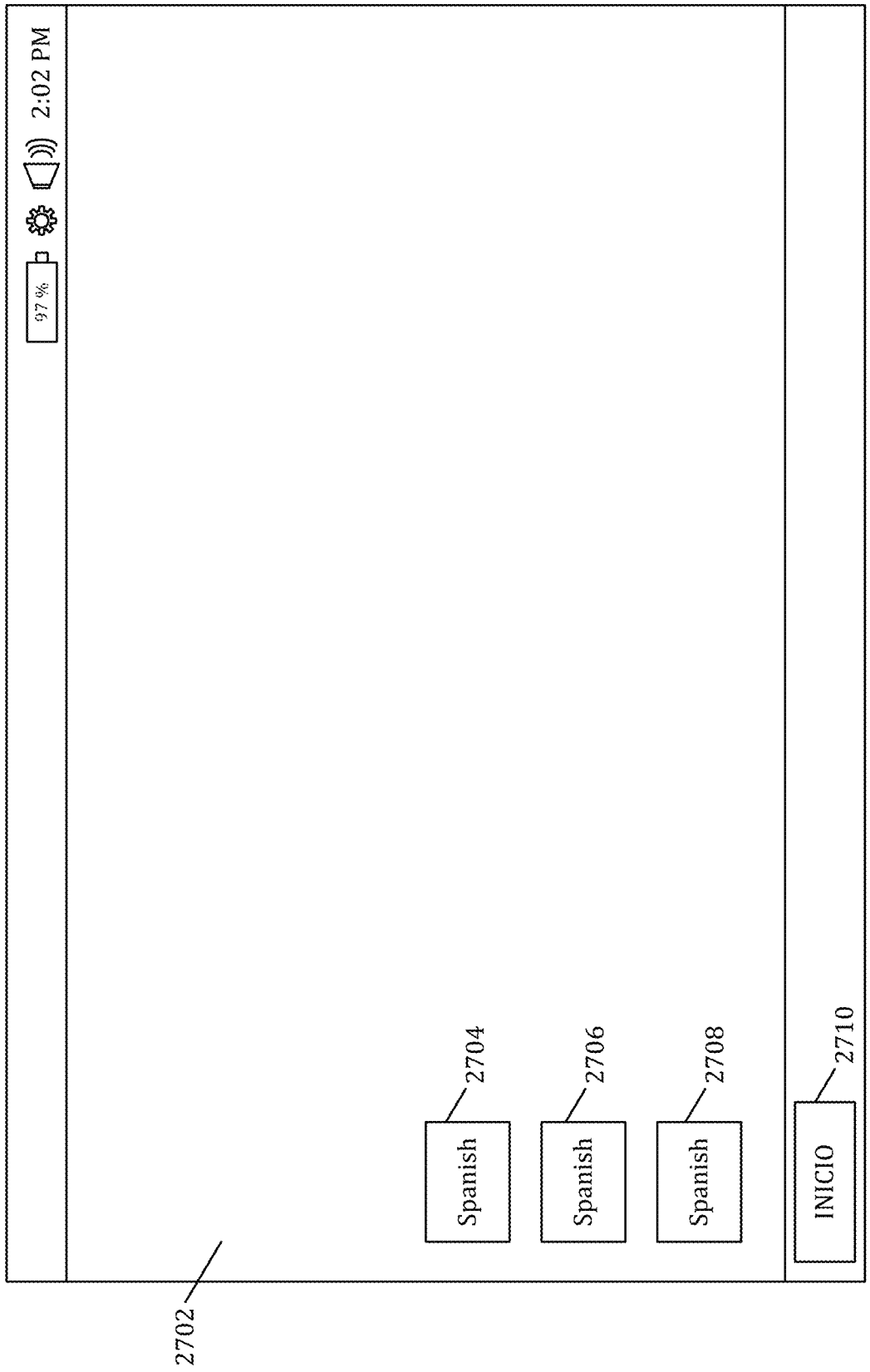
FIG. 29 is an example screenshot of a desktop operating system running on the remote desktop client in a second language.

FIG. 29 is an example screenshot of a desktop operating system running on the remote desktop client in a second language. Continuing the example displayed in FIG. 28 wherein the second selected language is Spanish, the desktop is dynamically reset without re-booting the operating system. Accordingly, user credentials are not required to be re-entered upon a language change. As is displayed in FIG. 29, the three application icons 2704, 2706, and 2708 and a start menu 2710 are now displayed in Spanish. Still further, not only is the identifying text associated with the application icon displayed in Spanish, but so is the text associated during operation of each application.

VII. Switching Between Multiple Brandings

Referring now to FIGS. 30-33, generally, disclosed are methods and systems for switching between multiple brandings associated with a different entity from which a user may receive of a remote desktop client. As will be described herein, the remote desktop client, accessible through a secure boot device, is configured to allow a user to be associated with multiple brandings. Each branding may be associated with a different entity such as a school, place of employment, or other organization, wherein each entity provides the user with authorization to various communities of interest and therefore a particular set of applications. Furthermore, each branding may be associated with different settings, desktop backgrounds, languages, and security settings.

The custom content area 1128 of FIG. 11 may store specific provisioning information, for example a location of a secure server to connect to, as well as various options for connection. The custom content area 1128 can also optionally store branding information, for example to indicate the particular user or entity distributing the secure boot device 1002 to its employee or affiliate.

Figure 30:
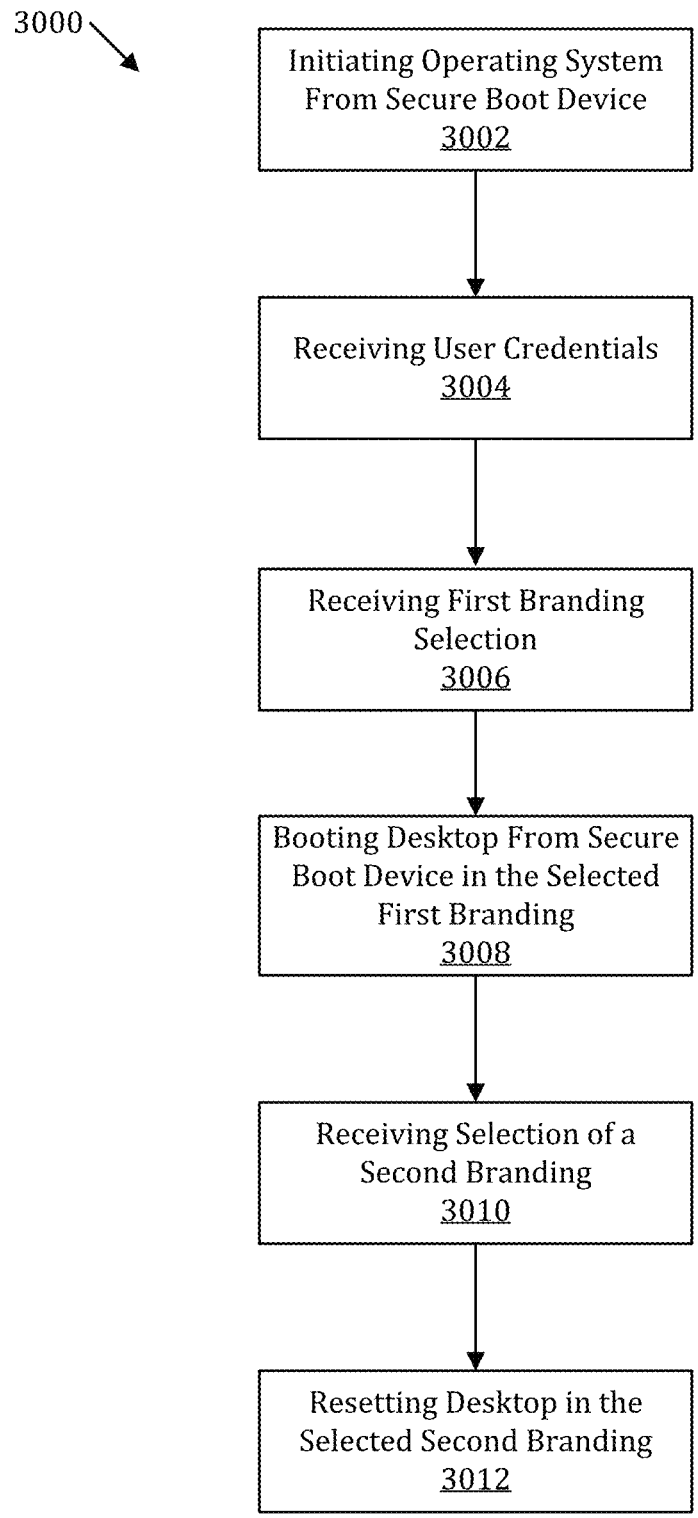
FIG. 30 is a flowchart of an example method for switching brandings of a remote desktop client operating on a secure boot device.

FIG. 30 illustrates a flowchart of an example method 3000 for switching between multiple brandings of a remote desktop client operating on a secure boot device, such as secure boot device 1002 illustrated in FIG. 10. In the example illustrated, the method 3000 is performed by the secure boot device 1002. In this example, the method 3000 begins with step 3002 in which the operating system is initiating from the secure boot device 1002. In some embodiments, this step 3002 of initiating an operating system from the secure boot device 1002 begins by initially suspending the operating system used by the client computing device, such as client computer system 1006 and thereafter rebooting using an operating system stored on the secure boot device 1002. As described herein, the secure boot device 1002 enables a client computing device to initiate a secure operating system directly from the secure boot device without the need for additional, dedicated hardware. The operating system stored in the secure boot device 1002 causes trusted system software to be loaded and a client terminal process module, such as client terminal process module 1102 of FIG. 11, to be executed.

In step 3004, the computing system hosting the secure boot device 1002 receives a user's credentials such as client identification and a password. In other embodiments, other credentials are used to identify a user. In an example, the secure boot device receives the user's credentials via the client terminal process module 1102. In some embodiments, the credentials received from the user are sent to an authentication server to verify the user's identity.

In step 3006, a selection of a first branding is received by the computing system hosting the secure boot device 1002. As will be described in further detail herein, each user is associated with at least one branding, wherein each branding is further associated with a different entity from which the user may receive authorization to operate the remote desktop client. For example, a user may be associated with two brandings: a work branding and a school branding, wherein the work branding and the school branding independently provide the user with separate authorization to operate a remote desktop client. Each branding may be associated with different communities of interests and therefore, when a first branding is selected, only those communities of interest associated with that user's particular branding may be accessed. For example, if a user selects a school branding, only those applications associated with the communities of interest to which the user belongs under the school branding may be accessed.

In step 3008, upon verification of the user's identity, a secure connection is established between the computing system hosting the secure boot device 1002 and a remote server and accordingly, a branding and associated desktop operating on the remote desktop client is booted in the selected branding. As will be described in further detail, the desktop may include selectable and non-selectable user interface elements such as, for example, secure and non-secure application icons that represent scripts for running secure and non-secure applications and a menu or tool bar. As is described herein, the secure boot device 1002 does not store any applications, but rather application scripts that may be operated through the secure boot device 1002. In this example, the selected first branding is booted, such as a school branding. In an example, a user may select the desired branding in the user settings feature of a toolbar.

In step 3010, the computing system hosting the secure boot device 1002 receives a selection of a second branding that is different from the selected first branding. In an example, the second branding may be a work branding or a researching branding. As described herein, such a selection may be received from a settings feature of a toolbar, and in other embodiments, the selection may be accessible using a different feature.

Upon receiving the selection of the second branding, in step 3012, the computing system hosting the secure boot device 1002 resets the desktop in the selected second branding. The user is associated with multiple brandings and as such, because the user had already provided authorization information, this example does not require the user to re-provide such information. In an example, the desktop reset performed by the computing system hosting the secure boot device 1002 does not re-start the operating system running on the secure boot device 1002, but rather, merely resets the branding without requiring a user to re-enter credentials as was performed in step 3004. In some examples, the desktop reset involves the shutting down and resetting of all stealth-related processes and the current desktop, which are then re-started for the newly selected branding. Accordingly, the branding is switched and the user is presented with a new desktop having particular security parameters. Because the operating system does not reboot, and because the user credentials provided by the user allowed the computing system hosting the secure boot device 1002 to obtain all communities of interest for that user, switching between brandings allows that computing system to switch between communities of interest associated with the user without requiring reauthentication.

Figure 31:
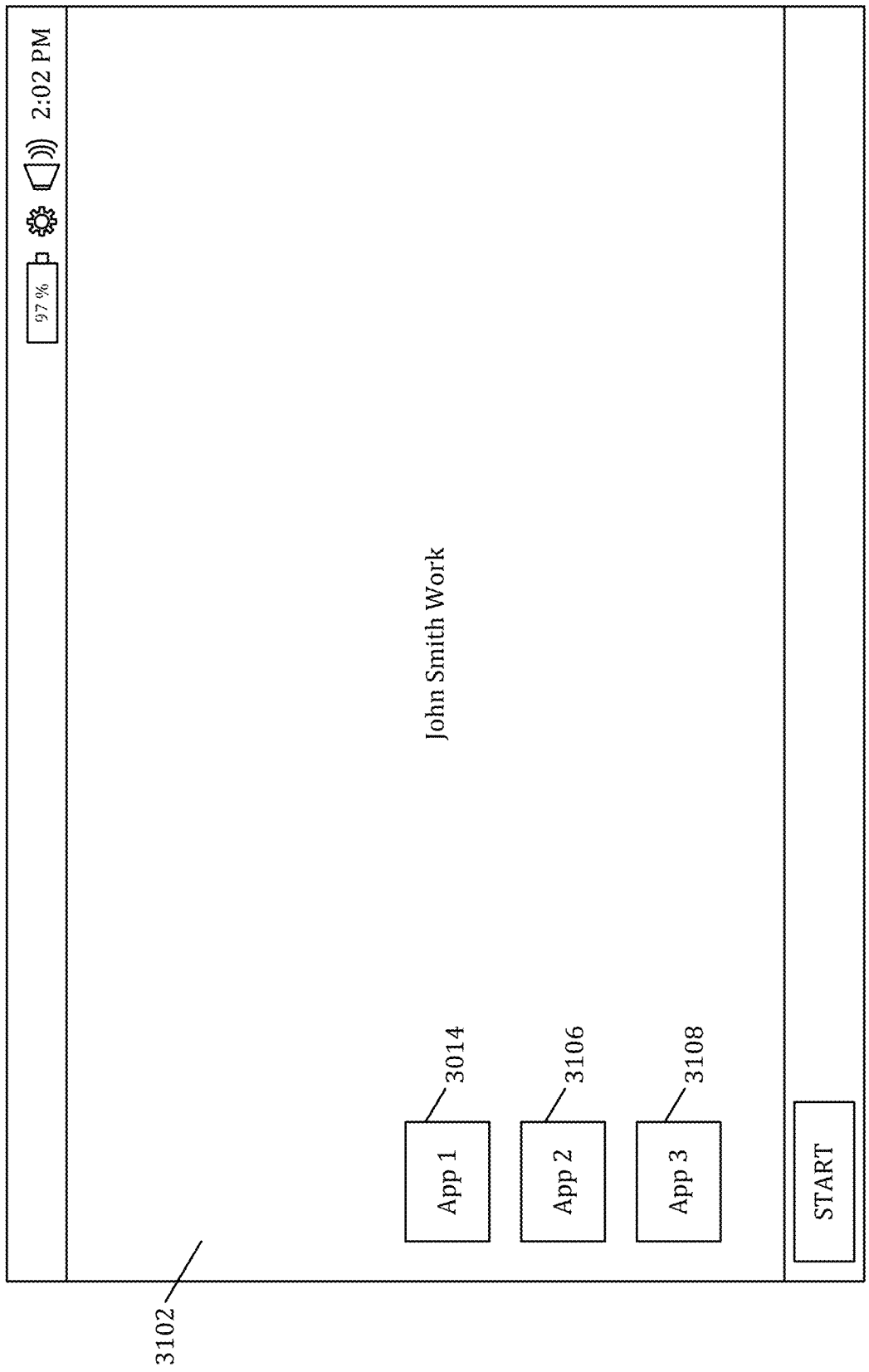
FIG. 31 is an example screenshot of a desktop running on the remote desktop client in a first branding.

FIG. 31 is an example screenshot of a desktop 3102 running on the remote desktop client in a first branding. In this example, the user is associated with a first branding, which is the user's place of employment. Accordingly in this example, the user is associated with particular security parameters that are associated with applications 1-3 3104, 3106, and 3108.

Figure 32:
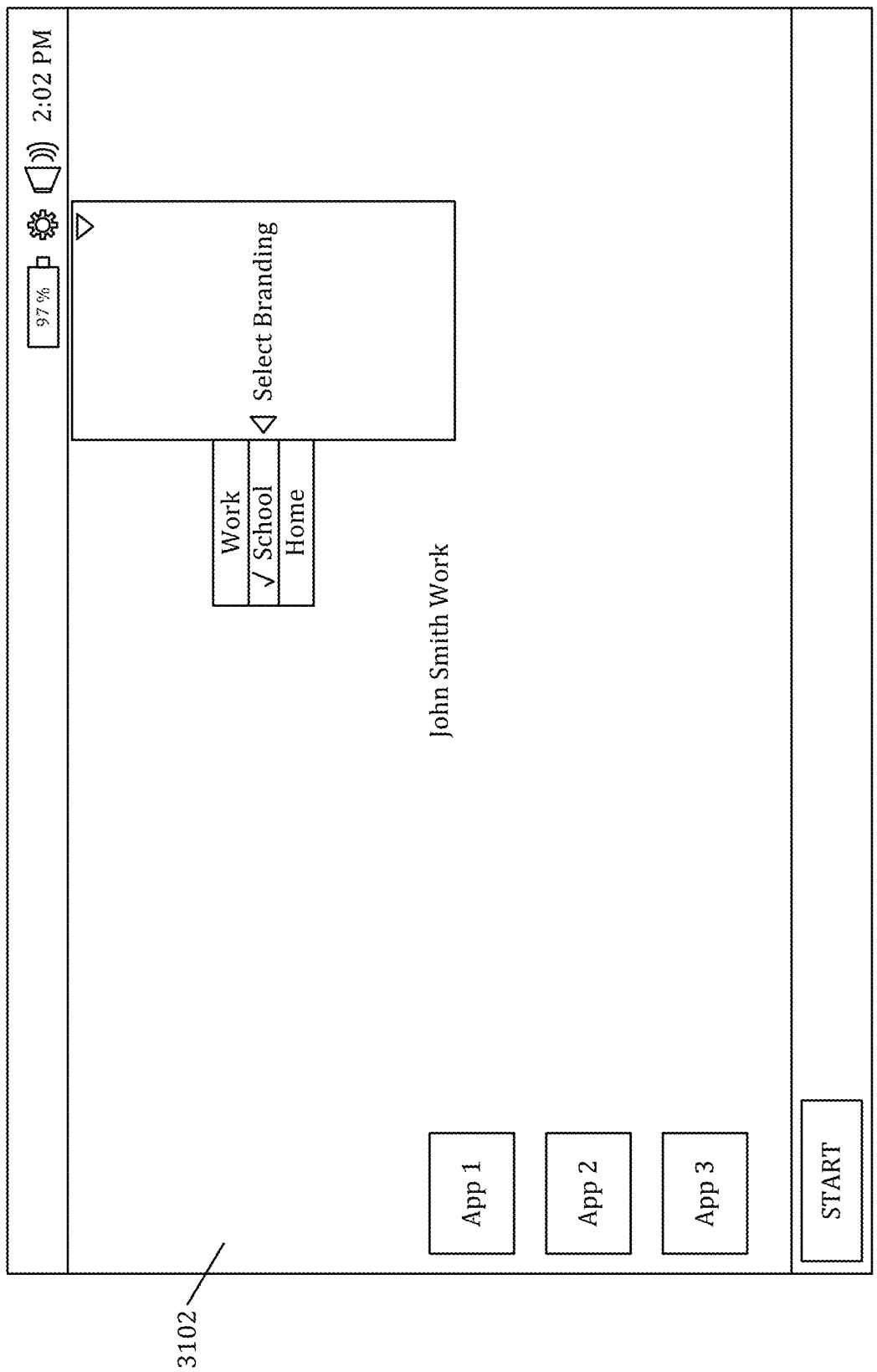
FIG. 32 is an example screenshot of a desktop having a toolbar for switching brandings of a user.
Figure 33:
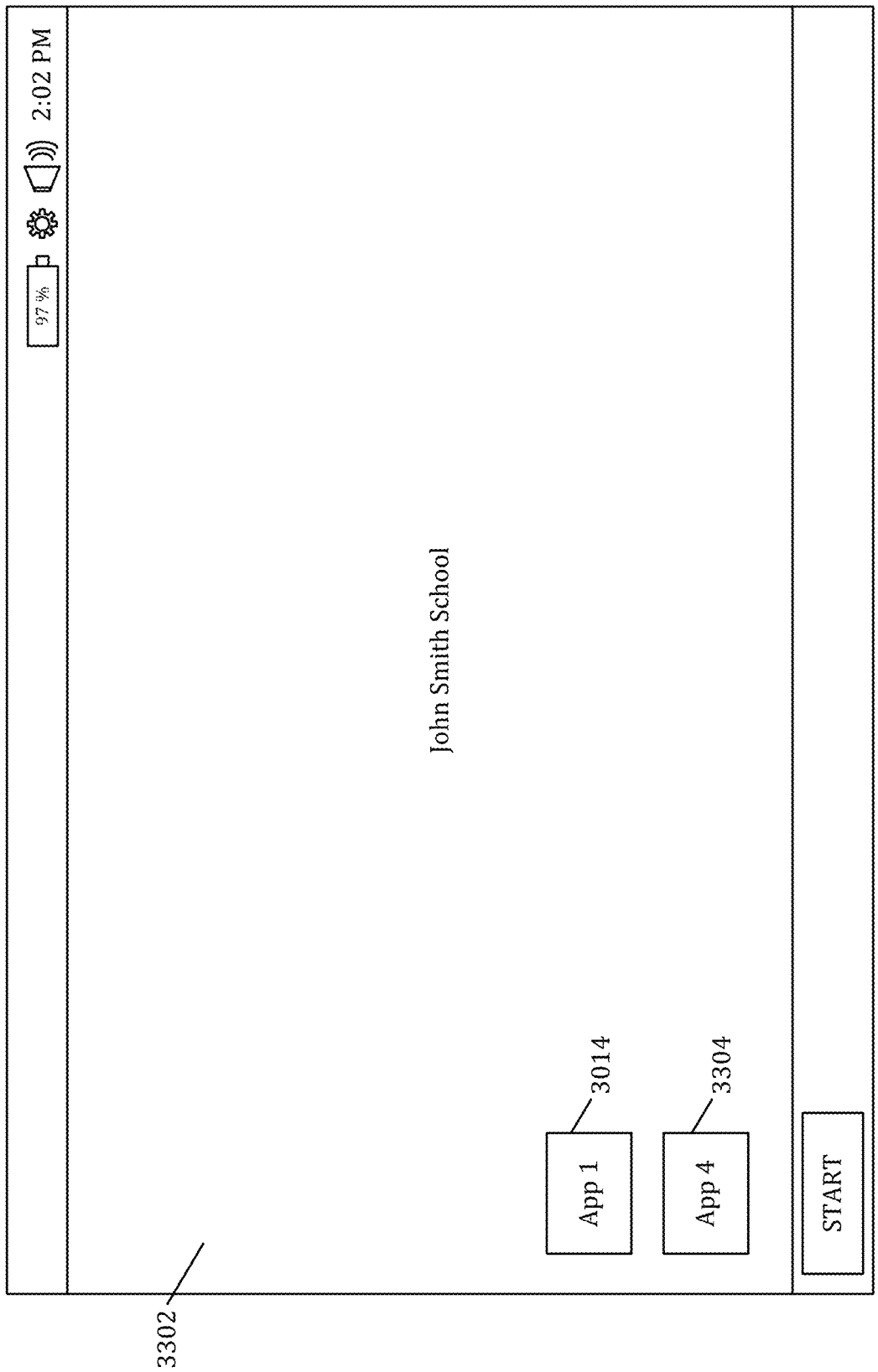
FIG. 33 is an example screenshot of a desktop operating system running on the remote desktop client in a selected second branding.

FIG. 32 is an example screenshot of a desktop 3102 having a toolbar 3202 for switching brandings of a user. Continuing the example illustrated in FIG. 31, the first selected branding was the user's work branding. As illustrated in FIG. 32, the user may dynamically change the branding, using toolbar 3202, upon the user's selection of a branding from a plurality of brandings with which the user is associated. Although this example illustrates three brandings (Work, School, and Home) it is understood that more or fewer brandings may be optionally provided for each user. As illustrated in this example, the second selected branding is the user's school branding. FIG. 33 is an example screenshot of a desktop 3302 running on the remote desktop client in the selected second school branding. As is illustrated, the desktop 3302 now only includes applications 1 3104 and application 4 3304. Accordingly, in this example, under the user's school branding, the user is only authorized to access application 1 3104 and application 4 3304.

VIII. Remote Desktop Operation within an Enterprise Using a Secure Boot Device

Referring now to FIGS. 34-38, generally, disclosed are methods and systems for operating a remote desktop client from a computing device hosting a secure boot device, such as secure boot device 2204 illustrated in FIG. 22. More particularly, the FIGS. 34-38 generally refer to the operation of a remote desktop client, from a secure boot device, while connected to a secure enterprise network. For example, FIGS. 34-38 demonstrate the capability of a user to log into the remote desktop client from the secure boot device 2204 connected to a client computing device from within the enterprise while also having the capability to communicate with one or more trusted endpoints within the secure enterprise network.

Figure 34:
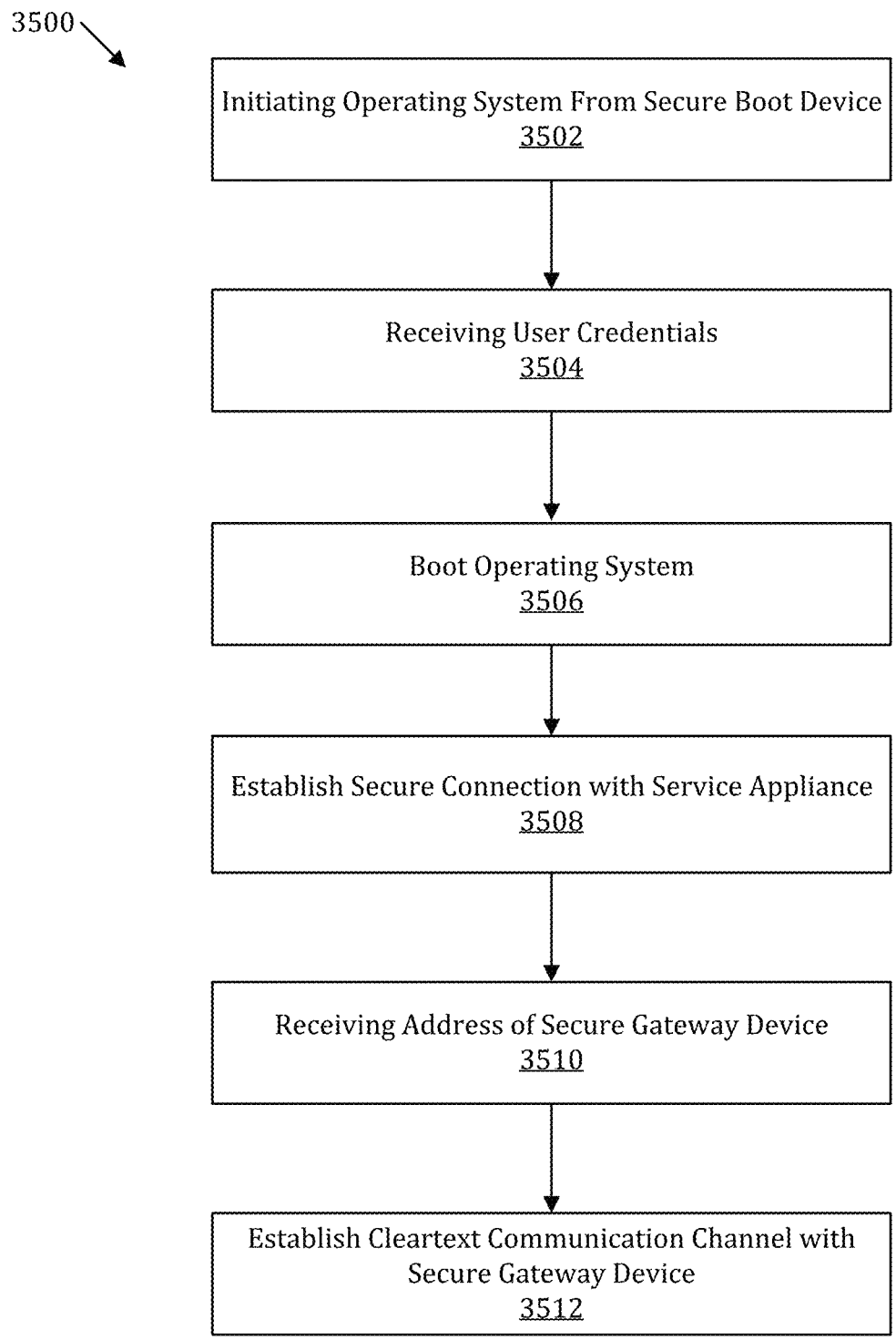
FIG. 34 is a flowchart of an example method for operating a remote desktop client from a secure boot device communicatively connected to a secure enterprise network.

FIG. 34 is a flowchart of an example method for operating a remote desktop client from a secure boot device 2204 communicatively connected to a secure enterprise network. In the example illustrated, the method 3500 is performed by the computing system, such as client computer system 2202 hosting the secure boot device 2204. In this example, the method 3500 begins with step 3502 in which the operating system is initiating from the secure boot device 2204. In some embodiments, this step 3502 of initiating an operating system from the secure boot device 2204 begins by initially suspending the operating system used by the client computing device, such as client computer system 2202 illustrated in FIG. 22 and thereafter rebooting using an operating system stored on the secure boot device 2204. As described herein, the secure boot device 2204 enables a client computing device to initiate a secure operating system directly from the secure boot device 2204 without the need for additional, dedicated hardware. The operating system stored in the secure boot device 2204 causes trusted system software to be loaded and a client terminal process module, such as client terminal process module 1102 of FIG. 11, to be executed.

In step 3504, the computing system hosting secure boot device 1002 receives a user's credentials such as client identification and a password. In other embodiments, other credentials are used to identify a user. In an example, the computing system hosting the secure boot device receives the user's credentials via the client terminal process module 1102. In some embodiments, the credentials received from the user are sent to an authentication server to verify the user's identity.

In step 3506, upon verification of the user's identity, a secure connection is established between the computing system hosting the secure boot device 2204 and a remote server. As will be described in further detail, the desktop may include selectable and non-selectable user interface elements such as, for example, secure and non-secure application icons that represent scripts for running secure and non-secure applications and a menu or tool bar. As is described herein, the secure boot device 2204 does not store applications or data, but rather application scripts that may be operated through the secure boot device 2204 upon verification of a user's identity.

Figure 35:
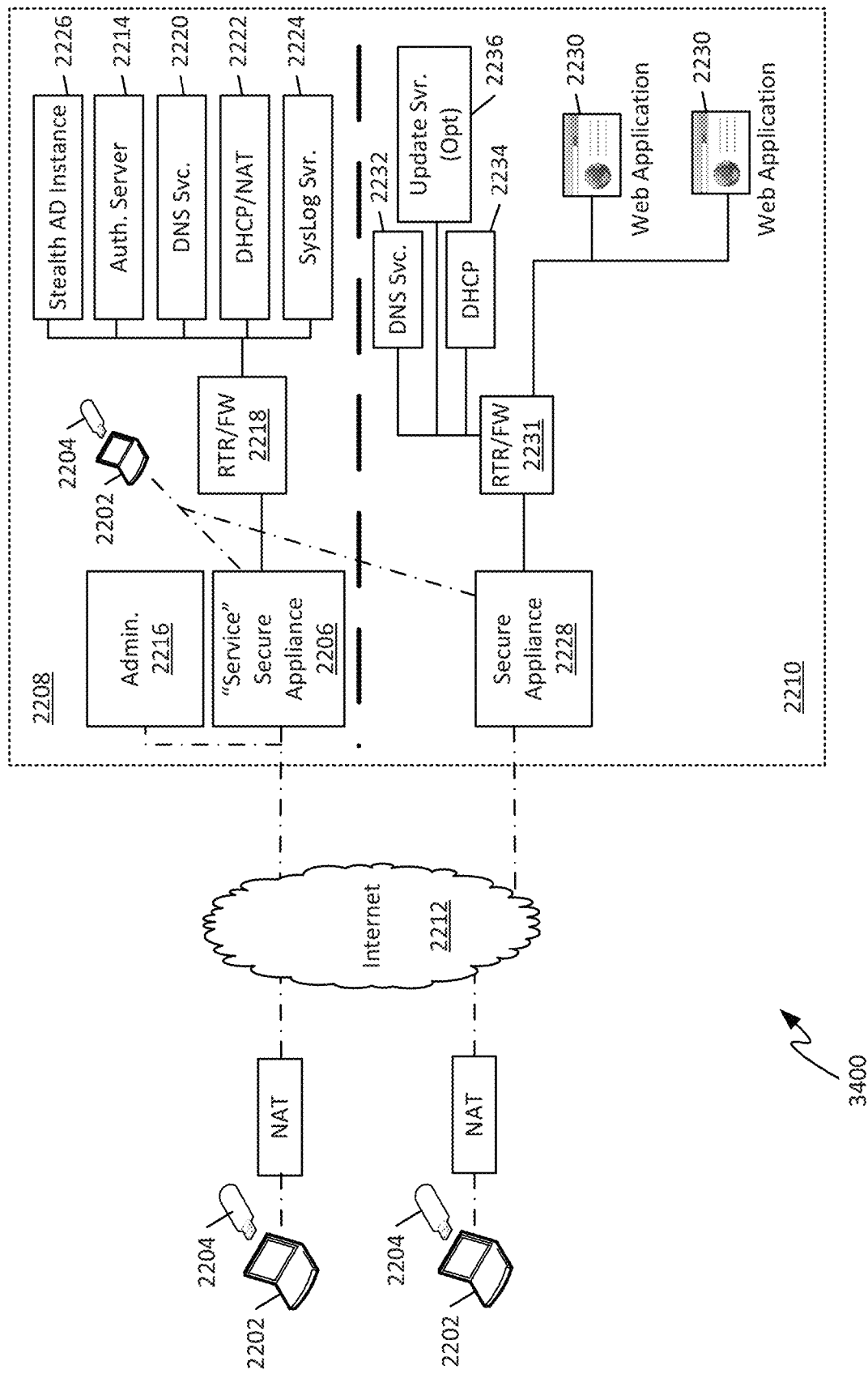
FIG. 35 is an example distributed system of a remote desktop client positioned within an enterprise network.
Figure 36:
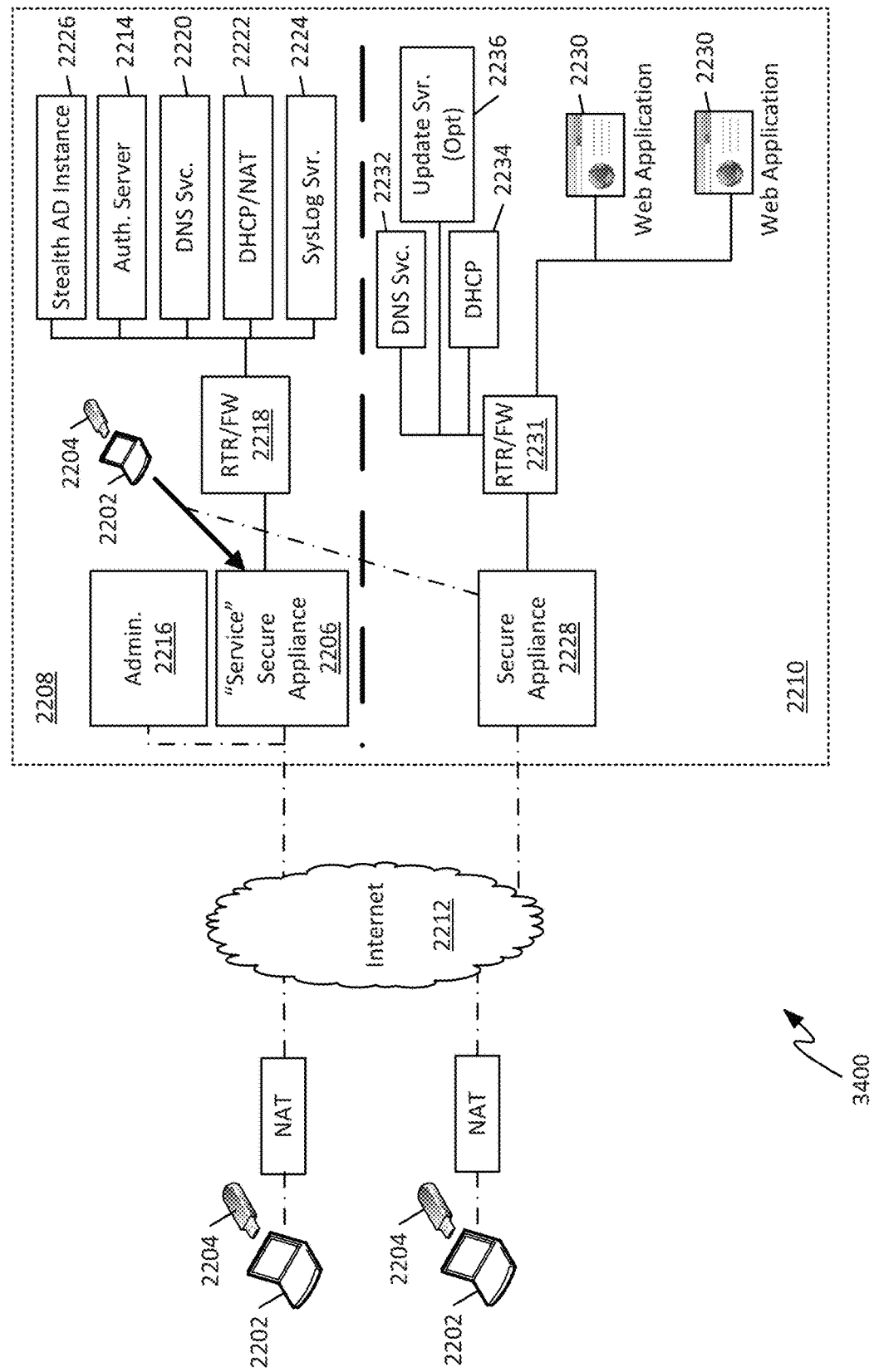
FIG. 36 is an example distributed system of a remote desktop client positioned within an enterprise network.

As described herein, this example illustrates an embodiment in which the client computer system 2202 hosting the secure boot device 2204, is communicatively connected to a secure enterprise network as further illustrated in FIG. 35. Accordingly, in step 3508, a secure connection is established with a service appliance device, such as service appliance 2206 shown in FIG. 35. The service appliance 2206 directs the client computer system 2202 hosting the secure boot device 2204 to communicate with a secure gateway device, such as the gateway device 2228 illustrated in FIG. 35. The connection between the service appliance 2206 and the client computer system 2202 is also illustrated by the bolded arrow in FIG. 36. As is shown in FIG. 36, the secure boot device 2204 may have stored thereon a secure service key and an address of the service appliance 2206. Accordingly, the secure boot device 2204 is provided with initial destination information for connecting to the service appliance 2206. In this embodiment, the connection between the secure boot device 2204 and the service appliance 2206 is a secure communication channel.

In example embodiments described herein, a client computer system 2202 hosting the secure boot device 2204, at least when positioned within a secure enterprise network, is configured to connect to a cleartext gateway computing system, which allows the client computer system 2202 to connect within the secure enterprise network without establishing a separate secured connection, as may otherwise be required if the client computer system 2202 were located external to the secure enterprise network. In some embodiments, even when external to the secure enterprise network, the client computer system 2202 may connect to the cleartext gateway computing system, for example if the secure boot device 2204 hosts an operating system that is not supported by the Stealth-based security system implemented within a secure enterprise network. Details regarding connections established via a cleartext gateway computing system are described in further detail in copending U.S. patent application Ser. No. 14/753,437 and U.S. Provisional Patent Application No. 62/018,802 filed on Jun. 30, 2014, the disclosures of each of which are incorporated by reference in their entireties.

Figure 37:
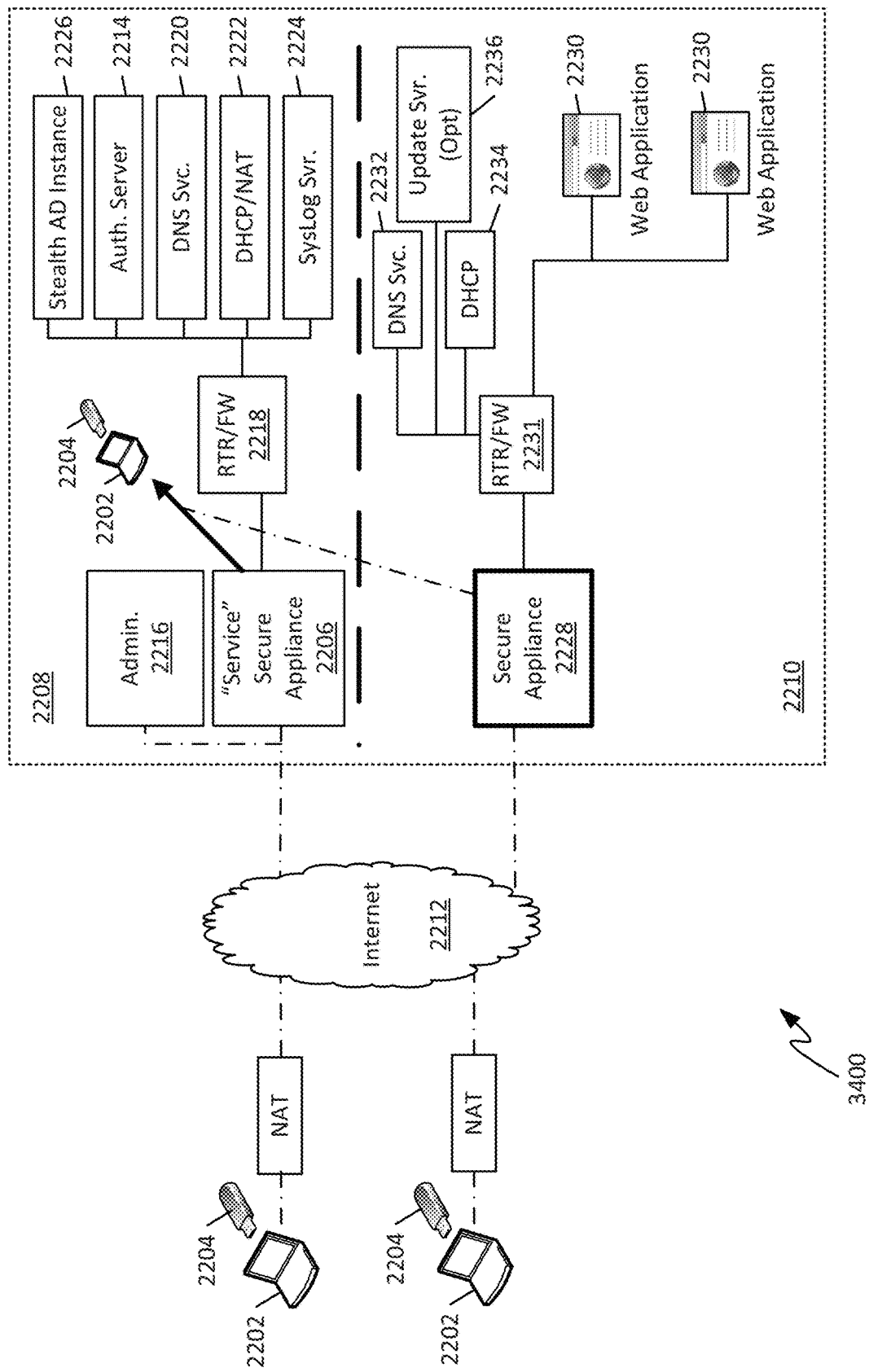
FIG. 37 is an example distributed system of a remote desktop client positioned within an enterprise network.
Figure 38:
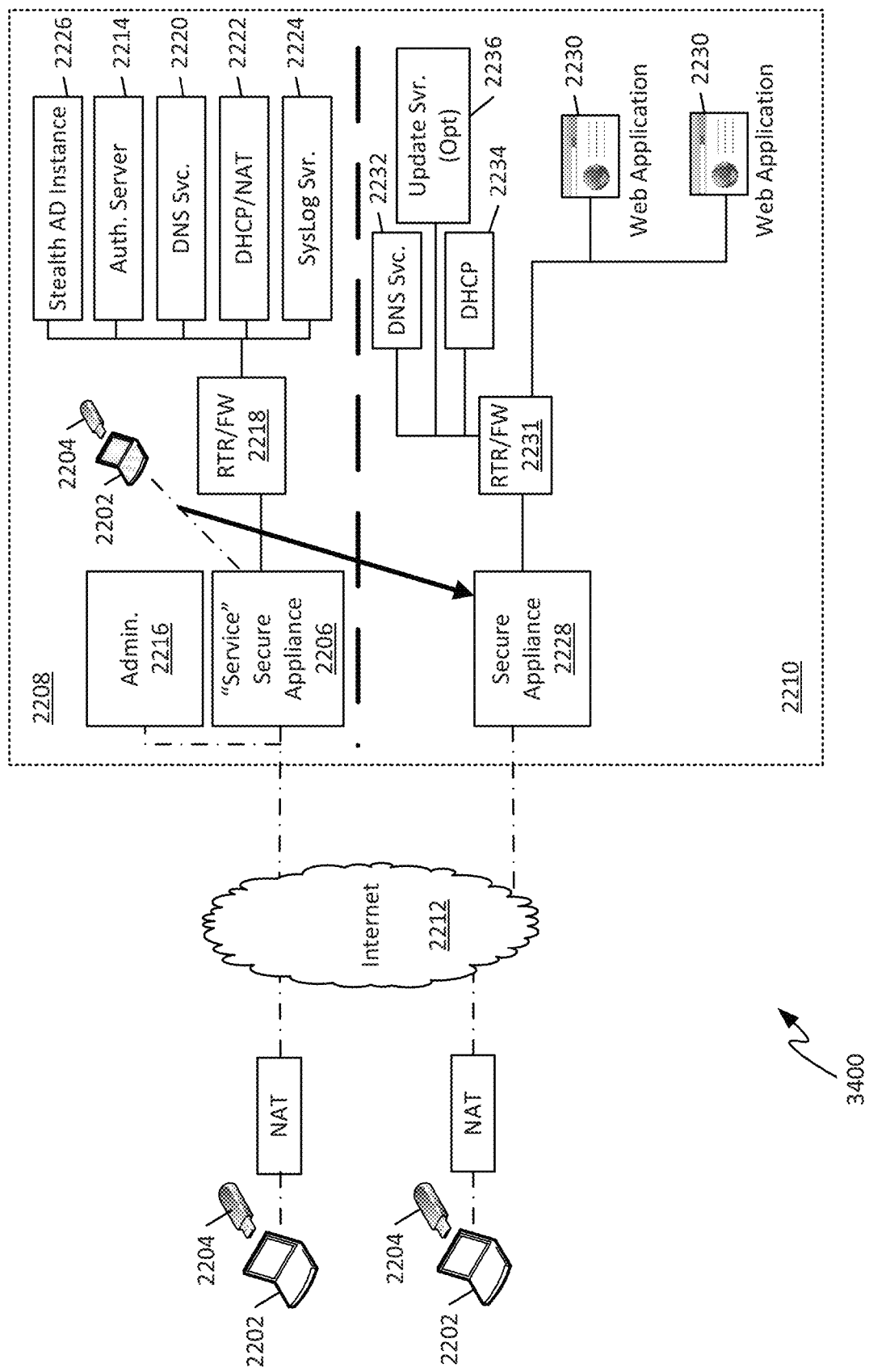
FIG. 38 is an example distributed system of a remote desktop client positioned within an enterprise network.

In step 3510, the client computer system 2202 receives, from the service appliance 2206, over the secure communication channel, a destination address of the secure gateway device 2228. Additionally, the service appliance may also provide the client computer system 2202 with community of interest keys and filters. As described herein, the community of interest keys and filters provided to the client computer system 2202 are based on the user credentials provided in step 3504. This communication between the service appliance 2206 and the client computer system 2202 is further illustrated by the bolded arrow in FIG. 37. As shown in FIG. 37, the service appliance 2206 provides the client computing device with the destination address of the gateway device 2228 (bolded) along with community of interest keys and filters, thereby allowing the client computer system 2202 to view and communicate with various endpoints connected to the enterprise network.

In step 3512, the client computer system 2202 establishes a cleartext communication channel with the secure gateway device 2228. As described herein, the client computer system 2202 received, from the service appliance 2206, destination address information of the secure gateway device 2228. In this example, the communication channel established between the client computer system 2202 and the secure gateway device 2228 is a cleartext communication channel, however the data transmitted over the cleartext communication channel is encrypted. The established cleartext communication channel between the client computer system 2202 and the secure gateway device 2228 is further illustrated by the bolded arrow in FIG. 38. Upon establishment of the cleartext communication channel, the client computer system 2202 can now communicate with one or more trusted endpoints within the enterprise. Although the cleartext communication channel is established, thereby providing the client computer system 2202 to communicate with various endpoints, the client computer system 2202 may only communicate with those endpoints within its community of interest. Accordingly, any communication, over a cleartext communication channel, between the client computer system 2202 and an endpoint within the enterprise is premised on each device belonging to identical communities of interest.

Referring now to the overall disclosure, the methods and systems of the present disclosure provide for both a trusted client device using a secure boot device, as well as secure and flexible access to network-based services via a typically unsecured network. The methods and systems described herein allow for concurrent secured and unsecured communications, as well as concurrent updating and transactional access.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto.

The invention claimed is:

1. A method for switching between multiple brandings of a remote desktop client operating on a secure boot device, the secure boot device storing a plurality of brandings for a user, the method comprising:

initiating an operating system from the secure boot device at the remote desktop client, the secure boot device comprising a portable storage device readable by the remote desktop client;

receiving credentials including a user identification and a password;

receiving a selection of a first branding among the plurality of brandings, each of the plurality of brandings associated with a different entity from which a user may receive authorization to operate the remote desktop client;

based on verification of the received credentials, booting, from the secure boot device, a desktop of the operating system in the selected first branding;

receiving a selection of a second branding different from the first branding from within the desktop; and performing a desktop reset, wherein the desktop reset does not re-start the operating system initiated from the secure boot device and results in execution of the desktop in the second branding without requiring the user to re-enter credentials to operate the remote desktop client in the second branding, wherein the desktop executed in the first branding presents the user with access to a first set of remote desktop client resources and the desktop executed in the second branding presents the user with access to a second set of remote desktop client resources that are different from the first set of remote desktop client resources, and wherein access to the first and second sets of remote desktop client resources requires use of different sets of security parameters.

2. The method of claim 1, wherein performing the desktop reset does not re-boot the operating system.

3. The method of claim 1, wherein each branding is associated with a different context.

4. The method of claim 3, wherein each context depends on a role of the user.

5. The method of claim 4, wherein each context is associated with a particular branding and one or more application scripts, wherein each branding and application script is stored in the secure boot device.

6. The method of claim 1, wherein the desktop reset further comprises:
shutting down a desktop of the remote desktop client; and
restarting the desktop of the remote desktop client in the selected branding.

7. The method of claim 1, wherein the desktop reset further comprises:
shutting down the desktop based on receiving a shutdown command;
displaying a credentials screen from the secure boot device;
receiving credentials including a user identification and a password; and
based on verification of the received credentials, booting, from the secure boot device, the desktop in the selected branding.

8. A secure system for switching between multiple brandings of a remote desktop client operating on a secure boot device, the secure boot device storing a plurality of brandings for a user, the system comprising:
a client computer having a secure boot device connected thereto;
a remote server communicatively connected to the client computer via a communications network;
a trusted set of processing modules stored in the secure boot device that, when executed on the client computer, cause the client computer to:
initiate an operating system from the secure boot device at the client computer, the secure boot device comprising a portable storage device connected to and readable by the client computer;
receive credentials including a user identification and a password;
receive a selection of a first branding among the plurality of brandings, each of the plurality of brandings associated with a different entity from which a user may receive authorization to operate the remote desktop client;
based on verification of the received credentials, boot, from the secure boot device, a desktop of the operating system in the selected first branding;
receive a selection of a second branding different from the first branding from within the desktop; and
perform a desktop reset, wherein the desktop reset does not re-start the operating system initiated from the secure boot device and results in execution of the desktop in the second branding without requiring the user to re-enter credentials to operate the remote desktop client in the second branding,
wherein the desktop executed in the first branding presents the user with access to a first set of remote desktop client resources and the desktop executed in the second branding presents the user with access to a second set of remote desktop client resources that are different from the first set of remote desktop client resources, and
wherein access to the first and second sets of remote desktop client resources requires use of different sets of security parameters.

9. The secure system of claim 8, wherein performing the desktop reset does not re-boot the operating system.

10. The secure system of claim 8, wherein each branding is associated with a different context.

11. The secure system of claim 10, wherein each context depends on a role of the user.

12. The secure system of claim 11, wherein each context is associated with a particular branding and one or more application scripts, wherein each branding and application script is stored in the secure boot device.

13. The secure system of claim 8, wherein the desktop reset further comprises:
shut down a desktop of the remote desktop client; and
restart the desktop of the remote desktop client in the selected branding.

14. The secure system of claim 8, wherein the desktop reset further comprises:
shut down the desktop based on receiving a shutdown command;
display a credentials screen from the secure boot device;
receive credentials including a user identification and a password; and
based on verification of the received credentials, boot, from the secure boot device, the desktop in the selected branding.

15. A non-transitory computer storage medium comprising computer-executable instructions stored in a memory of a secure boot device operating on a remote desktop client and including a trusted set of processing modules which, when executed, cause a computing system to:

initiate an operating system from the secure boot device at the remote desktop client, the secure boot device comprising a portable storage device readable by the remote desktop client;

receive credentials including a user identification and a password;

receive a selection of a first branding among a plurality of brandings, each of the plurality of brandings associated with a different entity from which a user may receive authorization to operate the remote desktop client;

based on verification of the received credentials, boot, from the secure boot device, a desktop of the operating system in the selected first branding;

receive a selection of a second branding different from the first branding from within the desktop; and perform a desktop reset, wherein the desktop reset does not re-start the operating system initiated from the secure boot device and results in execution of the desktop in the second branding without requiring the user to re-enter credentials to operate the remote desktop client in the second branding, wherein the desktop executed in the first branding presents the user with access to a first set of remote desktop client resources and the desktop executed in the second branding presents the user with access to a second set of remote desktop client resources that are different from the first set of remote desktop client resources, and wherein access to the first and second sets of remote desktop client resources requires use of different sets of security parameters.

16. The non-transitory computer storage medium of claim 15, wherein performing the desktop reset does not re-boot the operating system.

17. The non-transitory computer storage medium of claim 15, wherein each branding is associated with a different context.

18. The non-transitory computer storage medium of claim 17, wherein each context depends on a role of the user.

19. The non-transitory computer storage medium of claim 18, wherein each context is associated with a particular branding and one or more application scripts, wherein each branding and application script is stored in the secure boot device.

20. The non-transitory computer storage medium of claim 15, wherein the desktop reset further comprises:

shut down the desktop based on receiving a shutdown command;

display a credentials screen from the secure boot device;

receive credentials including a user identification and a password; and based on verification of the received credentials, boot, from the secure boot device, the desktop in the selected branding.

* * * * *